United States Patent
Cohen et al.

(10) Patent No.: US 11,915,491 B2
(45) Date of Patent: *Feb. 27, 2024

(54) CONTROLLING HOST VEHICLE BASED ON DETECTED DOOR OPENING EVENTS

(71) Applicant: Mobileye Vision Technologies Ltd., Jerusalem (IL)

(72) Inventors: Barak Cohen, Modiin (IL); Gideon Stein, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 708 days.

This patent is subject to a terminal disclaimer.

(21) Appl. No.: 17/087,170

(22) Filed: Nov. 2, 2020

(65) Prior Publication Data

US 2021/0056327 A1    Feb. 25, 2021

Related U.S. Application Data

(63) Continuation of application No. 16/437,504, filed on Jun. 11, 2019, now Pat. No. 10,832,066, which is a
(Continued)

(51) Int. Cl.
    *G01S 7/41*        (2006.01)
    *G06V 20/58*       (2022.01)
    (Continued)

(52) U.S. Cl.
    CPC .......... *G06V 20/584* (2022.01); *B60W 30/08* (2013.01); *G05D 1/0088* (2013.01); *G05D 1/0246* (2013.01)

(58) Field of Classification Search
    CPC ...... G01C 21/3492; G08G 1/16; G01S 17/08; G06K 9/00825; B60W 30/08; G05D 1/0088; G05D 1/0246
    See application file for complete search history.

(56) References Cited

U.S. PATENT DOCUMENTS

| 5,170,352 A | 12/1992 | McTamaney et al. |
| 7,786,898 B2 | 8/2010 | Stein et al. |

(Continued)

OTHER PUBLICATIONS

Thomas Deselaers, Daniel Keysers, and Hermann Ney, "Discriminative Training for Object Recognition Using Image Patches," IEEE Computer Society Conference on Computer Vision and Pattern Recognition (2005), 6 pages.
(Continued)

*Primary Examiner* — Phuoc H Doan
(74) *Attorney, Agent, or Firm* — Finnegan, Henderson, Farabow, Garrett & Dunner, LLP

(57) ABSTRACT

Systems and methods are provided for vehicle navigation. In one implementation, a system may comprise at least one processor. The processor may be programmed to receive an image associated with the environment of the host vehicle. The processor may analyze the image to identify a side of a parked vehicle; a first structural feature of the parked vehicle in a forward region of the side of the parked vehicle or a second structural feature of the parked vehicle in a rear region of the side of the parked vehicle; and a door feature of the parked vehicle in a vicinity of the first or the second structural features. The processor may then determine, based on a subsequent image, a change of an image characteristic of the door feature of the parked vehicle and alter a navigational path of the host vehicle based on the change of the image characteristic.

26 Claims, 47 Drawing Sheets

Related U.S. Application Data continuation of application No. 15/634,400, filed on Jun. 27, 2017, now Pat. No. 10,354,157.

(60) Provisional application No. 62/445,500, filed on Jan. 12, 2017, provisional application No. 62/354,946, filed on Jun. 27, 2016.

(51) Int. Cl.
*G05D 1/00* (2006.01)
*B60W 30/08* (2012.01)

(56) References Cited

U.S. PATENT DOCUMENTS

| | | | |
|---|---|---|---|
| 9,103,671 B1 * | 8/2015 | Breed | G01S 13/865 |
| 9,118,816 B2 | 8/2015 | Stein et al. | |
| 10,354,157 B2 | 7/2019 | Cohen | |
| 2013/0190964 A1 | 7/2013 | Uehara | |
| 2014/0032049 A1 | 1/2014 | Moshchuk et al. | |
| 2014/0085475 A1 | 3/2014 | Bhanu et al. | |
| 2015/0077273 A1 | 3/2015 | Alshinnawi et al. | |
| 2015/0151725 A1 | 6/2015 | Clarke et al. | |
| 2015/0254986 A1 | 9/2015 | Fairfield et al. | |
| 2016/0003630 A1 | 1/2016 | Higuchi | |
| 2016/0185345 A1 | 6/2016 | Sasabuchi et al. | |
| 2016/0257251 A1 | 9/2016 | Zhang | |
| 2016/0343253 A1 | 11/2016 | Imai | |
| 2016/0357262 A1 | 12/2016 | Ansari | |
| 2017/0003134 A1 | 1/2017 | Kim et al. | |
| 2017/0329332 A1 | 11/2017 | Pilarski | |
| 2018/0273048 A1 | 9/2018 | Perez Barrera et al. | |

OTHER PUBLICATIONS

Jose Marfa Armingol et al., "IVVI: Intelligent vehicle based on visual information," Robotics and Autonomous Systems, vol. 55, No. 12, pp. 904-916 (2007).

International Search Report and Written Opinion in Application No. PCT/US2017/039427 dated Apr. 30, 2018, 25 pages.

Invitation of Pay Additional Fees, Partial International Search Report, and Provisional Opinion in Application No. PCT/US2017/039427 dated Sep. 22, 2017, 11 pages.

Ranka Kulic and Zoran Vukic, "Autonomous Vehicle Obstacle Avoiding and Goal Position Reaching by Behavioral Cloning," *IECON 2006—32nd Annual Conference on IEEE Industrial Electronics* (Nov. 2006), pp. 3939-3944.

* cited by examiner

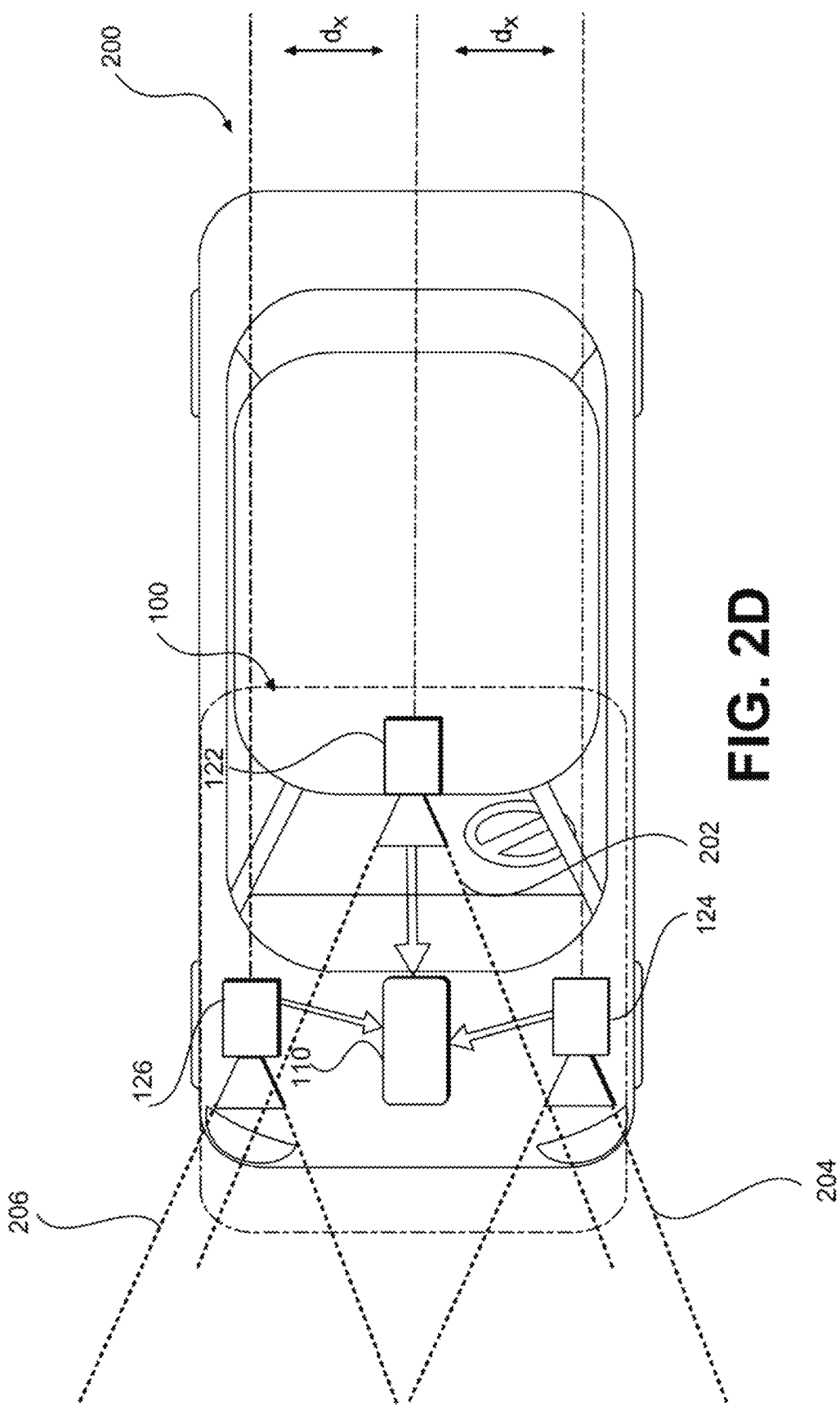

CONTROLLING HOST VEHICLE BASED ON DETECTED DOOR OPENING EVENTS

CROSS REFERENCES TO RELATED APPLICATIONS

This application is a continuation of U.S. patent application Ser. No. 16/437,504, filed on Jun. 11, 2019, which is a continuation of U.S. patent application Ser. No. 15/634,400, filed on Jun. 27, 2017, now U.S. Pat. No. 10,354,157, which claims the benefit of priority of U.S. Provisional Patent Application No. 62/354,946, filed on Jun. 27, 2016; and U.S. Provisional Patent Application No. 62/445,500, filed on Jan. 12, 2017. The foregoing applications are incorporated herein by reference in their entirety.

BACKGROUND

Technical Field

The present disclosure relates generally to autonomous vehicle navigation. Additionally, this disclosure relates to systems and methods for navigating a host vehicle based on detecting door openings, navigating a host vehicle based on detecting a target vehicle entering the host vehicle's lane, navigating a host vehicle based on detecting whether a road on which the host vehicle travels is a one-way road, and determining a predicted state of a parked vehicle.

Background Information

As technology continues to advance, the goal of a fully autonomous vehicle that is capable of navigating on roadways is on the horizon. Autonomous vehicles may need to take into account a variety of factors and make appropriate decisions based on those factors to safely and accurately reach an intended destination. For example, an autonomous vehicle may need to process and interpret visual information (e.g., information captured from a camera), information from radar or lidar, and may also use information obtained from other sources (e.g., from a GPS device, a speed sensor, an accelerometer, a suspension sensor, etc.). At the same time, in order to navigate to a destination, an autonomous vehicle may also need to identify its location within a particular roadway (e.g., a specific lane within a multi-lane road), navigate alongside other vehicles, avoid obstacles and pedestrians, observe traffic signals and signs, travel from one road to another road at appropriate intersections or interchanges, and respond to any other situation that occurs or develops during the vehicle's operation.

Autonomous vehicles must be able to react to changing circumstances with sufficient time to adjust a navigation path of the vehicle or to apply the brakes. Many traditional algorithms, such as those used in extant autonomous braking systems, do not have reaction times comparable to those of humans. Accordingly, such algorithms are often better suited for use as a backup to human drivers rather than use in a fully autonomous vehicle.

Moreover, characteristics of parked cars are often good indicators of characteristics of a road. For example, the direction of the parked cars may indicate whether the road is a one-way road, and the space between vehicles may indicate whether a pedestrian might emerge from between the vehicles. Existing autonomous vehicle algorithms, however, do not use such characteristics.

Finally, autonomous vehicle systems may use measurements to which human drivers do not have access. For example, autonomous vehicle systems may employ infrared cameras to assess the environment and make predictions. However, many traditional systems do not utilize a combination of measurements, such as visual and infrared cameras. Embodiments of the present disclosure may address one or more of the shortcomings of traditional systems discussed above.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle. The disclosed systems may provide a navigational response based on, for example, an analysis of images captured by one or more of the cameras. Some embodiments may further include one, two, or more infrared cameras that monitor the environment. Some embodiments may thus provide a navigational response based on, for example, analysis of visual images, infrared images, or any combination thereof.

The navigational response may also take into account other data including, for example, global positioning system (GPS) data, sensor data (e.g., from an accelerometer, a speed sensor, a suspension sensor, etc.), and/or other map data.

In one embodiment, a system for navigating a host vehicle based on detecting a door opening event in an environment of the vehicle may comprise at least one processing device. The at least one processing device may be programmed to receive, from an image capture device, at least one image associated with the environment of the host vehicle and analyze the at least one image to identify a side of a parked vehicle. The at least one processing device may be further programmed to identify, in the at least one image, a first structural feature of the parked vehicle in a forward region of the side of the parked vehicle and a second structural feature of the parked vehicle in a rear region of the side of the parked vehicle and identify, in the at least one image, a door edge of the parked vehicle in a vicinity of the first and second structural features. The at least one processing device may also be programmed to determine, based on analysis of one or more subsequent images received from the image capture device, a change of an image characteristic of the door edge of the parked vehicle and alter a navigational path of the host vehicle based at least in part on the change of the image characteristic of the door edge of the parked vehicle.

In another embodiment, a method for navigating a host vehicle based on detecting a door opening event in an environment of the vehicle may comprise receiving, from an image capture device, at least one image associated with the environment of the host vehicle and analyzing the at least one image to identify a side of a parked vehicle. The method may further comprise identifying, in the at least one image, a first structural feature of the parked vehicle in a forward region of the side of the parked vehicle and a second structural feature of the parked vehicle in a rear region of the side of the parked vehicle and identifying, in the at least one image, a door edge of the parked vehicle in a vicinity of the first and second structural features. The method may also comprise determining, based on analysis of one or more subsequent images received from the image capture device, a change of an image characteristic of the door edge of the parked vehicle and altering a navigational path of the host vehicle based at least in part on the change of the image characteristic of the door edge of the parked vehicle.

In yet another embodiment, a system for navigating a host vehicle based on movement of a target vehicle toward a lane being traveled by the host vehicle may comprise at least one processing device. The at least one processing device may be programmed to receive, from an image capture device, a plurality of images associated with an environment of the host vehicle and analyze at least one of the plurality of images to identify the target vehicle and at least one wheel component on a side of the target vehicle. The at least one processing device may be further programmed to analyze, in at least two of the plurality of images, a region including the at least one wheel component of the target vehicle to identify motion associated with the at least one wheel component of the target vehicle and cause at least one navigational change of the host vehicle based on the identified motion associated with the at least one wheel component of the target vehicle.

In yet another embodiment, a method for navigating a host vehicle based on movement of a target vehicle toward a lane being traveled by the host vehicle may comprise receiving, from an image capture device, a plurality of images associated with an environment of the host vehicle and analyzing at least one of the plurality of images to identify the target vehicle and at least one wheel component on a side of the target vehicle. The method may further comprise analyzing, in at least two of the plurality of images, a region including the at least one wheel component of the target vehicle to identify motion associated with the at least one wheel component of the target vehicle and causing at least one navigational change of the host vehicle based on the identified motion associated with the at least one wheel component of the target vehicle.

In still another embodiment, a system for detecting whether a road on which a host vehicle travels is a one-way road may comprise at least one processing device. The at least one processing device may be programmed to receive, from an image capture device, at least one image associated with an environment of the host vehicle; identify, based on analysis of the at least one image, a first plurality of vehicles on a first side of the road on which the host vehicle travels; and identify, based on analysis of the at least one image, a second plurality of vehicles on a second side of the road on which the host vehicle travels. The at least one processing device may be further programmed to determine a first facing direction associated with the first plurality of vehicles; determine a second facing direction associated with the second plurality of vehicles; and cause at least one navigational change of the host vehicle when the first facing direction and the second facing direction are both opposite to a heading direction of the host vehicle.

In still another embodiment, a method for detecting whether a road on which a host vehicle travels is a one-way road may comprise receiving, from an image capture device, at least one image associated with an environment of the host vehicle; identifying, based on analysis of the at least one image, a first plurality of vehicles on a first side of the road on which the host vehicle travels; and identifying, based on analysis of the at least one image, a second plurality of vehicles on a second side of the road on which the host vehicle travels. The method may further comprise determining a first facing direction associated with the first plurality of vehicles; determining a second facing direction associated with the second plurality of vehicles; and causing at least one navigational change of the host vehicle when the first facing direction and the second facing direction are both opposite to a heading direction of the host vehicle.

In another embodiment, a system for navigating a host vehicle may comprise at least one processing device. The at least one processing device may be programmed to receive a navigation instruction to navigate the host vehicle from a first road on which the host vehicle is traveling to a second road and receive, from an image capture device, at least one image associated with an environment of the second road. The at least one processing device may be further programmed to identify, based on analysis of the at least one image, a first plurality of vehicles on a first side of the second road and identify, based on analysis of the at least one image, a second plurality of vehicles on a second side of the second road. The at least one processing device may also be programmed to determine a first facing direction associated with the first plurality of vehicles, determine a second facing direction associated with the second plurality of vehicles, and determine that the first facing direction and the second facing direction are both opposite to a heading direction the host vehicle would travel if the host vehicle were to turn onto the second road. The at least one processing device may be further programmed to suspend the navigation instruction in response to the determination that the first facing direction and the second facing direction are both opposite to the heading direction the host vehicle would travel if the host vehicle were to navigate onto the second road.

In yet another embodiment, a system for determining a predicted state of a parked vehicle in an environment of a host vehicle may comprise an image capture device, an infrared image capture device, and at least one processing device. The at least one processing device may be programmed to receive, from the image capture device, a plurality of images associated with the environment of the host vehicle; analyze at least one of the plurality of images to identify the parked vehicle; and analyze at least two of the plurality of images to identify a change in an illumination state of at least one light associated with the parked vehicle. The at least one processing device may be further programmed to receive, from the infrared image capture device, at least one thermal image of the parked vehicle; determine, based on the change in the illumination state and analysis of the at least one thermal image, the predicted state of the parked vehicle; and cause at least one navigational response by the host vehicle based on the predicted state of the parked vehicle.

In yet another embodiment, a method for determining a predicted state of a parked vehicle in an environment of a host vehicle may comprise receiving, from an image capture device, a plurality of images associated with the environment of the host vehicle; analyzing at least one of the plurality of images to identify the parked vehicle; and analyzing at least two of the plurality of images to identify a change in an illumination state of at least one light associated with the parked vehicle. The method may further comprise receiving, from an infrared image capture device, at least one thermal image of the parked vehicle; determining, based on the change in the illumination state and analysis of the at least one thermal image, the predicted state of the parked vehicle; and causing at least one navigational response by the host vehicle based on the predicted state of the parked vehicle.

In yet another embodiment, a system for determining a predicted state of a parked vehicle in an environment of a host vehicle may comprise an image capture device and at least one processing device. The at least one processing device may be programmed to receive, from the image capture device, a plurality of images associated with the environment of the host vehicle. The at least one processing device may be further programmed to analyze at least one of the plurality of images to identify the parked vehicle and analyze at least two of the plurality of images to identify a change in an illumination state of at least one light associated with the parked vehicle. The at least one processing device may also be programmed to determine, based on the change in the illumination state, the predicted state of the parked vehicle and cause at least one navigational response by the host vehicle based on the predicted state of the parked vehicle In still another embodiment, a system for navigating a host vehicle may comprise at least one processing device. The at least one processing device may be programmed to receive, from a camera, a plurality of images representative of an environment of the host vehicle and analyze at least one of the plurality of images to identify at least two stationary vehicles. The at least one processing device may be further programmed to determine, based on analysis of the at least of the plurality of images, a spacing between the two stationary vehicles and cause at least one navigational change in the host vehicle based on a magnitude of the spacing determined between the two stationary vehicles.

In still another embodiment, a method for navigating a host vehicle may comprise receiving, from a camera, a plurality of images representative of an environment of the host vehicle and analyzing at least one of the plurality of images to identify at least two stationary vehicles. The method may further comprise determining, based on analysis of the at least of the plurality of images, a spacing between the two stationary vehicles and causing at least one navigational change in the host vehicle based on a magnitude of the spacing determined between the two stationary vehicles.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 2D is a diagrammatic top view representation of yet another embodiment of a vehicle including a system consistent with the disclosed embodiments.

DETAILED DESCRIPTION

Figure 1:
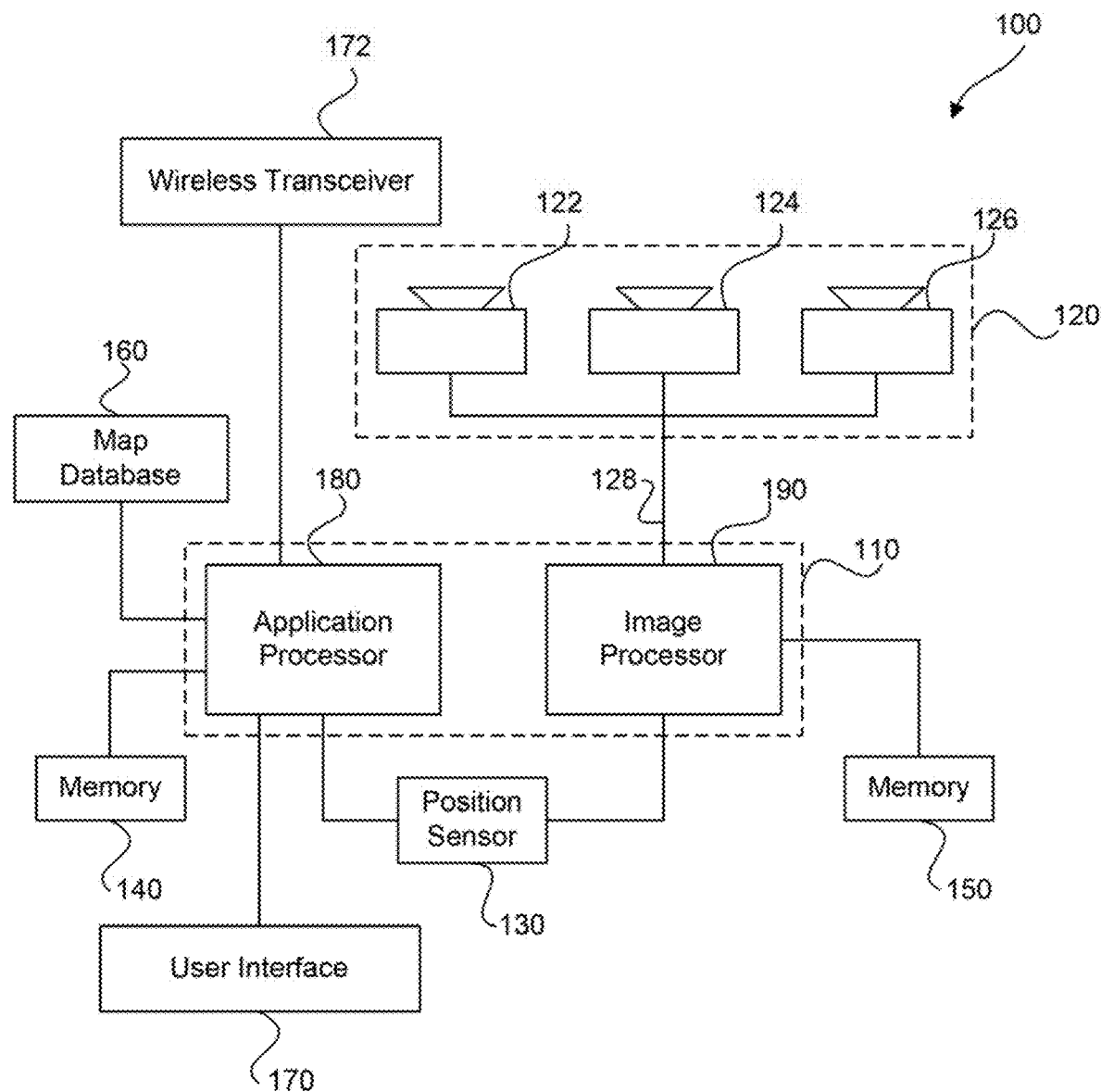
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration/deceleration of the vehicle. To be autonomous, a vehicle need not be fully automatic (e.g., fully operational without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects to the driver (e.g., braking or braking under certain circumstances). In some cases, autonomous vehicles may handle some or all aspects of braking, speed control, and/or steering of the vehicle.

As human drivers typically rely on visual cues and observations in order to control a vehicle, transportation infrastructures are built accordingly, with lane markings, traffic signs, and traffic lights designed to provide visual information to drivers. In view of these design characteristics of transportation infrastructures, an autonomous vehicle may include a camera and a processing unit that analyzes visual information captured from the environment of the vehicle. The visual information may include, for example, images representing components of the transportation infrastructure (e.g., lane markings, traffic signs, traffic lights, etc.) that are observable by drivers and other obstacles (e.g., other vehicles, pedestrians, debris, etc.). The autonomous vehicle may also include an infrared camera. In such embodiments, the processing unit may analyze heat information captured from the environment, either individually or in conjunction with visual information.

Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while it is traveling, and the vehicle (as well as other vehicles) may use the information to localize itself on the model. Some vehicles can also be capable of communication among them, sharing information, altering the peer vehicle of hazards or changes in the vehicles' surroundings, etc.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras, CCDs, or any other type of image sensor), such as image capture device 122, image capture device 124, and image capture device 126. In some embodiments, image acquisition unit 120 may further include one or more infrared capture devices (e.g., infrared cameras, far infrared (FIR) detectors, or any other type of infrared sensor); for example, one or more of image capture device 122, image capture device 124, and image capture device 126 may comprise an infrared image capture device.

System 100 may also include a data interface 128 communicatively connecting processing unit 110 to image acquisition unit 120. For example, data interface 128 may include any wired and/or wireless link or links for transmitting image data acquired by image acquisition unit 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802.15.4, ZigBee, etc.). Such transmissions can include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 180 and image processor 190 may include various types of hardware-based processing devices. For example, either or both of applications processor 180 and image processor 190 may include a microprocessor, preprocessors (such as an image preprocessor), graphics processors, a central processing unit (CPU), support circuits, digital signal processors, integrated circuits, memory, graphics processing unit (GPU), or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments. In other examples, the EyeQ4® and/or the EyeQ5® may be used in the disclosed embodiments. Of course, any newer or future EyeQ processing devices may also be used together with the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware based components of a host vehicle.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), a graphics processing unit (GPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The GPU may also comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software, as well as a trained system, such as a neural network, or a deep neural network, for example. The memory units may include random access memory (RAM), read only memory (ROM), flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a speedometer) for measuring a speed of vehicle 200. System 100 may also include one or more accelerometers (either single axis or multiaxis) for measuring accelerations of vehicle 200 along one or more axes.

The memory units 140, 150 may include a database, or data organized in any other form, that includes one or more indicators and/or locations of known landmarks. Sensory information (such as images, radar signal, depth information from lidar or stereo processing of two or more images) of the environment may be processed together with position information, such as a GPS coordinate, vehicle's ego motion, etc. to determine a current location of the vehicle relative to the known landmarks, and refine the vehicle location. Certain aspects of this technology are included in a localization technology known as REM™, which is being marketed by the assignee of the present application.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.). In some cases, map database 160 may store a sparse data model including polynomial representations of certain road features (e.g., lane markings) or target trajectories for the host vehicle. Map database 160 may also include stored representations of various recognized landmarks that may be used to determine or update a known position of the host vehicle with respect to a target trajectory. The landmark representations may include data fields such as landmark type, landmark location, among other potential identifiers.

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices.

Furthermore, as explained above, image capture devices 122, 124, and 126 may each include any type of device suitable for capturing at least one infrared image from an environment. Any number of infrared image capture devices may be used. Some embodiments may include only a single infrared image capture device, while other embodiments may include two, three, or even four or more infrared image capture devices. Moreover, some embodiments may include any number of infrared image capture devices in combination with any number of image capture devices. Image capture devices 122, 124, and 126 will be further described with reference to FIGS. 2B-2E, below.

One or more cameras (e.g., image capture devices 122, 124, and 126) may be part of a sensing block included on a vehicle. The sensing block may further include one or more infrared image cameras, either separately or in combination with one or more cameras.

Various other sensors may be included in the sensing block, and any or all of the sensors may be relied upon to develop a sensed navigational state of the vehicle. In addition to cameras (forward, sideward, rearward, etc.), other sensors such as RADAR, LIDAR, and acoustic sensors may be included in the sensing block. Additionally, the sensing block may include one or more components configured to communicate and transmit/receive information relating to the environment of the vehicle. For example, such components may include wireless transceivers (RF, etc.) that may receive from a source remotely located with respect to the host vehicle sensor based information or any other type of information relating to the environment of the host vehicle. Such information may include sensor output information, or related information, received from vehicle systems other than the host vehicle. In some embodiments, such information may include information received from a remote computing device, a centralized server, etc. Furthermore, the cameras may take on many different configurations: single camera units, multiple cameras, camera clusters, long FOV, short FOV, wide angle, fisheye, etc.

Figure 2A:
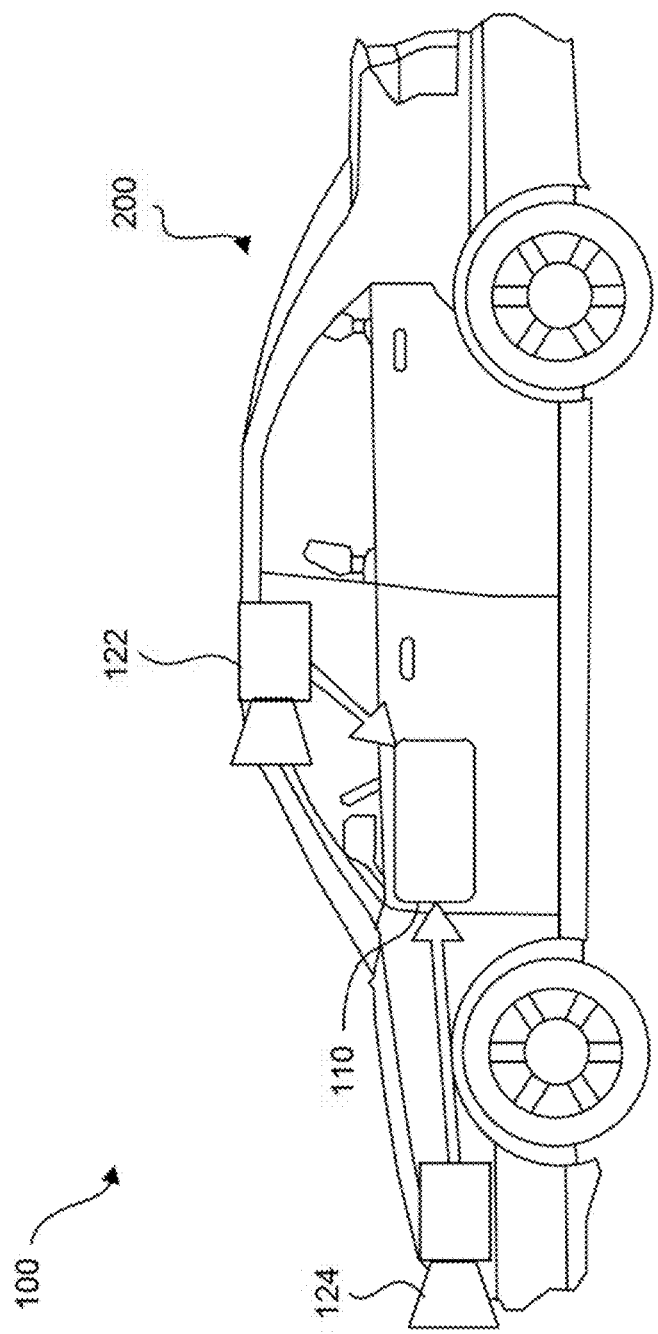
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera) and/or a single infrared image capture device, in other embodiments, such as those discussed in connection with FIGS. 2B-2E, multiple image capture devices and/or multiple infrared capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light fixtures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may transmit and/or receive data over one or more networks (e.g., cellular networks, the Internet, etc.). For example, wireless transceiver 172 may upload data collected by system 100 to one or more servers, and download data from the one or more servers. Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under such a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead transmit data, such as captured images and/or limited location information related to a route.

Other privacy levels are contemplated as well. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

Figure 2B:
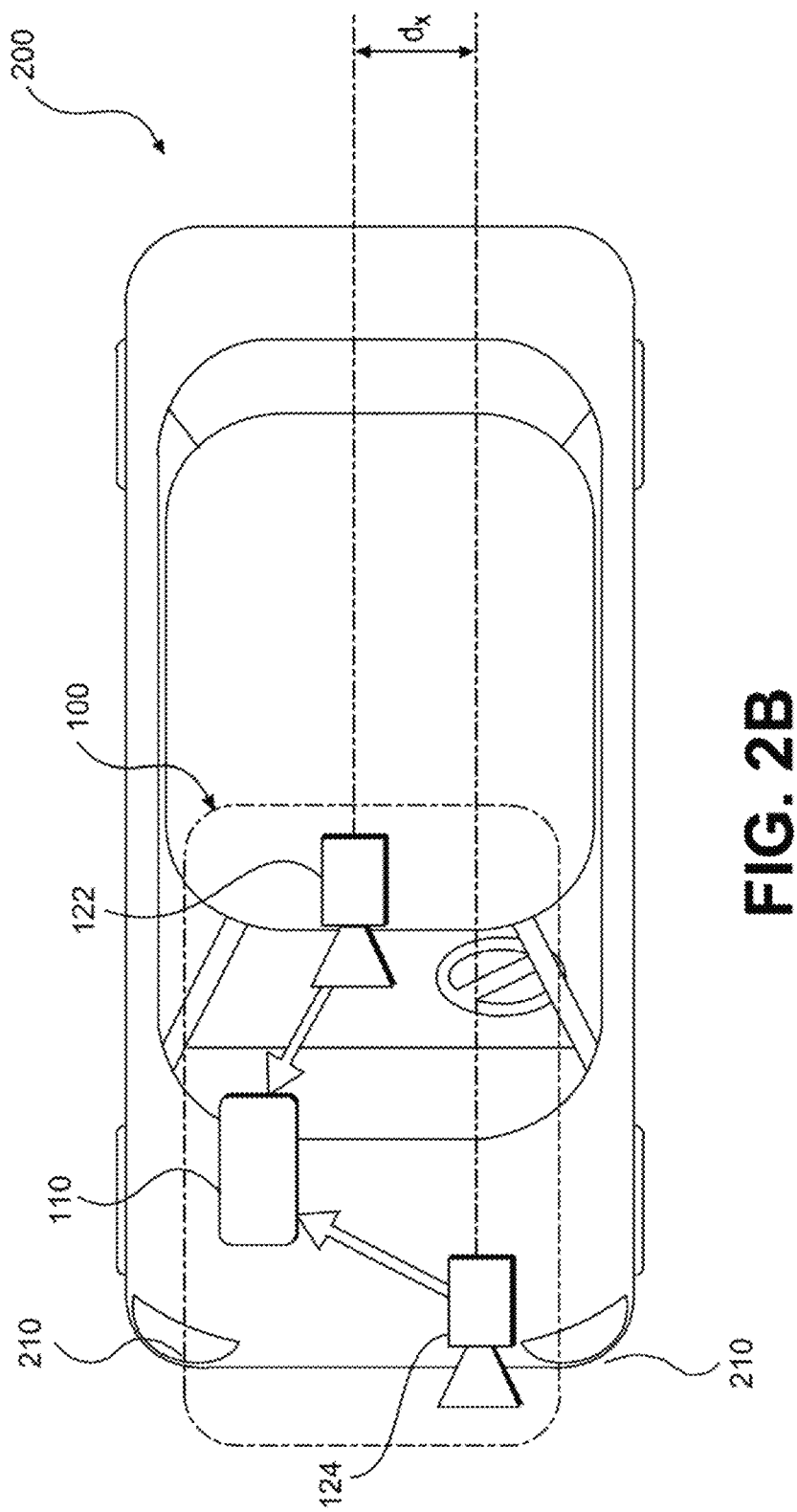
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110. In FIGS. 2A and 2B, one or more of first image capture device 122 and second image capture device 124 may comprise an infrared image capture device.

Figure 2C:
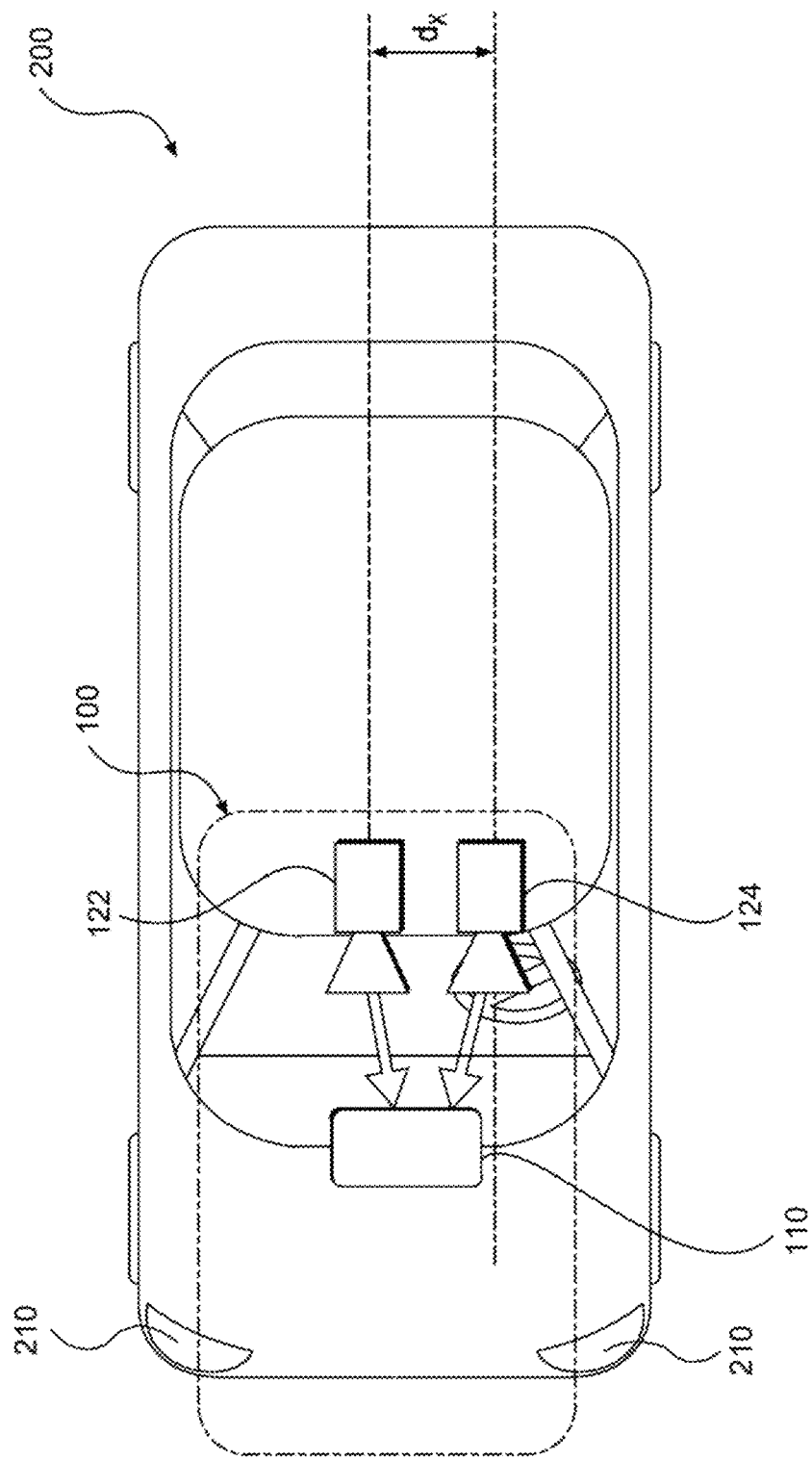
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. In FIG. 2C, as in FIGS. 2A and 2B, one or more of first image capture device 122 and second image capture device 124 may comprise an infrared image capture device.

Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200. Similar to FIGS. 2A, 2B, and 2C, one or more of first, second, and third image capture devices 122, 124, and 126 in FIGS. 2D and 2E may comprise an infrared image capture device.

Figure 2E:
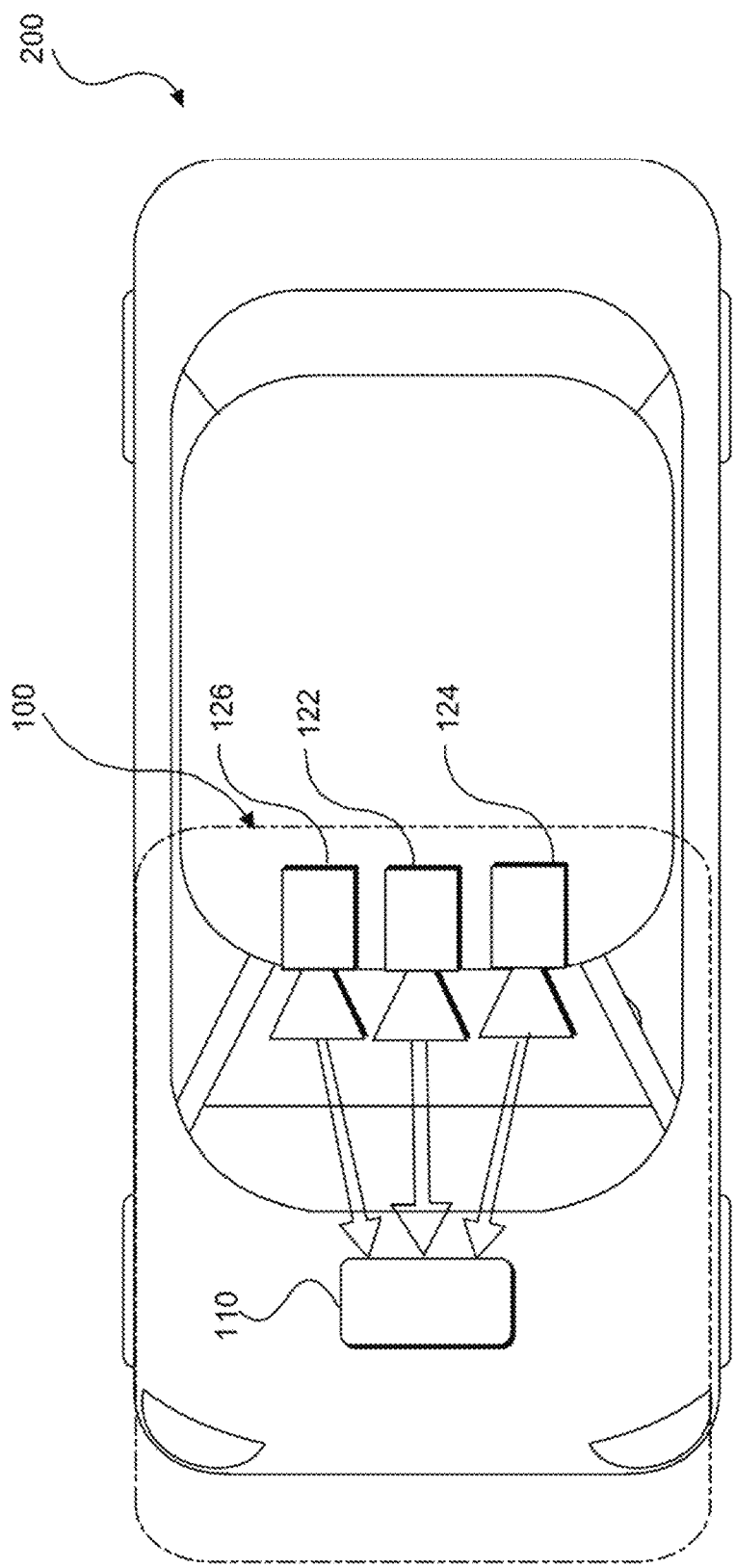
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device or infrared image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments, one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV. In some embodiments, image capture device 122 may be a 7.2M pixel image capture device with an aspect ratio of about 2:1 (e.g., H×V=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with vehicle 200. Each of the plurality of first images may be acquired as a series of image scan lines, which may be captured using a rolling shutter. Each scan line may include a plurality of pixels. In embodiments in which first image capture device 122 comprises an infrared image capture device, each of the plurality of first images may be acquired as a series of image scan lines, which may be captured using an electronic scanning system.

The first image capture device 122 may have a scan rate associated with acquisition of each of the first series of image scan lines. The scan rate may refer to a rate at which an image sensor can acquire image data associated with each pixel included in a particular scan line. In embodiments in which first image capture device 122 comprises an infrared image capture device, the scan rate may refer to a rate at which the infrared image sensor can acquire heat data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame. In embodiments in which one or more of image capture devices 122, 124, and 126 comprises an infrared image capture device, an uncooled focal plane array (UFPA) may be employed along with an electronic scanning system, such that scanning of the rows proceeds on a row-by-row basis until an entire heat map has been captured.

In some embodiments, one or more of the image capture devices (e.g., image capture devices 122, 124, and 126) disclosed herein may constitute a high resolution imager and may have a resolution greater than 5M pixel, 7M pixel, 10M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon (which similarly applies to the use of electronic scanning in an infrared image capture device) will be described in greater detail below.

The second image capture device 124 and the third image capturing device 126 may be any type of image capture device or infrared image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series. In embodiments in which one or more of image capture devices 124 and 126 comprises an infrared image capture device, each of the plurality of second and third images may be acquired as a second and third series of heat scan lines, which may be captured using an electronic scanning system. In such embodiments, each scan line or row may have a plurality of pixels, and image capture devices 124 and/or 126 may have second and third scan rates associated with acquisition of each of heat scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Similarly, there may be no height difference between the image capture devices 122, 124, and 126, which may assist with aligning a heat map produced by one or more of the image capture devices with a visual image produced by one or more of the image capture devices.

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280×960, or any other suitable resolution.

The frame rate (e.g., the rate at which an image capture device acquires a set of pixel data or heat data of one image frame before moving on to capture pixel data or heat data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126. Similarly, in embodiments including electronic scanning, one or more of image capture devices 122, 124, and 126 may include a dynamically variable scan rate.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that afield of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
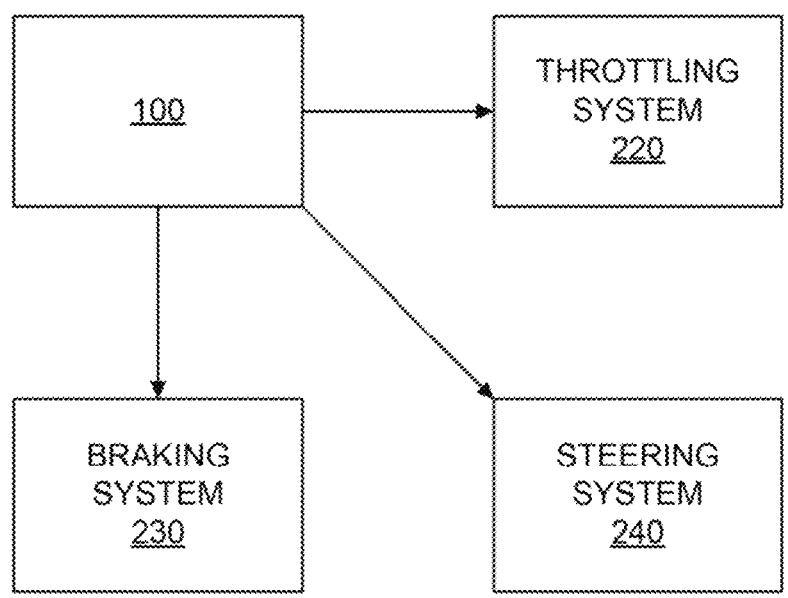
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
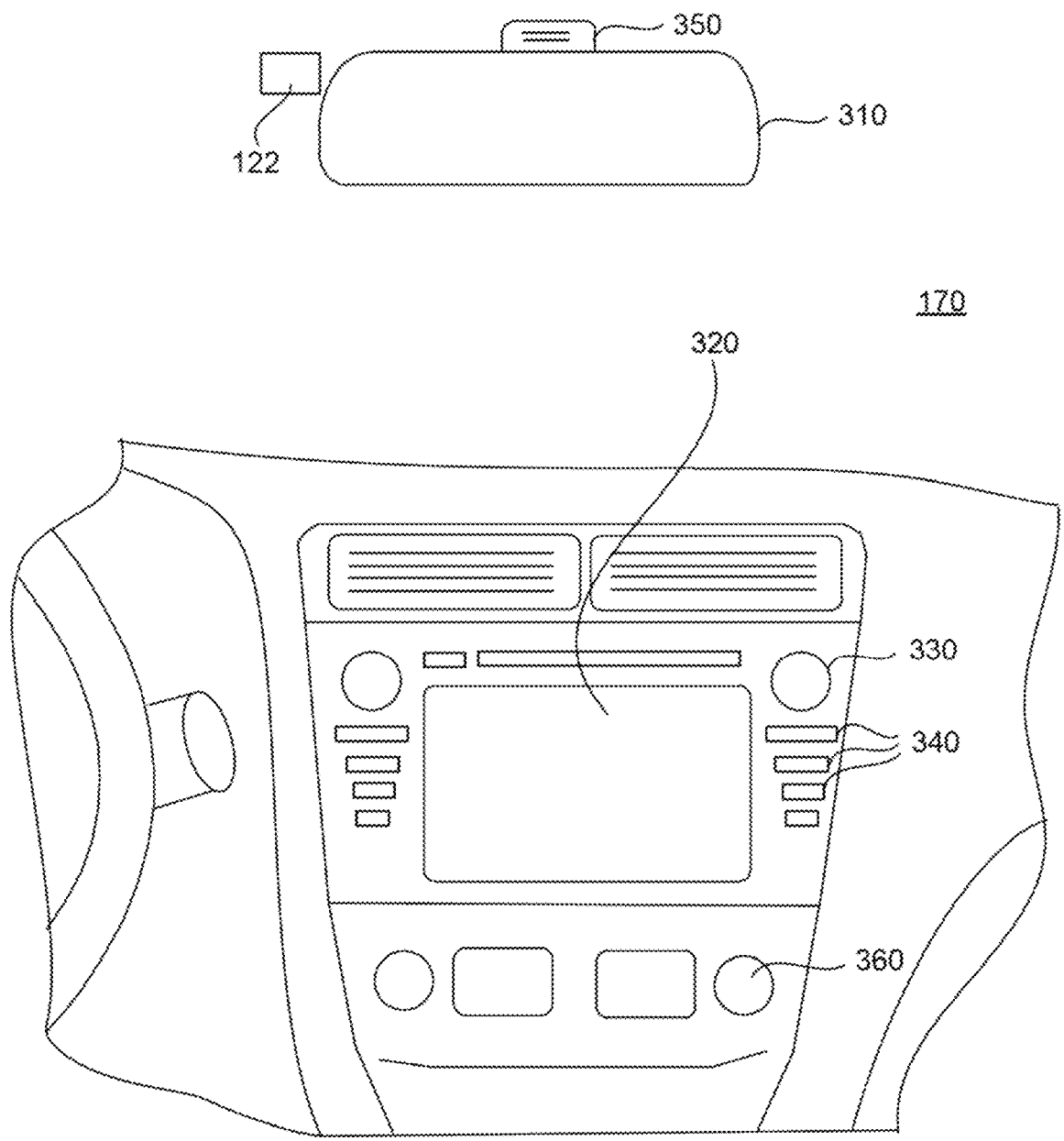
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
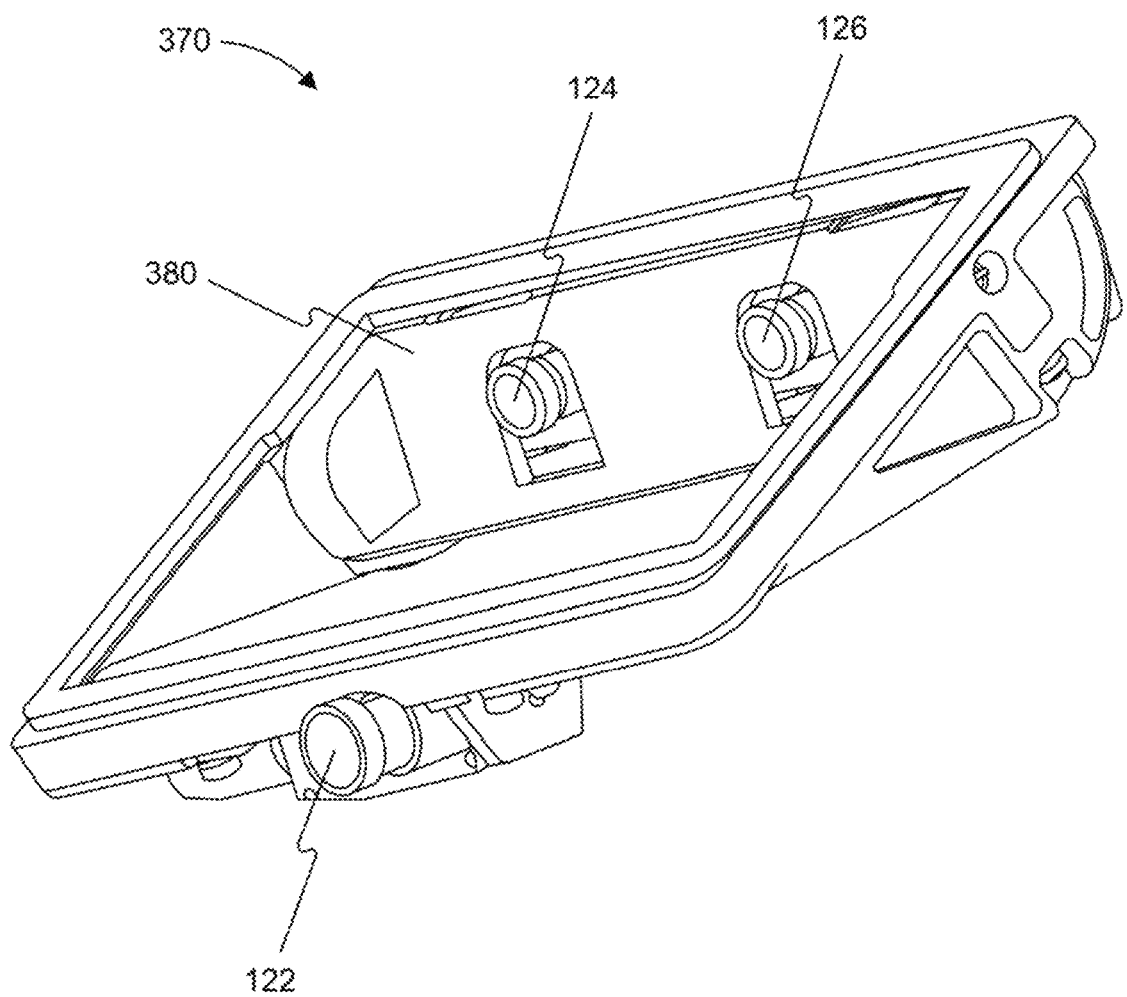
FIG. 3B is an illustration of an example of a camera mount that is configured to be positioned behind a rearview mirror and against a vehicle windshield consistent with the disclosed embodiments.
Figure 3C:
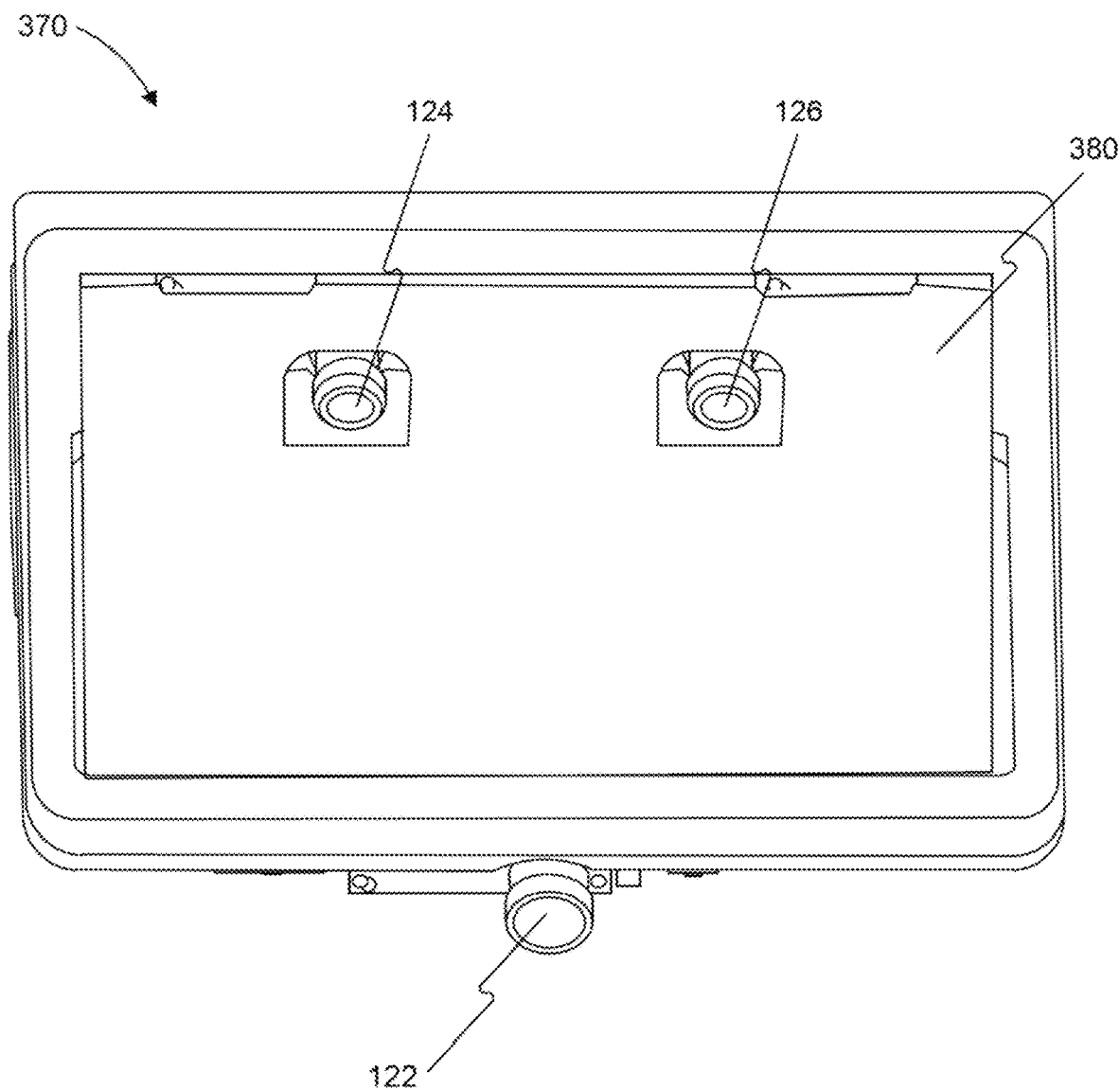
FIG. 3C is an illustration of the camera mount shown in FIG. 3B from a different perspective consistent with the disclosed embodiments.
Figure 3D:
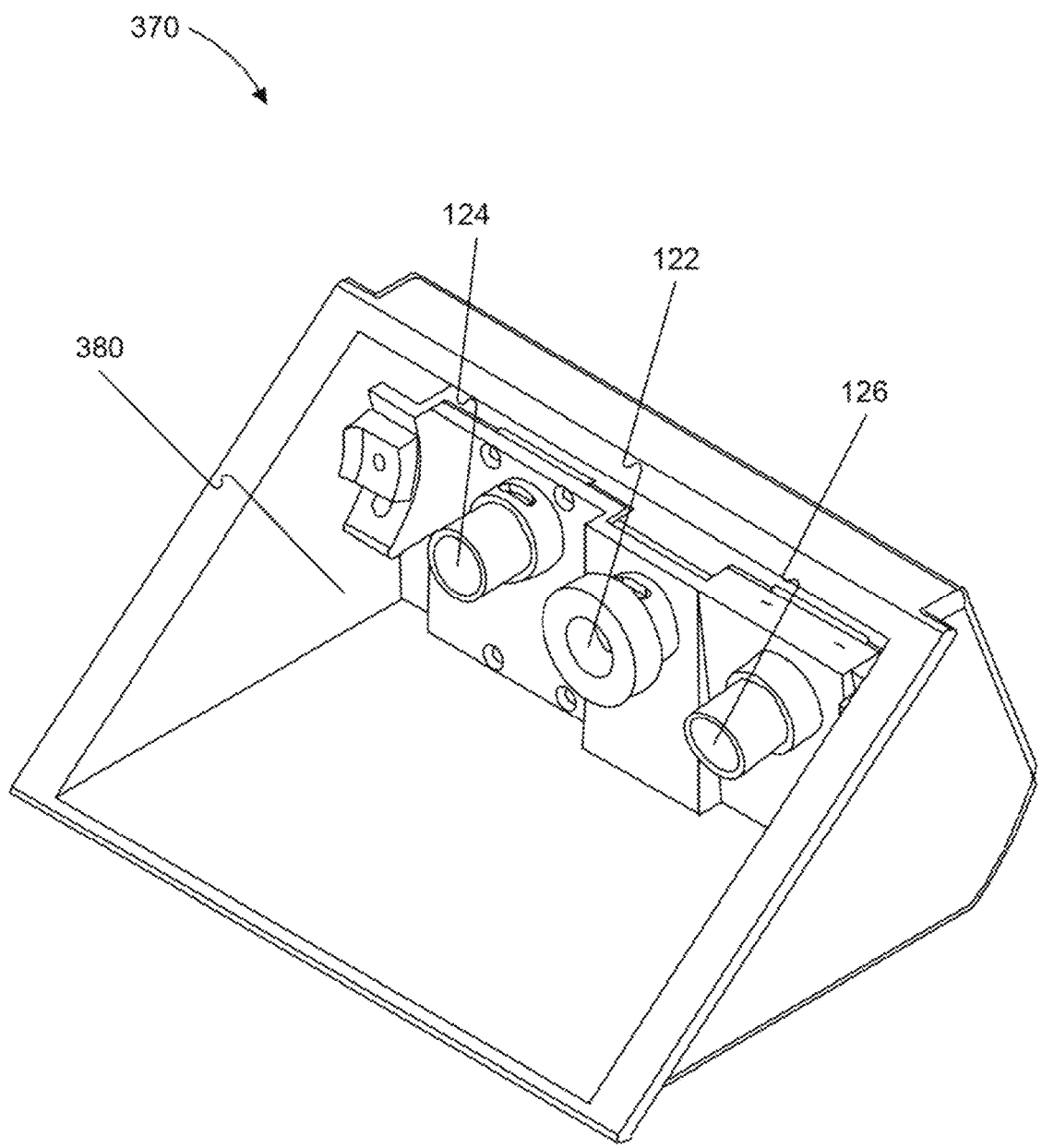
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that it aligns against a vehicle windshield having a matching slope. In some embodiments, each of image capture devices 122, 124, and 126 may be positioned behind glare shield 380, as depicted, for example, in FIG. 3D. In embodiments in which one or more of image capture devices 122, 124, and 126 comprise an infrared image capture device, such devices may be positioned in front of glare shield 380 (or, alternatively, glare shield 380 may not extend in from of the infrared image capture device(s)) in order to prevent such materials from obstructing the intake of infrared light. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, infrared image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras (and/or infrared cameras) facing in the forward direction of a vehicle. In other embodiments, the multi-camera system may include one or more cameras (and/or infrared cameras) facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). Other camera configurations are consistent with the disclosed embodiments, and the configurations disclosed herein are examples. For example, system 100 may include a configuration of any number of cameras (e.g., one, two, three, four, five, six, seven, eight, etc.) and of any combination of types of cameras (e.g., two visual cameras and an infrared camera, a visual camera and two infrared cameras, two visual cameras and two infrared cameras, etc.). Furthermore, system 100 may include "clusters" of cameras. For example, a cluster of cameras (including any appropriate number of cameras, e.g., one, four, eight, etc., and any appropriate types of cameras, e.g., visual, infrared, etc.) may be forward-facing relative to a vehicle, or may be facing any other direction (e.g., reward-facing, side-facing, at an angle, etc.) Accordingly, system 100 may include multiple clusters of cameras, with each cluster oriented in a particular direction to capture images from a particular region of a vehicle's environment.

The first camera may have afield of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. In embodiments in which one or more of the first camera and second camera comprise an infrared camera, the first image processor and/or second image processor may perform a heat map analysis of heat maps provided by the infrared camera(s).

The outputs (e.g., processed information) of the first and second image processors may be combined. In some embodiments, the second image processor may receive images from both the first camera and second camera to perform stereo analysis or to perform analysis on aligned visual and infrared images. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc. Hybrid image analysis may refer to instances where one or more visual images are aligned with one or more infrared images and image analysis is performed based on the aligned image(s).

For example, in one embodiment, system 100 may implement a three camera configuration using image capture devices 122, 124, and 126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122, 124, and 126 may be positioned behind rearview mirror 310 and positioned substantially side-by-side (e.g., 6 cm apart). Further, in some embodiments, as discussed above, one or more of image capture devices 122, 124, and 126 may be mounted behind glare shield 380 that is flush with the windshield of vehicle 200. Such shielding may act to minimize the impact of any reflections from inside the car on image capture devices 122, 124, and 126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122, 124, and 126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from the main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system). Furthermore, in some embodiments, redundancy and validation of received data may be supplemented based on information received from one more sensors (e.g., radar, lidar, acoustic sensors, information received from one or more transceivers outside of a vehicle, etc.).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
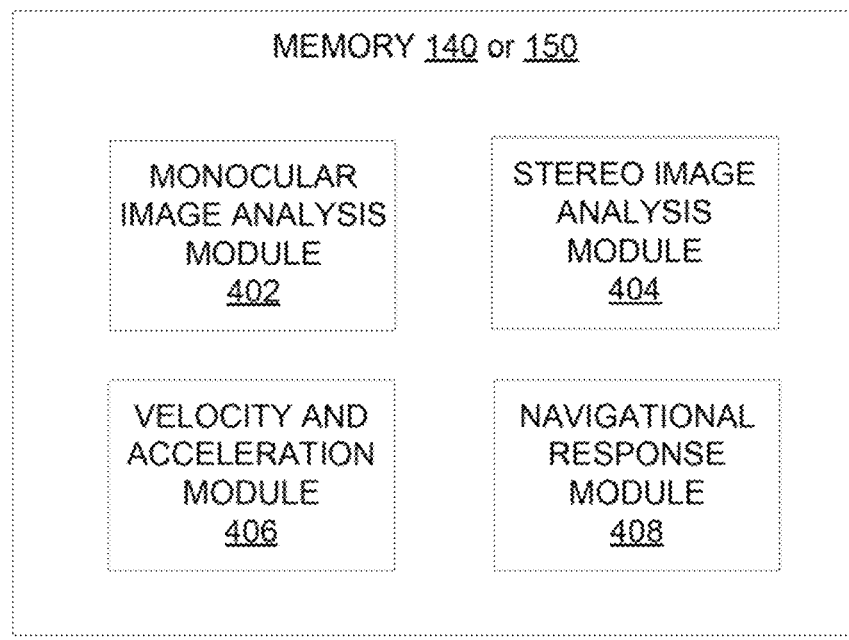
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, applications processor 180 and/or image processor 190 may execute the instructions stored in any of modules 402, 404, 406, and 408 included in memory 140. One of skill in the art will understand that references in the following discussions to processing unit 110 may refer to applications processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar, lidar, etc.) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408. Furthermore, in some embodiments, stereo image analysis module 404 may implement techniques associated with a trained system (such as a neural network or a deep neural network) or an untrained system, such as a system that may be configured to use computer vision algorithms to detect and/or label objects in an environment from which sensory information was captured and processed. In one embodiment, stereo image analysis module 404 and/or other image processing modules may be configured to use a combination of a trained and untrained system.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Furthermore, any of the modules (e.g., modules 402, 404, and 406) disclosed herein may implement techniques associated with a trained system (such as a neural network or a deep neural network) or an untrained system.

Figure 5A:
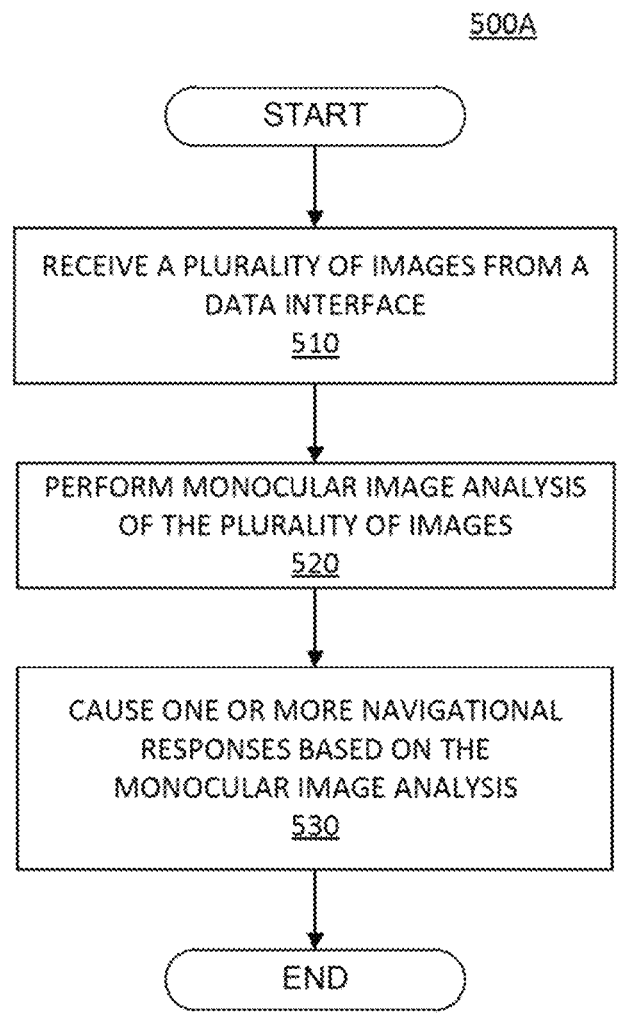
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
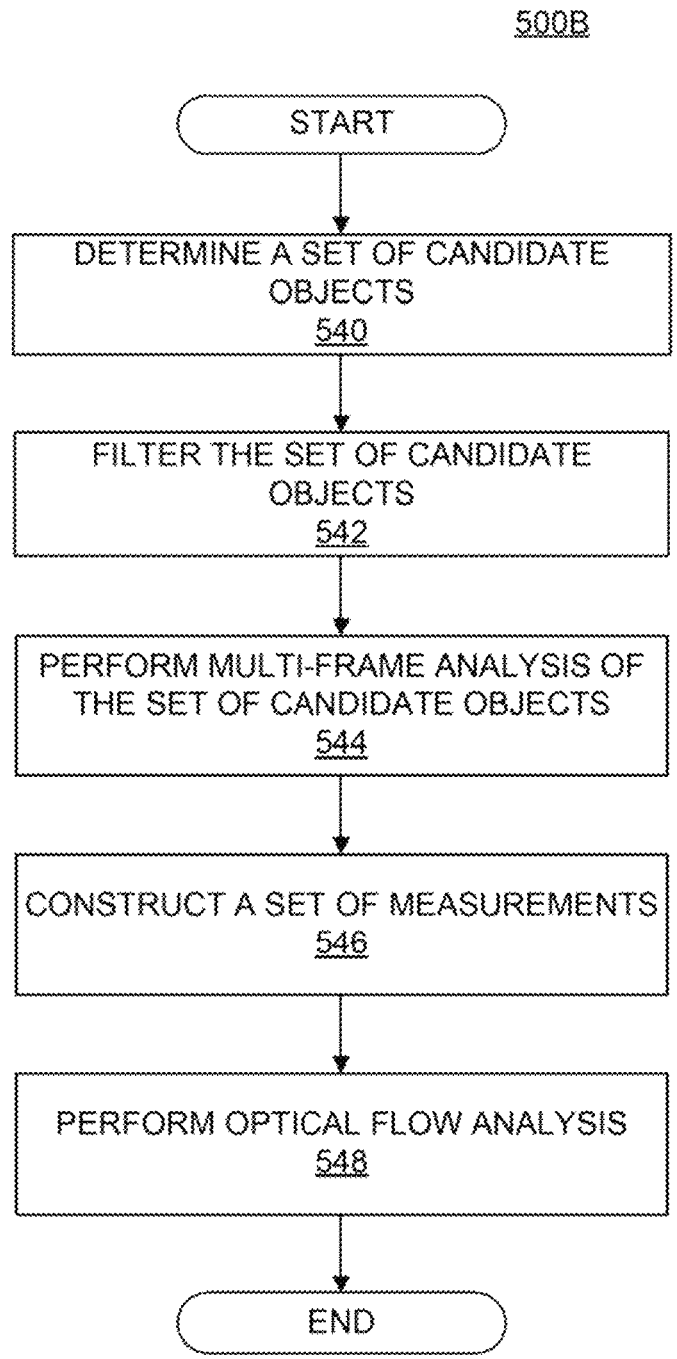
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (e.g., relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540, 542, 544, and 546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540, 542, 544, and 546 to provide redundancy for detecting vehicles and pedestrians and increase the reliability of system 100.

Figure 5C:
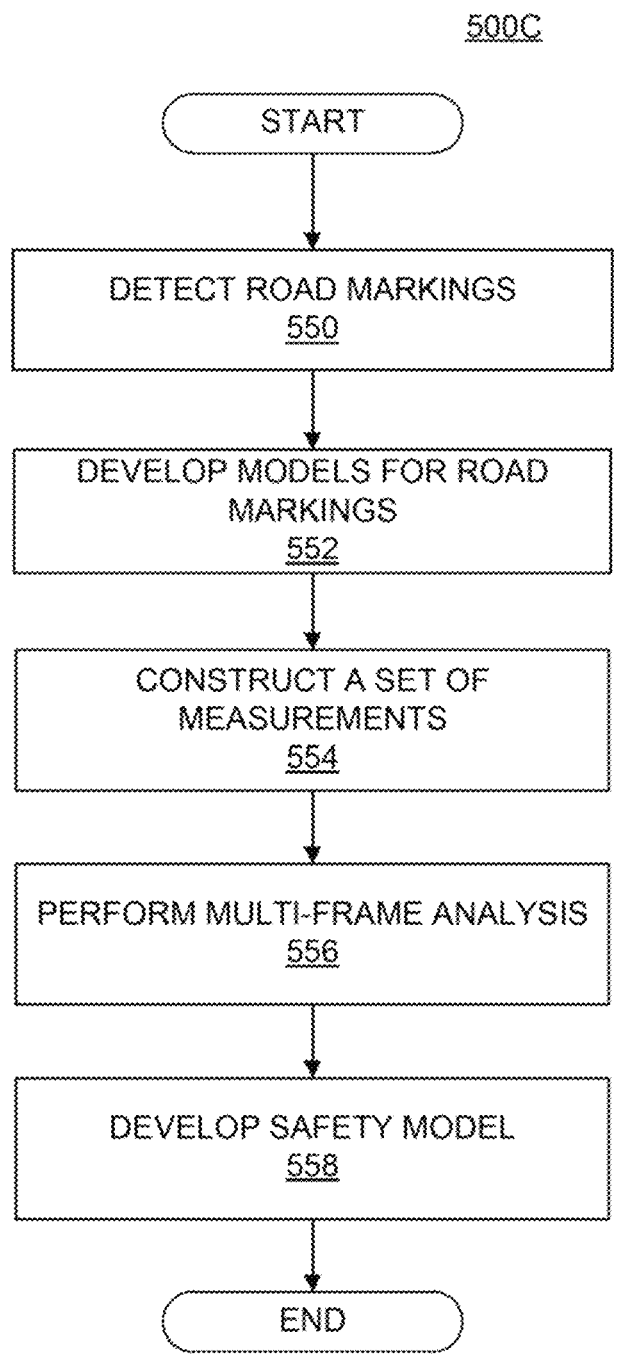
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550-556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
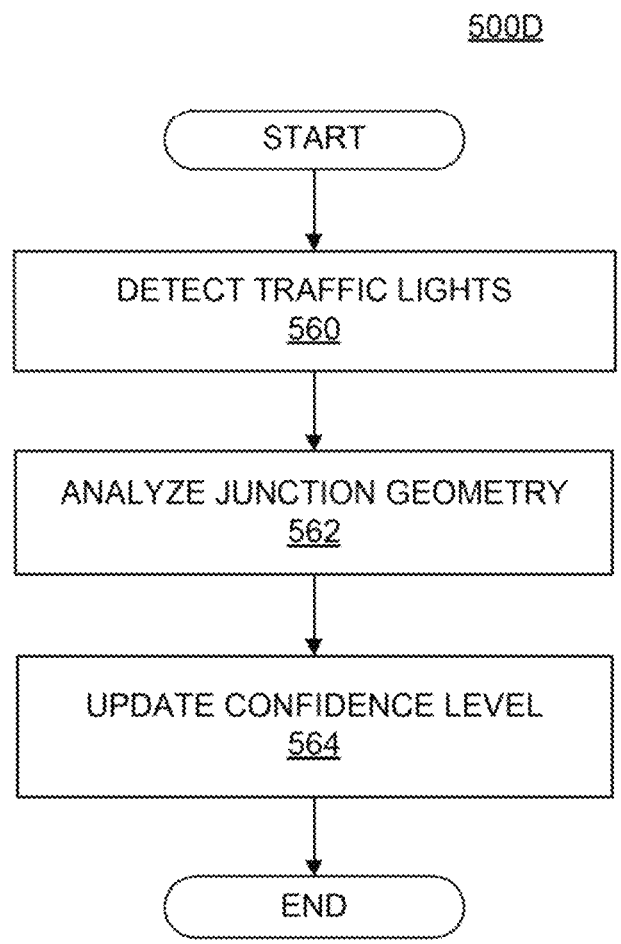
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560, 562, and 564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
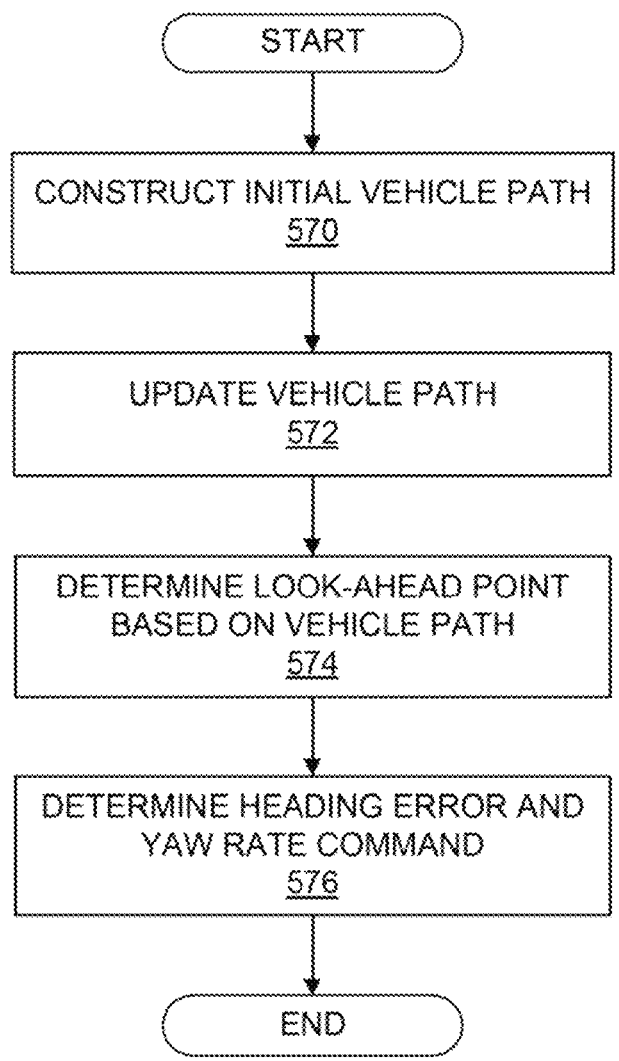
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_1, z_1)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

Figure 5F:
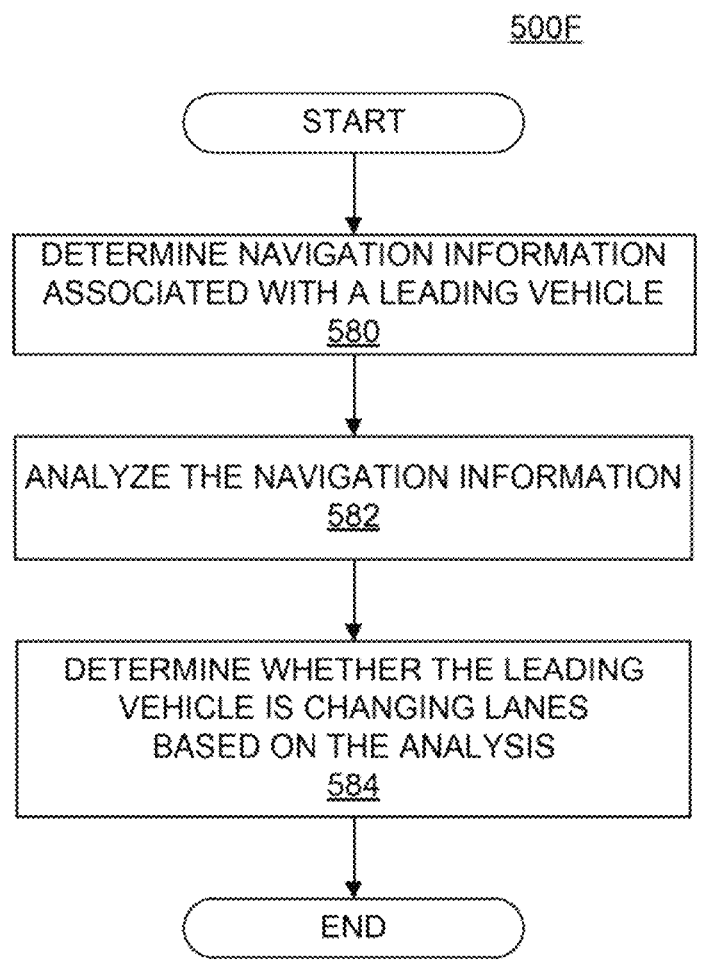
FIG. 5F is a flowchart showing an exemplary process for determining whether a leading vehicle is changing lanes consistent with the disclosed embodiments.

At step 576, processing unit 110 may determine a heading error and yaw rate command based on the look-ahead point determined at step 574. Processing unit 110 may determine the heading error by calculating the arctangent of the look-ahead point, e.g., arctan $(x_1/z_1)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance), FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2 + \delta_x^2)/2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights. Furthermore, in some embodiments, the analysis may make use of trained system (e.g., a machine learning or deep learning system), which may, for example, estimate a future path ahead of a current location of a vehicle based on an image captured at the current location.

Figure 6:
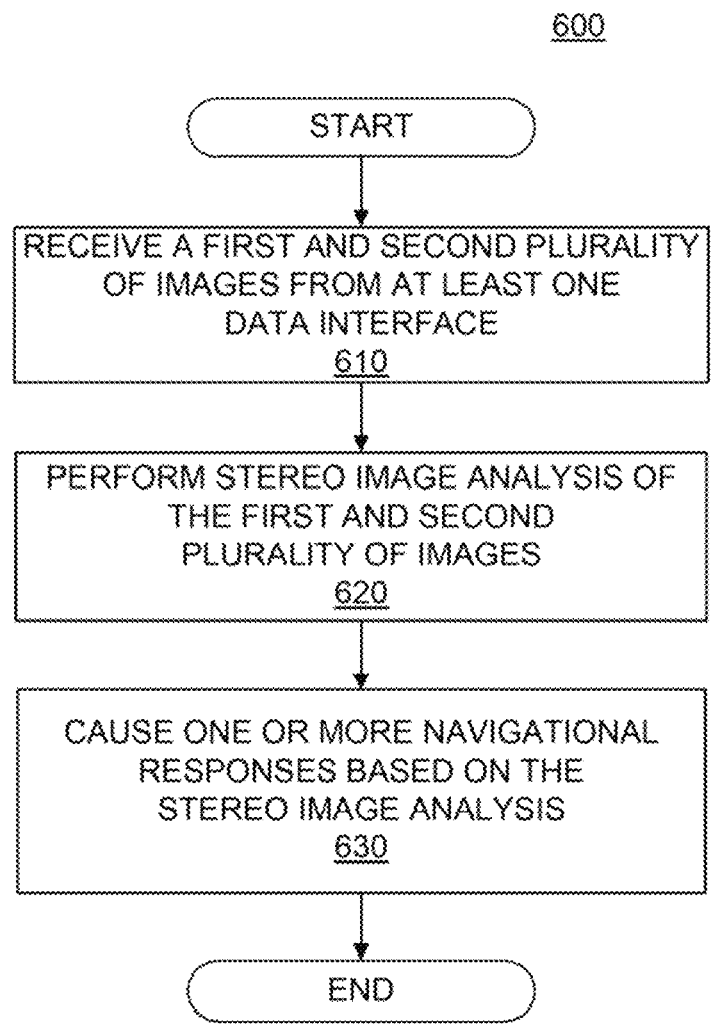
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing in the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
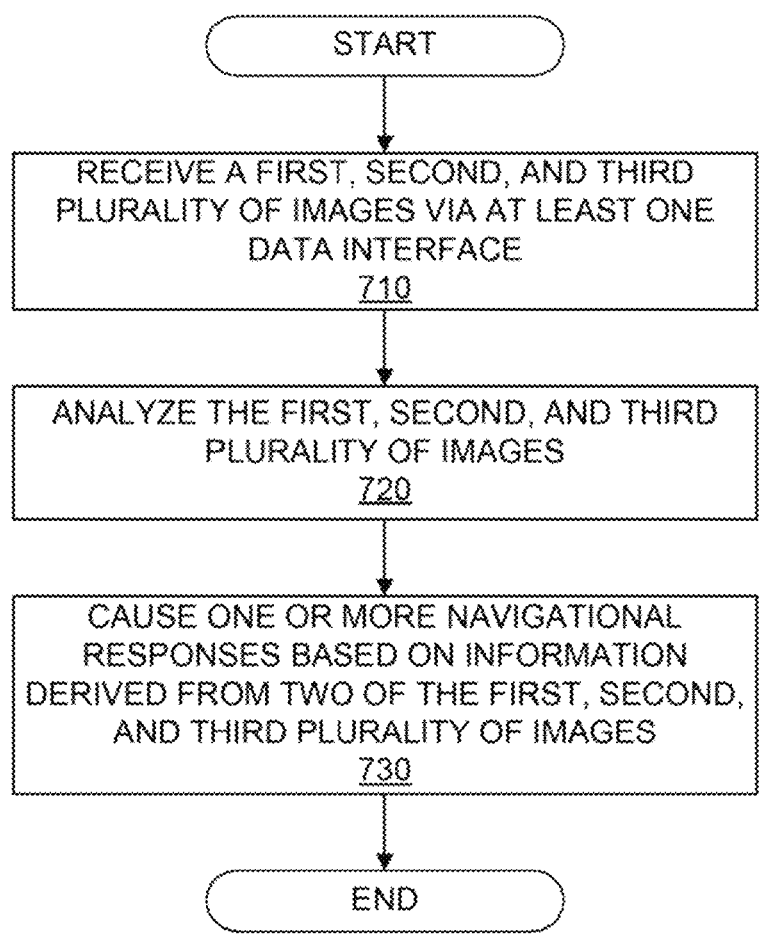
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Analysis of captured images and/or heat maps may allow for detection of particular characteristics of both parked and moving vehicles. Navigational changes may be calculated based on the detected characteristics. Embodiments for detection of particular characteristics based on one or more particular analyses of captured images and/or heat maps will be discussed below with reference to FIGS. 8-28.

Detecting Car Door Opening Events

For example, identification of vehicles followed by identification of wheel components of the identified vehicles may allow for targeted monitoring for door opening events. By targeting the monitoring, the system may identify and react to door opening events with a shorter reaction time than traditional motion detection. Embodiments of the present disclosure described below relate to systems and methods for detecting door opening events using targeted monitoring.

Figure 8:
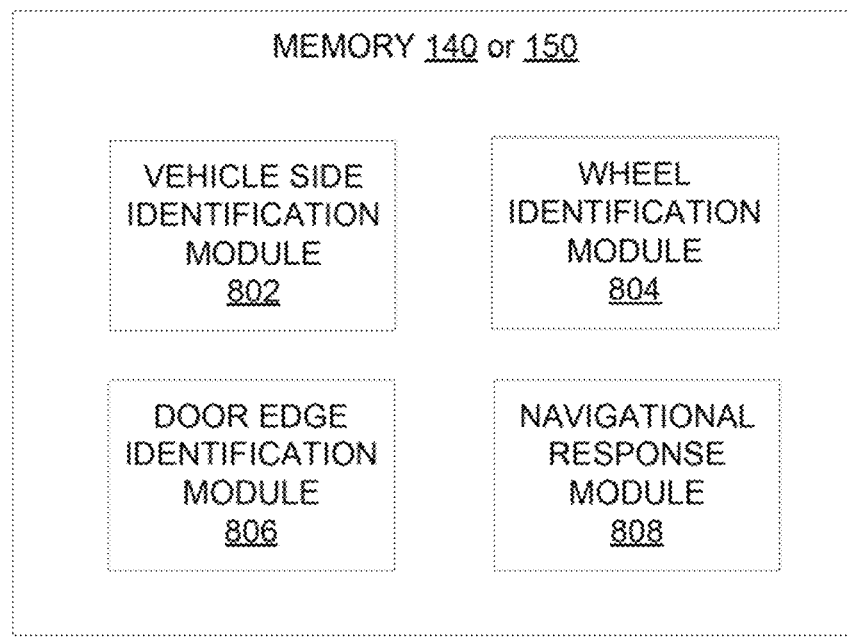
FIG. 8 is another exemplary block diagram of a memory configured to store instructions for performing one or more operations consistent with the disclosed embodiments.

FIG. 8 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 8, memory 140 may store a vehicle side identification module 802, a wheel identification module 804, a door edge identification module 806, and a navigational response module 808. The disclosed embodiments are not limited to any particular configuration of memory 140. Further, applications processor 180 and/or image processor 190 may execute the instructions stored in any of modules 802-808 included in memory 140. One of skill in the art will understand that references in the following discussions to processing unit 110 may refer to applications processor 180 and image processor 190 individually or collectively. Accordingly, steps of any of the following processes may be performed by one or more processing devices.

In one embodiment, vehicle side identification module 802 may store instructions (such as computer vision software) which, when executed by processing unit 110, performs analysis of one or more images acquired by one of image capture devices 122, 124, and 126. As described in connection with FIGS. 9-14 below, vehicle side identification module 802 may include instructions for determining bounding boxes marking the sides of one or more vehicles.

In one embodiment, wheel identification module 804 may store instructions (such as computer vision software) which, when executed by processing unit 110, performs analysis of one or more images acquired by one of image capture devices 122, 124, and 126. As described in connection with FIGS. 9-14 below, wheel identification module 804 may include instructions for determining ellipses marking the wheels of one or more vehicles.

In one embodiment, door edge identification module 806 may store instructions (such as computer vision software) which, when executed by processing unit 110, performs analysis of one or more images acquired by one of image capture devices 122, 124, and 126. As described in connection with FIGS. 9-14 below, door edge identification module 806 may include instructions for identifying the appearance of a door edge and monitoring the movement of an identified door edge.

In one embodiment, navigational response module 808 may store software executable by processing unit 110 to determine a desired navigational response based on data derived from execution of vehicle side identification module 802, wheel identification module 804, and/or door edge identification module 806. For example, navigational response module 808 may cause a navigational change in accordance with method 1400 of FIG. 14, described below.

Furthermore, any of the modules (e.g., modules 802, 804, and 806) disclosed herein may implement techniques associated with a trained system (such as a neural network or a deep neural network) or an untrained system.

Figure 9:
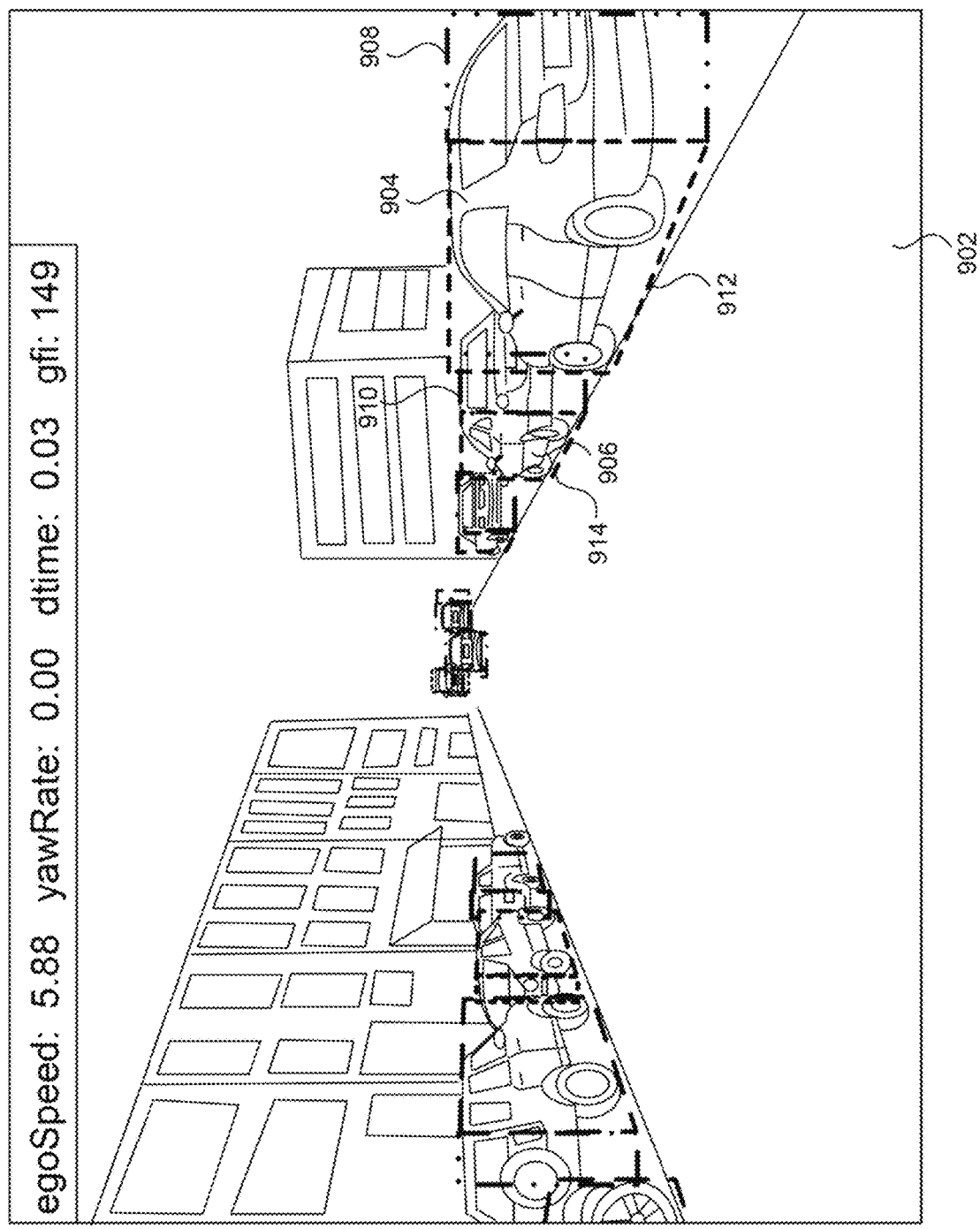
FIG. 9 is a schematic view of a road from a point-of-view of a system consistent with the disclosed embodiments.

FIG. 9 is a schematic view of a road 902 from a point-of-view of a system included in a host vehicle consistent with the disclosed embodiments (e.g., system 100 described above). As depicted in FIG. 9, road 902 may have one or more parked vehicles (e.g., parked vehicle 904 or parked vehicle 906).

System 100 may, for example, detect the parked vehicles using an attention mechanism which returns suspect patches and feeds the suspect patches to a cascade of more and more complex classifiers to determine if the patch is in fact a vehicle. The attention mechanism and classifiers may be trained on true and false patches, as described below.

For example, system 100 may use an attention mechanism to detect the rears of the parked vehicles (e.g., vehicle rears 908 and 910). Using the detected rears, system 100 may then detect the sides of the parked vehicles (e.g., vehicle sides 912 and 914). Once detected, vehicle rears and/or sides may be tracked.

To detect the bounding boxes depicted in FIG. 9, system 100 may input an image (e.g., an image from one of image capture devices 122, 124, or 126) to one or more learned algorithms. The input image may, for example, be an original 1280×9560 grayscale image. The learned algorithm may output a scaled (e.g., 256×192) attention image. From the attention image, suspect patches may be identified and the (x, y) points of the suspect patches may be scaled (e.g., by 5) to map onto the original image coordinates. The learned algorithm may use an (x, y) coordinate to define the center of a suspect patch. The suspect patch may be scanned in the region of the (x, y) coordinate, for example, +/−5 pixels in each direction. In this example, then, each suspect patch produces 11×11 total candidate patches.

Figure 10:
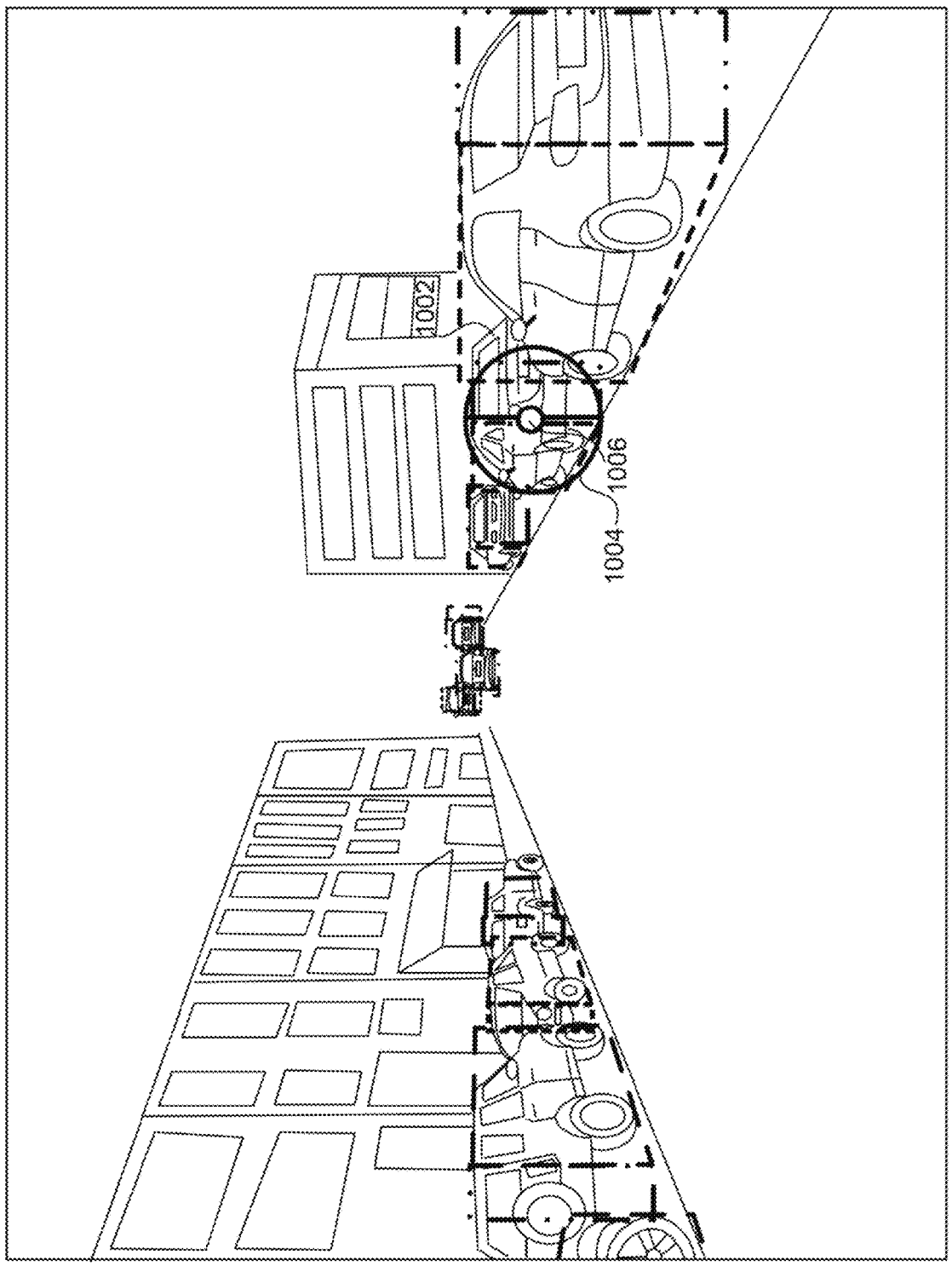
FIG. 10 is another schematic view of a road from a point-of-view of a system consistent with the disclosed embodiments.

Furthermore, in this example, each candidate patch is a square of size 2R+1, where R is the radius of a bounding ellipse. For example, as depicted in FIG. 10, the vehicles (e.g., vehicle 1002) may have associated bounding ellipses (e.g., ellipse 1004) with centers (e.g., center 1006).

The candidate patches may be scaled to a canonical size (such as 40×40) and are used as input to one or more trained networks, e.g., one or more of the convolutional neural networks (CNNs) described below. For example, each of the one or more trained networks may score the input patches. Using the scores, each candidate patch may have a label assigned based on the highest score. (In this example, the radius R and original coordinates ($x_0$, $y_0$) may be used to map the candidate patches back to the original image.)

Each candidate patch having a highest score above a threshold (which may be preset or variable and may be learned from training) may then be input to a final classifier. The final classifier may output (x, y) coordinates of three points on the bottom of the bounding box. These coordinates may be scaled back to original image coordinates by multiplying by an appropriate factor. In the example discussed above, the appropriate scaling factor may be (2R+1)/40. In addition to using a scaling factor, the actual location ($x_0$, $y_0$) may be added to the scaled coordinates (x, y). Using the unique label, the system may determine which two of the three (x, y) coordinates belong to the side (and which side) and which two of the three (x, y) coordinates belong to the rear or front.

One skilled in the art would recognize that variations on this example algorithm are possible. For example, the size of the scaled attention image may vary, the shifting of the suspect patches may vary, the size of the candidate patches may vary, etc. By way of further example, the upper coordinates of the bounding box may also be computed. (In such an example, the final classifier may output the (x, y) coordinates of three additional points.) In addition, other algorithms are possible, either in lieu of or in combination with the example algorithm discussed above. For example, other algorithms may include different and/or additional classifiers.

As explained above, the attention mechanism and subsequent classifiers may be trained. For example, a training mechanism may employ over one million example images that, for example, may be 1280×960 grayscale images. In this example training set, the visible faces of the bounding box may be marked as left, right, rear, or front. For example, they may be shown as yellow, blue, red, and green, respectively. If a face is partially visible, only the unobscured part may be marked in the image and the partial obstruction noted in the database.

In this training example, for each bounding box, the system may calculate the two most distant edges of the bounding box and construct a bounded ellipse centered between the two edges and with a radius as the distance to the farthest edges.

In this training example, the system may then extract the attention image from the whole, the attention image being a 256×192 image (that is, reduced by a factor of 5). Each vehicle marked in the training image may be replaced by one point in the attention image located at the coordinates of the center of the ellipse divided by 5, and the value of the point may be the radius of the bounding ellipse.

In this training example, the examples images may be used to train a convolutional neural network (CNN). One skilled in the art would recognize that other machine training techniques may be used either in lieu of or in conjunction with the CNN. The neural network may thus map the original image to the sparse, reduced resolution attention image. This approach may combine scene understanding (e.g., the location of the road, the image perspective) with the local detection of something that looks like a car. Other design choices are possible. For example, the network may first apply a filter bank designed to detect cars in places that cars are expected (e.g., not in the sky).

The neural network may send suspect patches to a first classifier that may score for each possible view. For example, the first classifier may assign one of four main labels: LeftRear, LeftFront, RightRear, RightFront. If only one face is visible, then one of the two possible labels may be assigned randomly. Each main label may be further subdivided. For example, each main label may be subdivided into whether the patch contains more "side" than "end" or vise versa. Such a subdivision may be made, for example, by comparing the image width of the marked side and end faces. If the widths are equal, then the subdivision may be assigned randomly.

By way of further example, each subdivision may be further divided into three sub-subdivisions. For example, the "side" subdivision of the LeftRear label may contain three sub-subdivisions: "end" LeftRear10 may designate patches where the rear face is 10% or less the width of the left face; "end" LearRear50 may designate patches where the rear face is more than 10% but less than 50%; and "end" LeftRear may designate patches where the rear face is more than 50%.

By way of further example, each sub-subdivision may further be labeled if at least one face is obscured. In this example, the total combinations of sub-subdivisions and labels is 48. One skilled in the art would recognize that other means of divisions and labels that result in the same or different total combinations are possible. For example, "side" LeftRear20 may designate patches where the left face is less than 20% of the total; "side" LeftRear50 may designate patches where the left face is 20% to 50% of the total; "side" LeftRear80 may designate patches where the left face is 50% to 80% of the total; and "side" LeftRear100 may designate patches where the left face is 80% to 100% of the total.

By way of further example, the four main labels may be replaced by two main labels: 'side/end' and 'end/side,' depending on whether the side face is viewed on the left or right of the end face, respectively. The choice of divisions and labels depends on the amount of available data because, for larger numbers of subdivisions and labels, a larger number of examples is required for training.

The neural network may thus input to the first classifier a patch centered around a point in the attention map scaled back to the original image coordinates and exhaustively shifted +/−5 pixels in x and y directions. Such a shifting generates 121 shifted examples. One skilled in the art would recognize that other means of generating shifted examples are possible. For example, the patch may be exhaustively shifted +/−4 (or +/−3 or the like) pixels in x and y directions.

In this example, each patch may be formed using the radius of the bounding ellipse R to cut a square of size 2R+1 by 2R+1 scaled to a canonical size (such as 40×40 pixels). One skilled in the art would recognize that other means of generating patches are possible. For example, a square of size 2R−1 by 2R−1 may be cut. By way of further example, one or more lengths of the bounding box may be used in place of 2R.

The neural network may input each labeled patch to a final classifier. The final classifier may output the location (x, y) in the labeled patch of each of three points defining the bottom of the bounding box. The output (x, y) coordinates may be relative to the patch. In some embodiments, a neural network may be trained for each combination of subdivisions and labels. In other embodiments, fewer neural networks may be trained.

Figure 11:
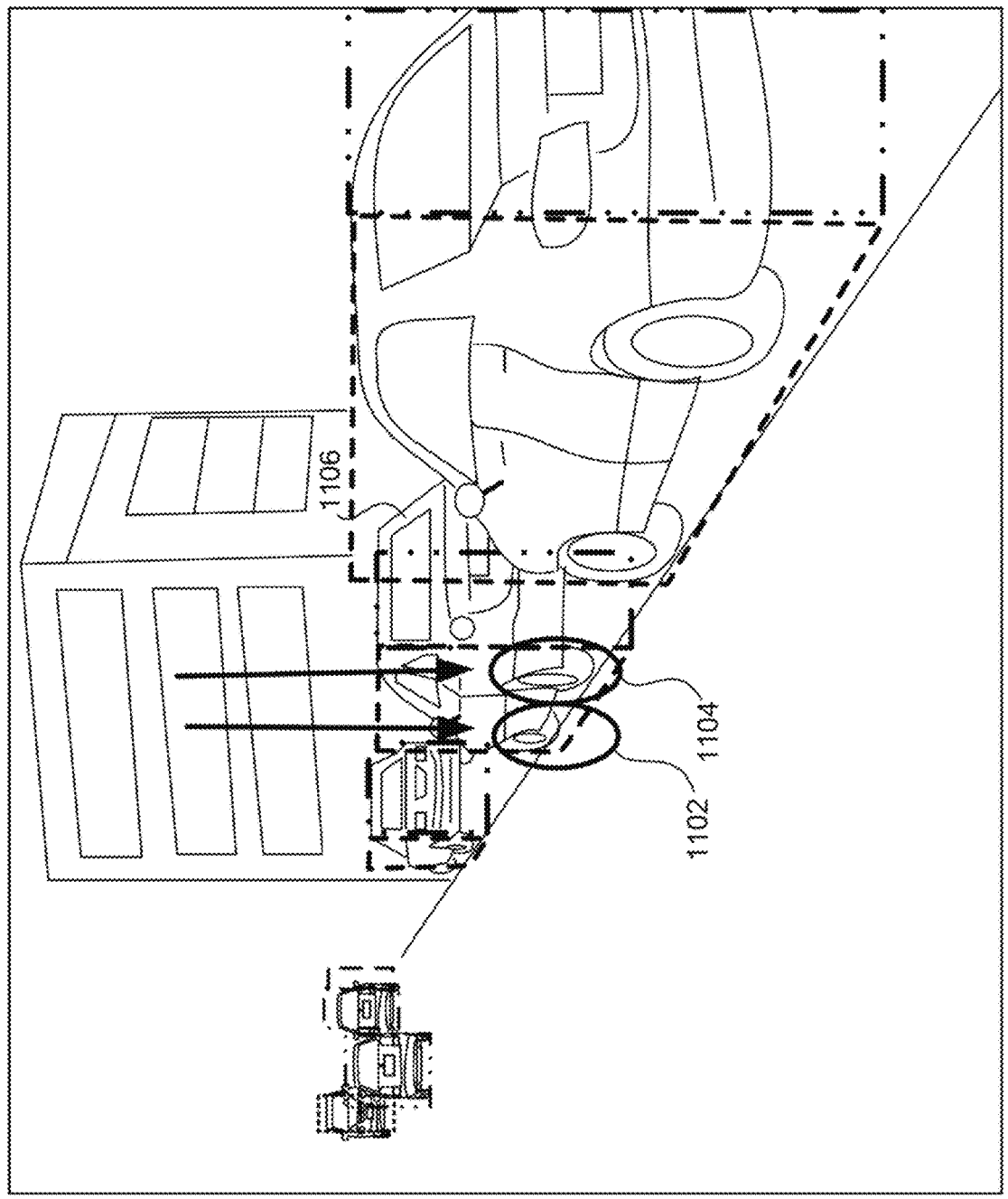
FIG. 11 is a schematic view of a parked car from a point-of-view of a system consistent with the disclosed embodiments.

Similar learning techniques may be used to train classifiers for extracting more specific features from identified vehicles. For example, classifiers may be trained to identify wheels, tires, the 'A' pillar, a side view mirror, or the like. In the example of FIG. 11, wheels 1102 and 1104 of vehicle 1106 have been marked with ellipses. The system may, for example, draw the ellipses by scaling the bounding box to a canonical size (e.g., 40 pixels length and 20 pixels height) and inputting the scaled box to an appropriate classifier.

Figure 12A:
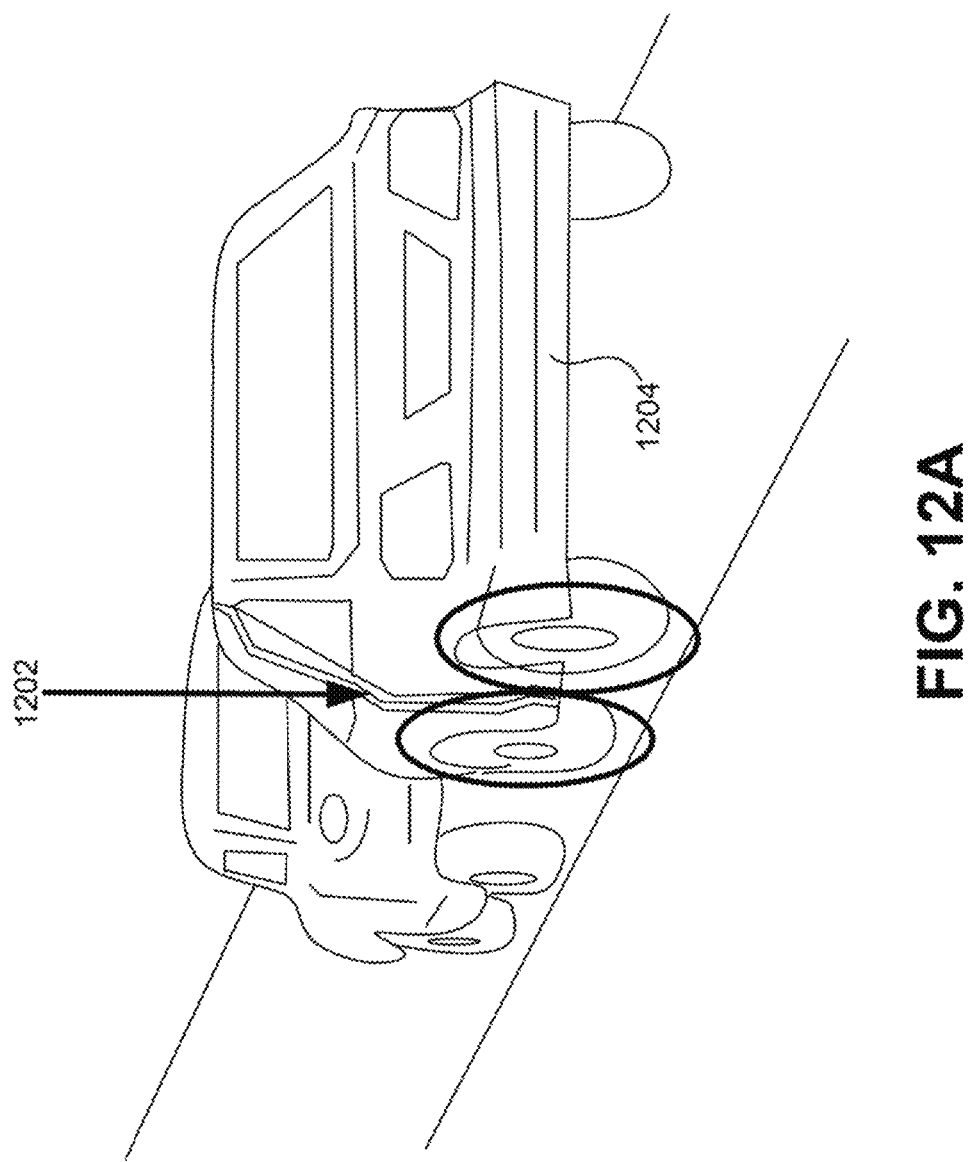
FIG. 12A is a schematic view of a door opening event from a point-of-view of a system consistent with the disclosed embodiments.

Based on identification of the wheels, the system may determine one or more "hot spots" on the identified vehicle where door opening events may be expected to occur. For example, one or more hot spots may be located between the identified tires and/or above the rear identified tire. As depicted in FIG. 12A, the one or more hot spots may be monitored for the appearance of a vertically oriented stripe 1202 on vehicle 1204. The appearance of strip 1202 may indicate the beginning of a door opening event.

In some embodiments, the system may use one or more features on vehicle 1204 as fiducial points to track the motion of the edges of stripe 1202 relative to a side of vehicle 1204. For example, the one or more features may include the identified tires or other identified features such as a front edge of vehicle 1204, one or more taillights of vehicle 1204.

Figure 12B:
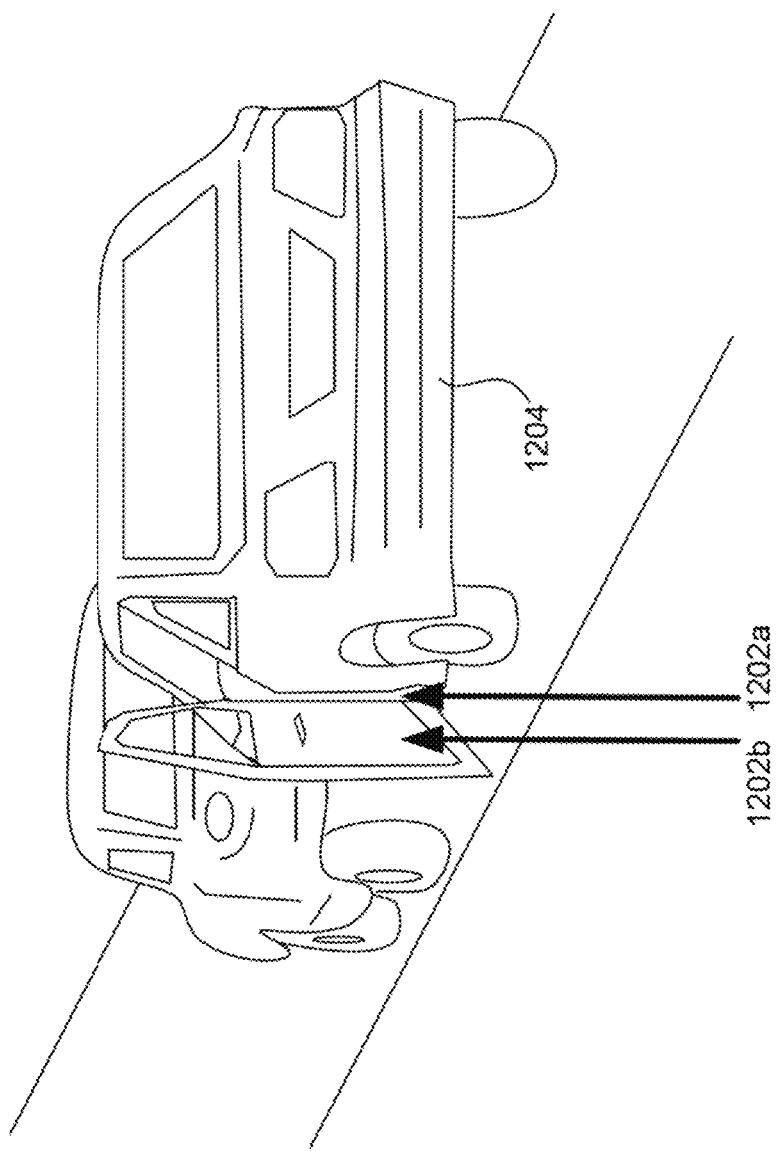
FIG. 12B is another schematic view of a door opening event from a point-of-view of a system consistent with the disclosed embodiments.

As depicted in FIG. 12B, stripe 1202 may expand as a door of vehicle 1204 opens. Edge 1202a of stripe 1202 may be fixed in position along the body of vehicle 1204 while edge 1202*b* of stripe 1202 may appear to move towards the front of vehicle 1204. The system may thus confirm the presence of a door opening event based on monitoring of stripe 1202.

Figure 13:
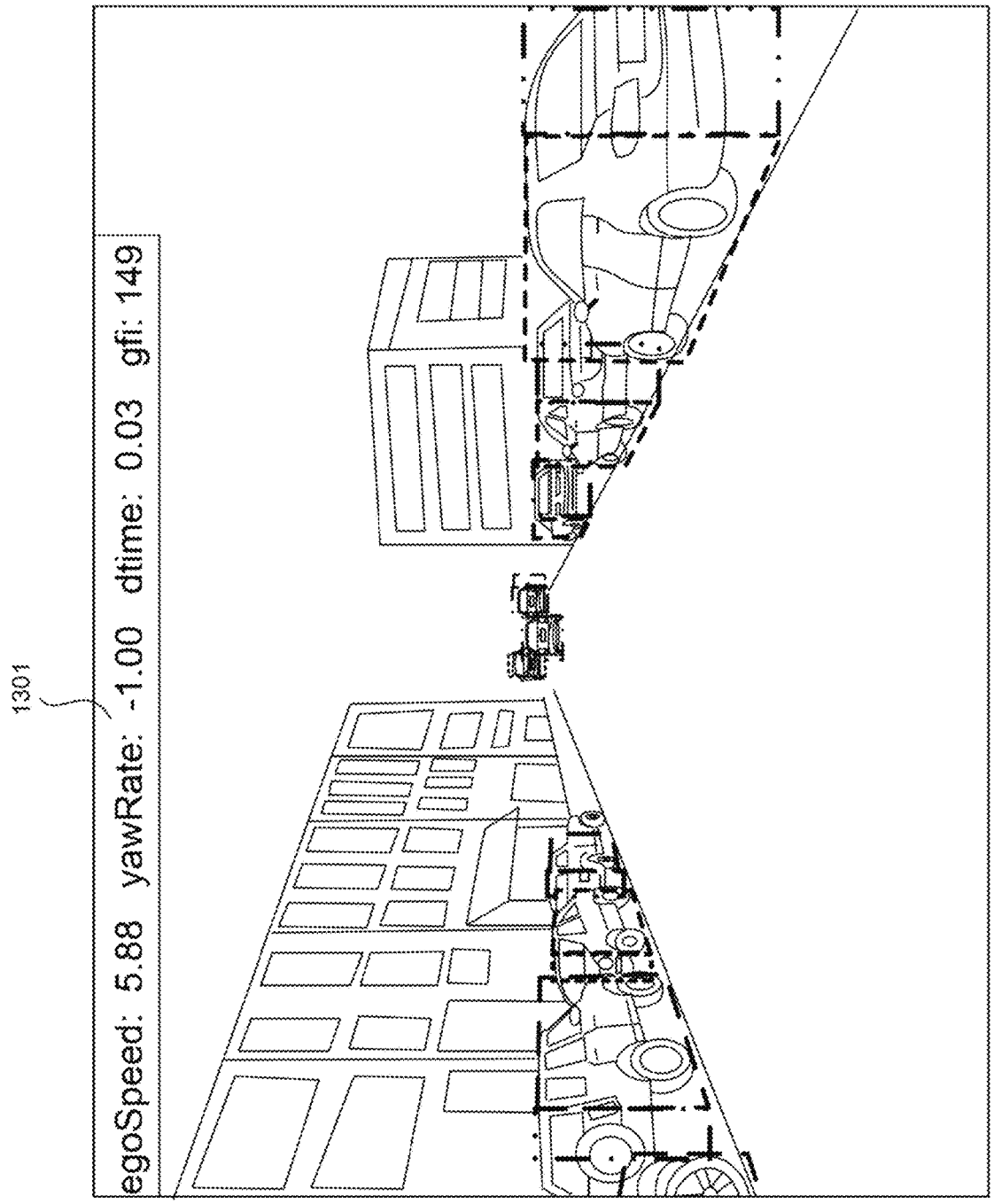
FIG. 13 is another schematic view of a road from a point-of-view of a system consistent with the disclosed embodiments.

Based on the presence of a door opening event, the host vehicle may undergo a navigational change. For example, as depicted in FIG. 13, the yaw 1301 of the host vehicle has changed, indicating that the host vehicle is moving away from a door opening event.

Figure 14:
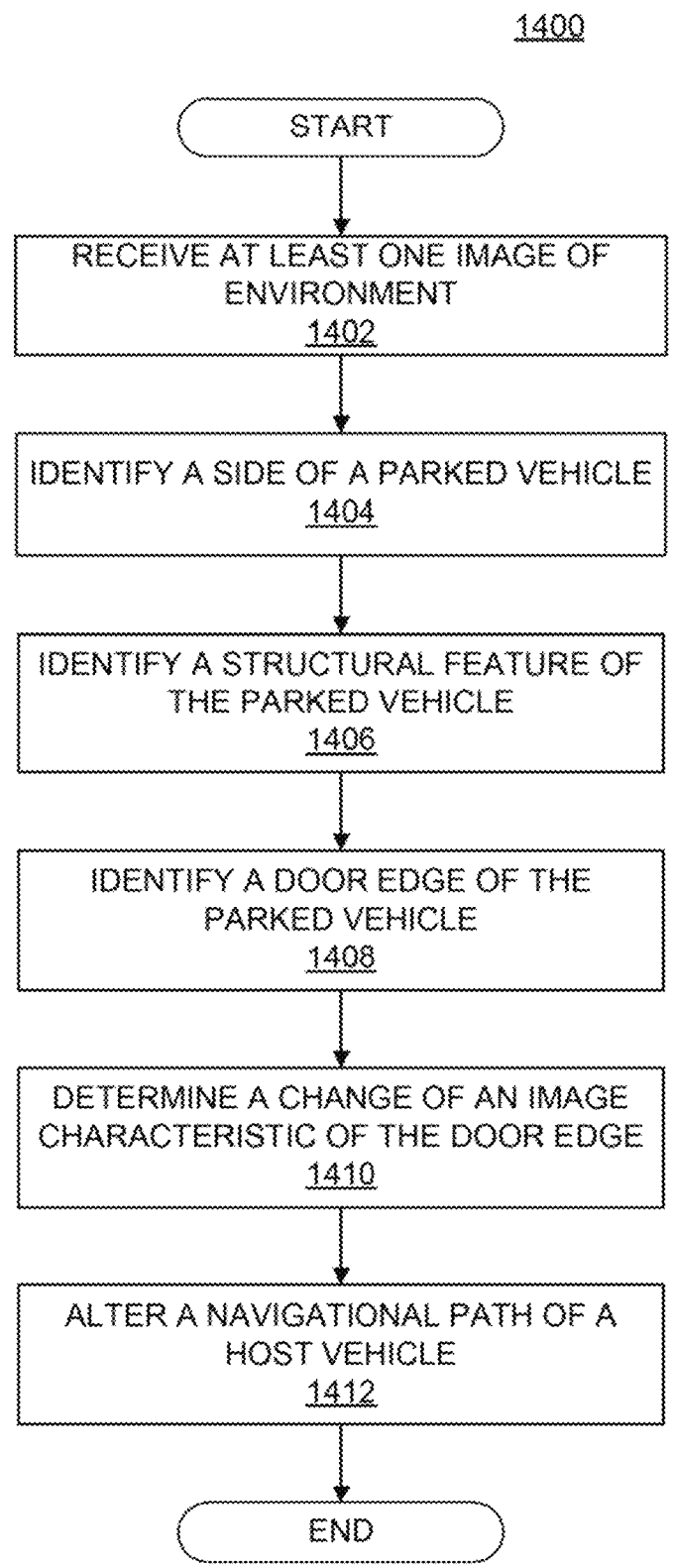
FIG. 14 is a flowchart showing an exemplary process for causing one or more navigational responses based on detection of a door opening event consistent with the disclosed embodiments.

FIG. 14 is a flowchart showing an exemplary process 1400 for causing one or more navigational responses based on detection of a door opening event, consistent with disclosed embodiments. At step 1402, processing unit 110 may receive at least one image of an environment of a host vehicle via data interface 128. For instance, cameras included in image acquisition unit 120 (such as image capture devices 122, 124, and 126 having fields of view 202, 204, and 206) may capture at least one image of an area forward and/or to the side of the host vehicle and transmit them over a digital connection (e.g., USB, wireless, Bluetooth, etc.) to processing unit 110.

At step 1404, processing unit 110 may analyze the at least one image to identify a side of a parked vehicle. Step 1404 may further include associating at least one bounding box with a shape of the side of the parked vehicle. For example, the analysis may be performed using a learned algorithm as discussed above with reference to FIGS. 9 and 10.

At step 1406, processing unit 110 may identify a structural feature of the parked vehicle. In some embodiments, processing unit 110 may identify a first structural feature of the parked vehicle in a forward region of the side of the parked vehicle and a second structural feature of the parked vehicle in a rear region of the side of the parked vehicle. For example, a structural feature may include a wheel component (such as a tire, hubcap, or wheel structure), a mirror, an 'A' pillar, a 'B' pillar, a 'C' pillar, or the like. The first and/or second structural features may be identified in a region in the vicinity of the identified side. For example, the analysis may be performed using a learned algorithm as discussed above with reference to FIG. 11.

At step 1408, processing unit 110 may identify a door edge of the parked vehicle. The door edge may be identified in a region in the vicinity of the structural feature(s). For example, in embodiments in which processing unit 110 identifies a front wheel component and a rear wheel component, the vicinity of the first and second wheels may include a region between the front wheel component and the rear wheel component. By way of further example, in embodiments in which processing unit 110 identifies a front wheel component and a rear wheel component, the vicinity of the first and second wheel components may include a region above the rear wheel component. The analysis may be performed using a learned algorithm as discussed above with reference to FIG. 12A.

At step 1410, processing unit 110 may determine a change of an image characteristic of the door edge. For example, processing unit 110 may monitor at least two images received from the image capture device for an appearance of a vertical stripe in the vicinity of the first and second wheel components as discussed above with reference to FIG. 12B. In this example, a first edge of the vertical stripe is fixed along a body of the parked vehicle in the monitored images, and a second edge of the vertical stripe moves toward a front region of the parked vehicle in the monitored images. After appearing, the width of the door edge (that is, the width of the vertical stripe) may then be tracked over time. In some embodiments, the change of an image characteristic of the door edge may include a widening of the door edge. In such embodiments, determining the change of an image characteristic of the door edge may include monitoring an expansion of the vertical stripe.

In some embodiments, processing unit 110 may estimate the amount of door opening. For example, processing unit 110 may extend the column of the fixed edge to intersect the bounding box and use the y coordinate of the intersection to estimate the distance to the door. In this example, the distance to the door and the width of the stripe may be used to estimate the amount of door opening. Accordingly, processing unit 110 may determine a distance that the door edge extends away from the parked vehicle based on the determined width. Accordingly, the separation of the door edge from the body of the vehicle (that is, the amount of door opening) may be tracked over time.

At step 1412, processing unit 110 may alter a navigational path of the host vehicle. For example, navigational responses may include a turn (as depicted in FIG. 13), a lane shift, a change in acceleration, and the like. Processing unit 110 may cause the one or more navigational responses based on the determination performed at step 1410. For example, processing unit 110 may move the host vehicle away from the door edge event and/or decelerate the host vehicle in response to the door edge event. In this example, processing unit 110 may determine a lateral safety distance for the host vehicle based on the determined distance that the door edge extends away from the parked vehicle, and the alteration of the navigational path of the host vehicle may be based, at least in part, on the determined lateral safety distance. In another example, processing unit 110 may determine a lateral safety distance for the host vehicle based on a predefined value, such as a value which corresponds to a typical extent of a protrusion that is associated with a vehicle's door opening. Further, by way of example, a different predefined value may be used for different types of vehicles and, for example, for other sizes of vehicles, such as a truck, a larger predefined safety distance value may be used, compared to the safety distance value that is used for a smaller vehicle.

Processing unit 110 may also use data derived from execution of velocity and acceleration module 406 to cause the one or more navigational responses. Multiple navigational responses may occur simultaneously, in sequence, or any combination thereof. For example, the navigational response may be determined by a trained system. Further, by way of example, the trained system may be configured to avoid compromising certain safety constraints while optimizing performance, and the trained system may be configured to react to a door opening detection by invoking a navigational change. In another example, a set of rules may be used to determine a desired response when a door opening (of a parked car) event is detected.

Detecting a Vehicle Entering a Host Vehicle's Lane

Systems and methods that identify road homography and identify wheel components of the vehicles may allow for targeted monitoring for movement of the vehicles. By targeting the monitoring, the system may identify and react to motion into a host vehicle's lane, either from another lane or from a parked position, with a shorter reaction time, at least under certain circumstances, than traditional motion detection. Embodiments of the present disclosure described below relate to systems and methods for detecting a vehicle entering a host vehicle's lane using targeted monitoring.

Figure 15:
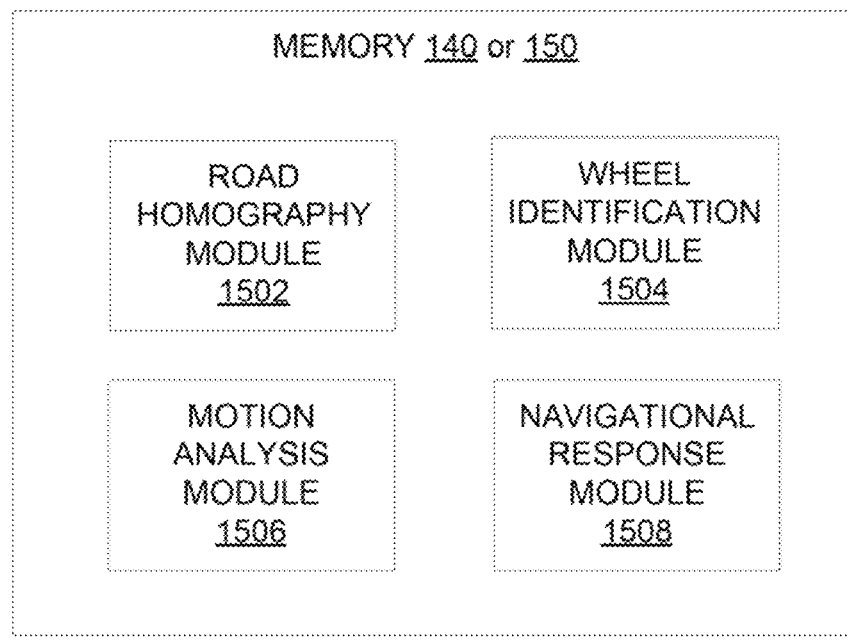
FIG. 15 is another exemplary block diagram of a memory configured to store instructions for performing one or more operations consistent with the disclosed embodiments.

FIG. 15 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 15, memory 140 may store a road homography module 1502, a wheel identification module 1504, a motion analysis module 1506, and a navigational response module 1508. The disclosed embodiments are not limited to any particular configuration of memory 140. Further, applications processor 180 and/or image processor 190 may execute the instructions stored in any of modules 1502-1508 included in memory 140. One of skill in the art will understand that references in the following discussions to processing unit 110 may refer to applications processor 180 and image processor 190 individually or collectively. Accordingly, steps of any of the following processes may be performed by one or more processing devices.

In one embodiment, road homography module 1502 may store instructions (such as computer vision software) which, when executed by processing unit 110, warps the homography of a road in one or more images acquired by one of image capture devices 122, 124, and 126. For example, road homography module 1502 may include instructions for executing method 1800 of FIG. 18, described below.

In one embodiment, wheel identification module 1504 may store instructions (such as computer vision software) which, when executed by processing unit 110, performs analysis of one or more images acquired by one of image capture devices 122, 124, and 126. As described in connection with FIGS. 9-14 above, wheel identification module 1504 may include instructions for determining ellipses marking the wheels of one or more vehicles.

In one embodiment, motion analysis module 1506 may store instructions (such as computer vision software) which, when executed by processing unit 110, performs analysis of one or more images acquired by one of image capture devices 122, 124, and 126 (and/or of one or more images processed by road homography module 1502) to track the motion of one or more identified vehicle components. For example, in combination with wheel identification module 1504, motion analysis module 1506 may track the motion of an identified wheel component of a vehicle over time.

In one embodiment, navigational response module 1508 may store software executable by processing unit 110 to determine a desired navigational response based on data derived from execution of road homography module 1502, wheel identification module 1504, and/or motion analysis module 1506. For example, navigational response module 1508 may cause a navigational change in accordance with method 1700 of FIG. 17, described below.

Furthermore, any of the modules (e.g., modules 1502, 1504, and 1506) disclosed herein may implement techniques associated with a trained system (such as a neural network or a deep neural network) or an untrained system.

Figure 16A:
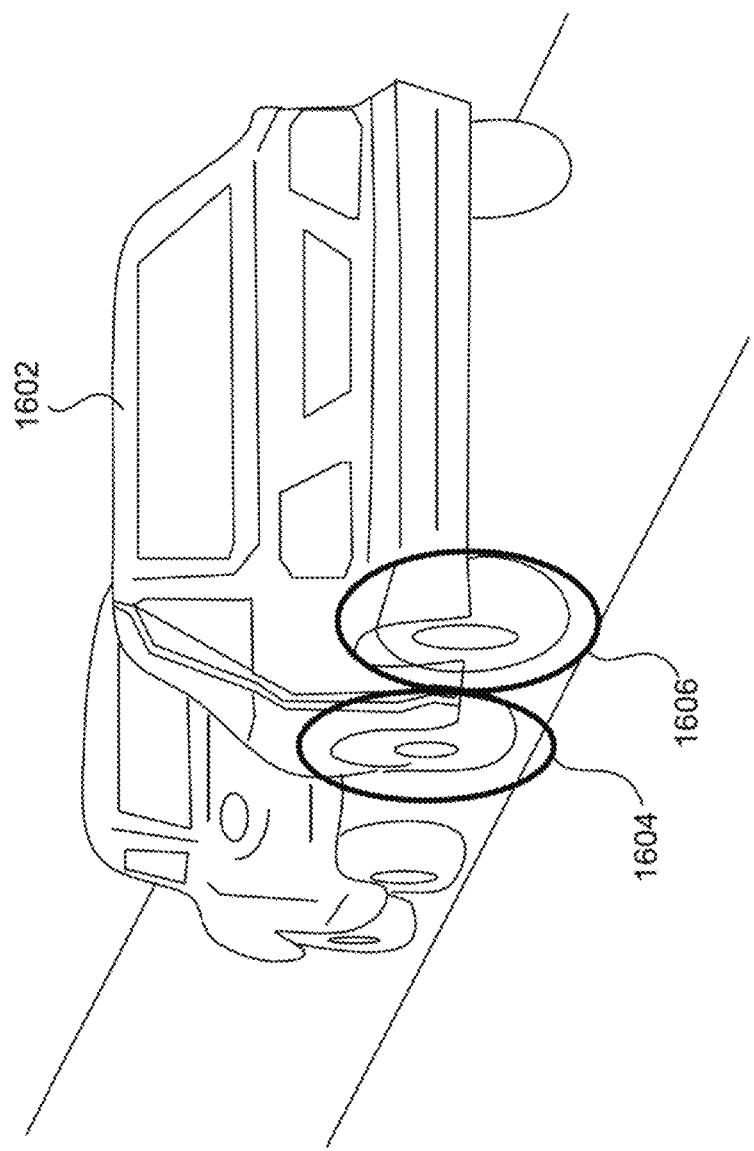
FIG. 16A is a schematic view of a parked car from a point-of-view of a system consistent with the disclosed embodiments.

FIG. 16A depicts a parked car 1602 from a point-of-view of a system consistent with the disclosed embodiments. In the example of FIG. 16A, wheels 1604 and 1606 of vehicle 1602 have been marked with ellipses. The system may, for example, draw the ellipses by scaling the bounding box to a canonical size (e.g., 40 pixels length and 20 pixels height) and inputting the scaled box to an appropriate classifier, as described above.

Figure 16B:
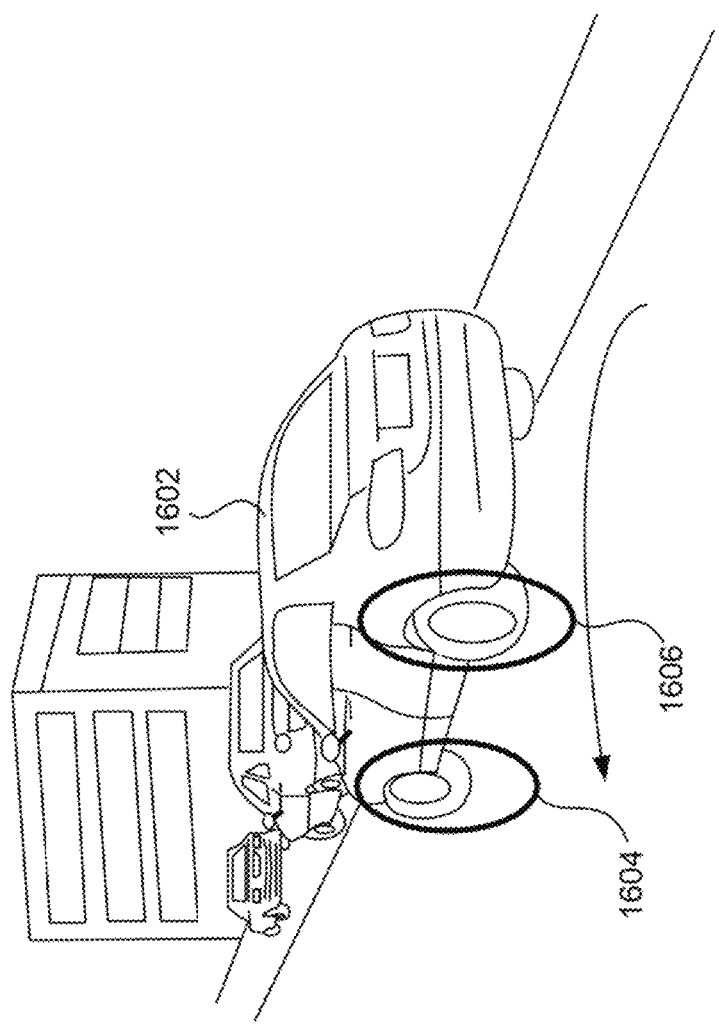
FIG. 16B is another schematic view of a parked car from a point-of-view of a system consistent with the disclosed embodiments.

FIG. 16B depicts vehicle 1602 pulling away from a parked (that is, stationary) state. In the example of FIG. 16, wheels 1604 and 1606 of vehicle 1602 are now rotating as vehicle 1602 moves. The system may track the rotation of wheels 1604 and 1606, as discussed below, to determine that vehicle 1602 is moving.

Figure 17:
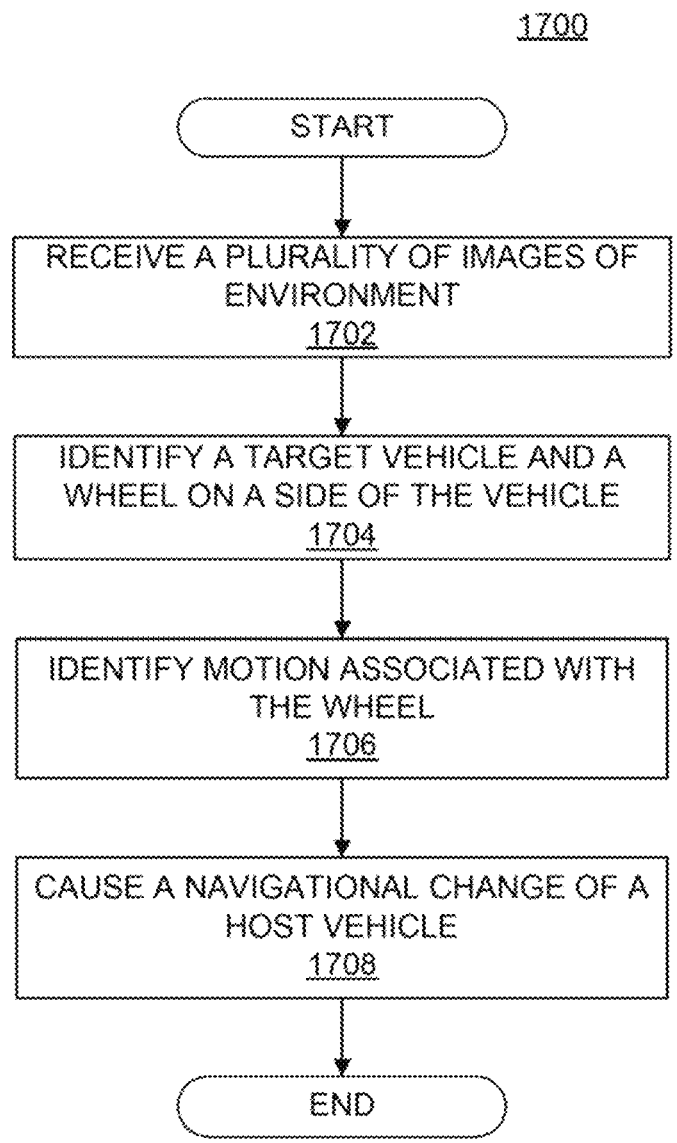
FIG. 17 is a flowchart showing an exemplary process for causing one or more navigational responses based on detection of a target vehicle entering the host vehicle's lane consistent with the disclosed embodiments.

FIG. 17 is a flowchart showing an exemplary process 1700 for causing one or more navigational responses based on detection of a target vehicle entering the host vehicle's lane, consistent with disclosed embodiments. At step 1702, processing unit 110 may receive a plurality of images of an environment of a host vehicle via data interface 128. For instance, cameras included in image acquisition unit 120 (such as image capture devices 122, 124, and 126 having fields of view 202, 204, and 206) may capture a plurality of images of an area forward and/or to the side of the host vehicle and transmit them over a digital connection (e.g., USB, wireless, Bluetooth, etc.) to processing unit 110.

The plurality of images may be collected over time. For example, the plurality may include a first image captured at time t=0, a second image captured at t=0.5 seconds, and a third image capture at t=1.0 seconds. The timing between the images may depend at least upon the scan rates of the one or more image capture devices.

At step 1704, processing unit 110 may analyze the at least one image to identify a target vehicle. For example, identifying a target vehicle may further include associating at least one bounding box with a shape of the side of the target vehicle. For example, the analysis may be performed using a learned algorithm as discussed above with reference to FIGS. 9 and 10. In some embodiments, step 1704 may further include identifying a wheel on the side of the identified target vehicle. For example, the analysis may be performed using a learned algorithm as discussed above with reference to FIG. 11.

Step 1704 is not limited to a wheel but may also include a wheel component. For example, processing unit 110 may identify a wheel component that includes at least one of a tire, a hubcap, or a wheel structure.

At step 1706, processing unit 110 may identify motion associated with the identified wheel(s). For example, processing unit may identify the motion in a region including at least one wheel component of the target vehicle, which may include a region adjacent to a road surface. By monitoring the at least two of the plurality of images, processing unit may identify motion using an indication of rotation of the at least one wheel component.

Byway of further example, processing unit 110 may identify at least one feature associated with the at least one wheel component (e.g., a logo on the wheel, a measurement of a tire of the wheel, a measurement of a hubcap of the wheel, a particular patch of pixels). Using the at least one feature, processing unit 110 may identify an indicator of a positional change of the at least one feature (e.g., blurring of the logo, changed coordinates of the patch of pixels).

By way of further example, processing unit 110 may warp the homography of the road, as described with respect to method 1800 of FIG. 18 below, identify the point(s) of contact between the identified wheel(s) and warped road (which may be stationary), and track points above the point(s) of contact to identify the motion.

Processing unit 110 may use indicators of rotation, positional changes of the at least one feature, and/or tracked points to determine a speed at which the target vehicle is moving. The processing unit 110 may use the determined speed in causing a navigation change in step 1708, described below. In addition, processing unit 110 may estimate a distance to the tire using a ground plane constraint and may estimate a lateral motion of the target vehicle based on the estimated distance.

At step 1708, processing unit 110 may cause a navigational change of the host vehicle. For example, navigational responses may include a change in a heading direction of the host vehicle (as depicted in FIG. 13 above), a lane shift, a change in acceleration (e.g., applying brakes of the host vehicle), and the like. Processing unit 110 may cause the one or more navigational responses based on the determination performed at step 1706. For example, processing unit 110 may move the host vehicle away from the target vehicle and/or decelerate the host vehicle in response to movement of the target vehicle. In this example, processing unit 110 may determine a lateral safety distance for the host vehicle based on the determined speed of the target vehicle (and/or the estimated lateral motion), and the alteration of the navigational path of the host vehicle may be based, at least in part, on the determined lateral safety distance.

Processing unit 110 may also use data derived from execution of velocity and acceleration module 406 to cause the one or more navigational responses. Multiple navigational responses may occur simultaneously, in sequence, or any combination thereof.

Figure 18:
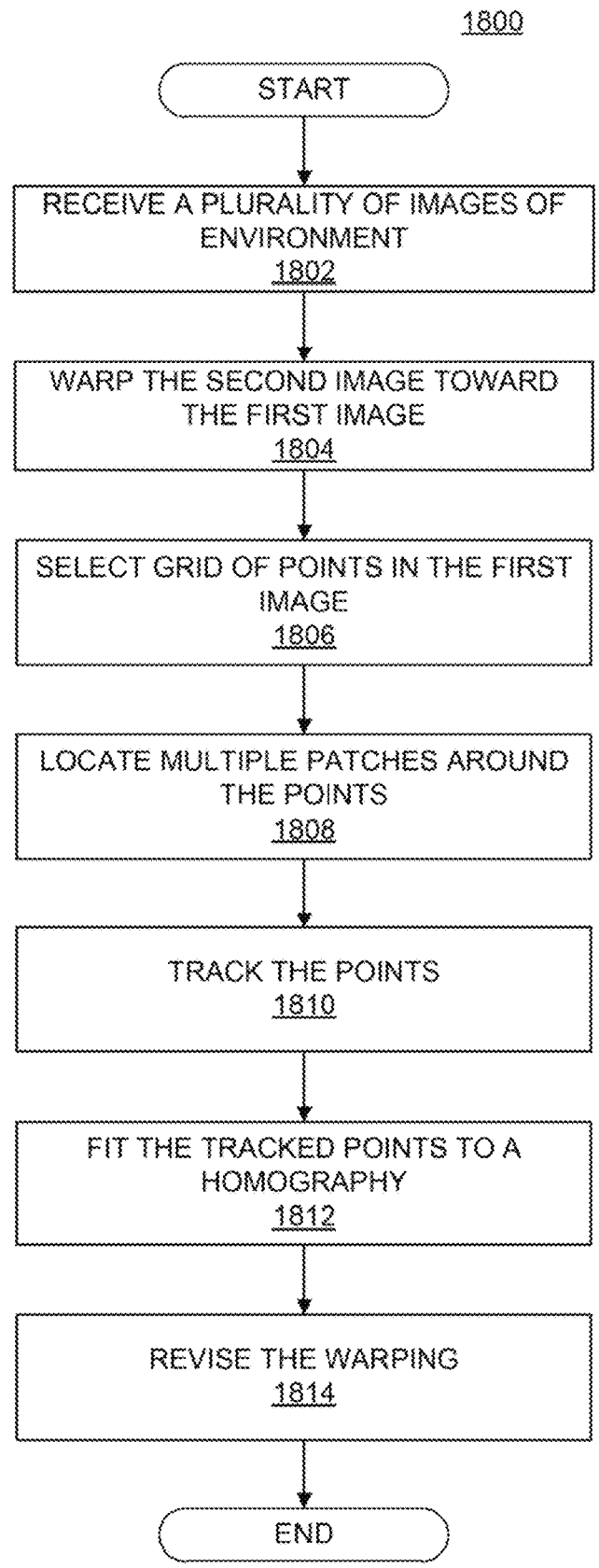
FIG. 18 is a flowchart showing an exemplary process for warping the homography of a road consistent with the disclosed embodiments.

FIG. 18 is a flowchart showing an exemplary process 1800 for warping the homography of a road. At step 1802, processing unit 110 may receive a plurality of images of an environment of a host vehicle via data interface 128. For instance, cameras included in image acquisition unit 120 (such as image capture devices 122, 124, and 126 having fields of view 202, 204, and 206) may capture a plurality of images of an area forward and/or to the side of the host vehicle and transmit them over a digital connection (e.g., USB, wireless, Bluetooth, etc.) to processing unit 110.

The plurality of images may be collected over time. For example, the plurality may include a first image captured at time t=0 and a second image captured at t=0.5 seconds. The timing between the images may depend at least upon the scan rates of the one or more image capture devices.

At step 1804, processing unit 110 may initially warp a first of the plurality of images toward a second of the plurality of images. For example, one of the first or second images may be rotated based on estimates of yaw, pitch, and roll of the host vehicle.

At step 1806, processing unit 110 may select a grid of points within the first or second image as a grid of reference points. For example, the grid may be formed from any shape, for example, an ellipse, a rectangle, a trapezoid, etc. Alternatively, a random distribution of points may be selected.

At step 1808, processing unit 110 may locate patches around the selected grid. For example, the patches may be of uniform size and shape. Alternatively, the patches may vary and/or may vary randomly.

At step 1810, processing unit 110 may track the selected grid of points using, for example, normalized correlation computations based on the patches. From the tracked points, processing unit 110 may select a subset of points with the highest scores based on the tracking.

At step 1812, processing unit 110 may fit the tracked points to a homography. In some embodiments, processing unit 110 may use random subsets of the tracked points to compute multiple homographies. In such embodiments, processing unit 110 may retain the random subset with the highest scoring homography.

At step 1814, processing unit 110 may revise the initial warping using the homography from step 1812. For example, processing unit 110 may use the random subset of points with the highest scoring homography in order to rewarp the first of the plurality of images toward the second of the plurality of images. Processing unit 110 may further calculate a least squares homography directly from the rewarped images. One skilled in the art would recognize that other algorithms for calculating road homography may be used.

Detecting a One-Way Road Based on Parked Vehicle Direction

Systems and methods that identify vehicles and identify fronts and/or rears of the identified vehicles may allow for detection of one-way roads. By using identified fronts and/or rears of vehicles, one-way roads may be detected without having to interpret signs or even when no vehicles are driving on the road. Embodiments of the present disclosure described below relate to systems and methods for detecting a one-way road based on parked vehicle direction.

Figure 19:
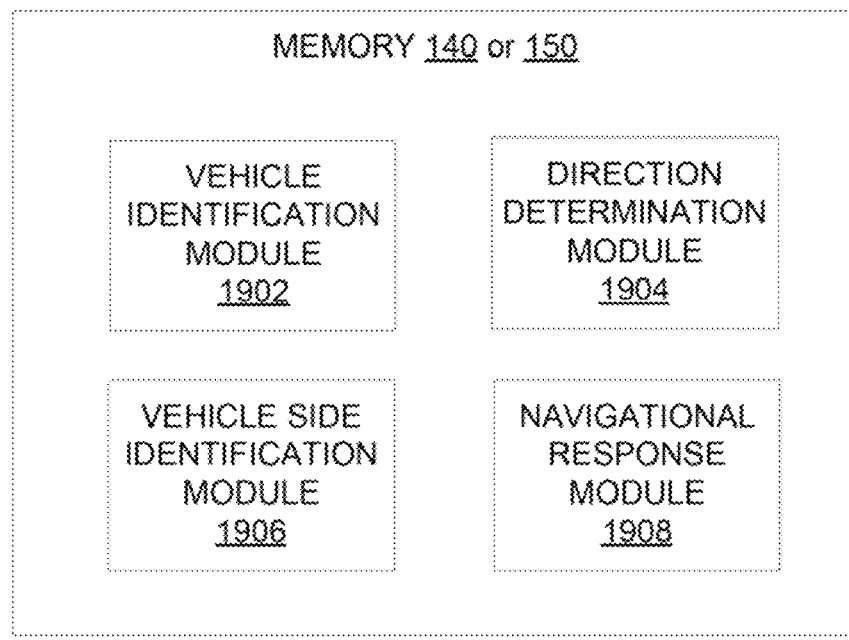
FIG. 19 is another exemplary block diagram of a memory configured to store instructions for performing one or more operations consistent with the disclosed embodiments.

FIG. 19 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 19, memory 140 may store a vehicle identification module 1902, a direction determination module 1904, a vehicle side identification module 1906, and a navigational response module 1908. The disclosed embodiments are not limited to any particular configuration of memory 140. Further, applications processor 180 and/or image processor 190 may execute the instructions stored in any of modules 1902-1908 included in memory 140. One of skill in the art will understand that references in the following discussions to processing unit 110 may refer to applications processor 180 and image processor 190 individually or collectively. Accordingly, steps of any of the following processes may be performed by one or more processing devices.

In one embodiment, vehicle identification module 1902 may store instructions (such as computer vision software) which, when executed by processing unit 110, performs analysis of one or more images acquired by one of image capture devices 122, 124, and 126. As described in connection with FIGS. 9-14 above, vehicle identification module 1902 may include instructions for determining bounding boxes of one or more vehicles.

In one embodiment, direction determination module 1904 may store instructions (such as computer vision software) which, when executed by processing unit 110, performs analysis of one or more images acquired by one of image capture devices 122, 124, and 126. As described in connection with FIGS. 20A and 20B below, direction determination module 1904 may include instructions for determining a facing direction for the identified vehicles.

For example, a facing direction may indicate whether an identified vehicle that is parallel parked faces toward or away from a host vehicle. By way of further example, a facing direction, or "tilting direction," may indicate whether an identified vehicle that is parked in an angled spot is tilted toward or away from a host vehicle. In such an example, the facing direction may further indicate whether the identified vehicle has been backed into the angled spot or pulled forward into the spot.

In one embodiment, vehicle side identification module 1906 may store instructions (such as computer vision software) which, when executed by processing unit 110, performs analysis of one or more images acquired by one of image capture devices 122, 124, and 126. As described in connection with FIGS. 9-14 above, vehicle side identification module 1906 may include instructions for classifying the identified bounding boxes of one or more vehicles.

In one embodiment, navigational response module 1908 may store software executable by processing unit 110 to determine a desired navigational response based on data derived from execution of vehicle identification module 1902, direction determination module 1904, and/or vehicle side identification module 1906. For example, navigational response module 1908 may cause a navigational change in accordance with method 2100 of FIG. 21, described below.

Furthermore, any of the modules (e.g., modules 1902, 1904, and 1906) disclosed herein may implement techniques associated with a trained system (such as a neural network or a deep neural network) or an untrained system.

Figure 20A:
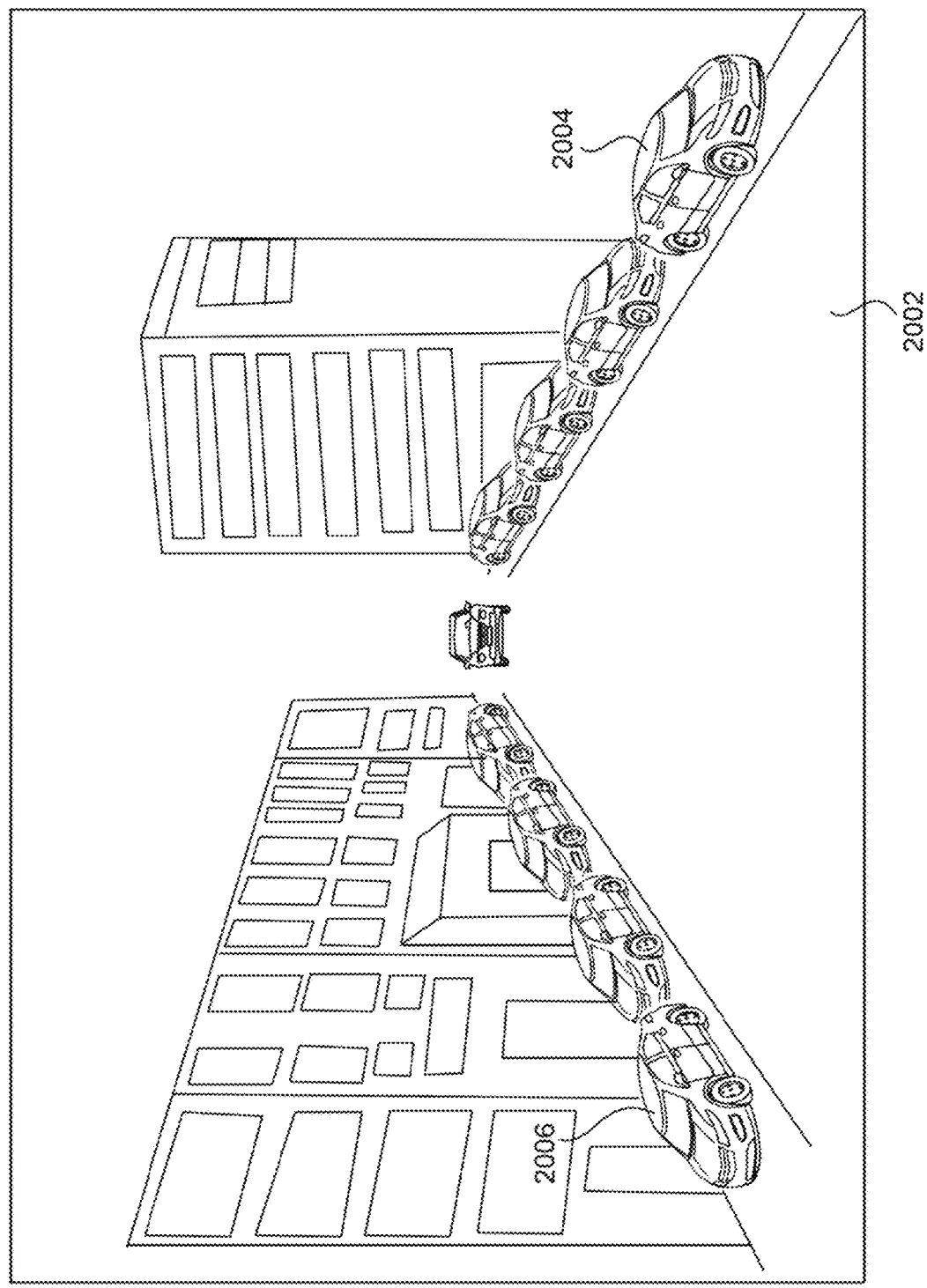
FIG. 20A is a schematic view of a one-way road from a point-of-view of a system consistent with the disclosed embodiments.

FIG. 20A depicts a one-way road 2002 from a point-of-view of a system consistent with the disclosed embodiments. Road 2002 may include a first plurality of stationary vehicles on one side (e.g., first vehicle 2004) and may include a second plurality of stationary vehicles on another side (e.g., second vehicle 2006). As described below with respect to method 2100 of FIG. 21, the system may determine facing directions for the vehicles in the first plurality and facing directions for the vehicles in the second plurality.

As depicted in FIG. 20A, the system may determine that road 2002 is a one-way road if the facing directions for both the first plurality and the second plurality are the same. In other embodiments in which one side of road 2002 has angled parking rather than parallel parking, the system may determine that road 2002 is a one-way road if the facing direction for the parallel parking side is the same as the tilting direction for the angled parking side. In still other embodiments in which road 2002 has two sides of angled parking, the system may determine that road 2002 is a one-way road if the tilting directions for both the first plurality and the second plurality are the same. In certain aspects, the determination may depend on whether the first and/or second plurality are backed into angled spots or pulled forward into angled spots.

Figure 20B:
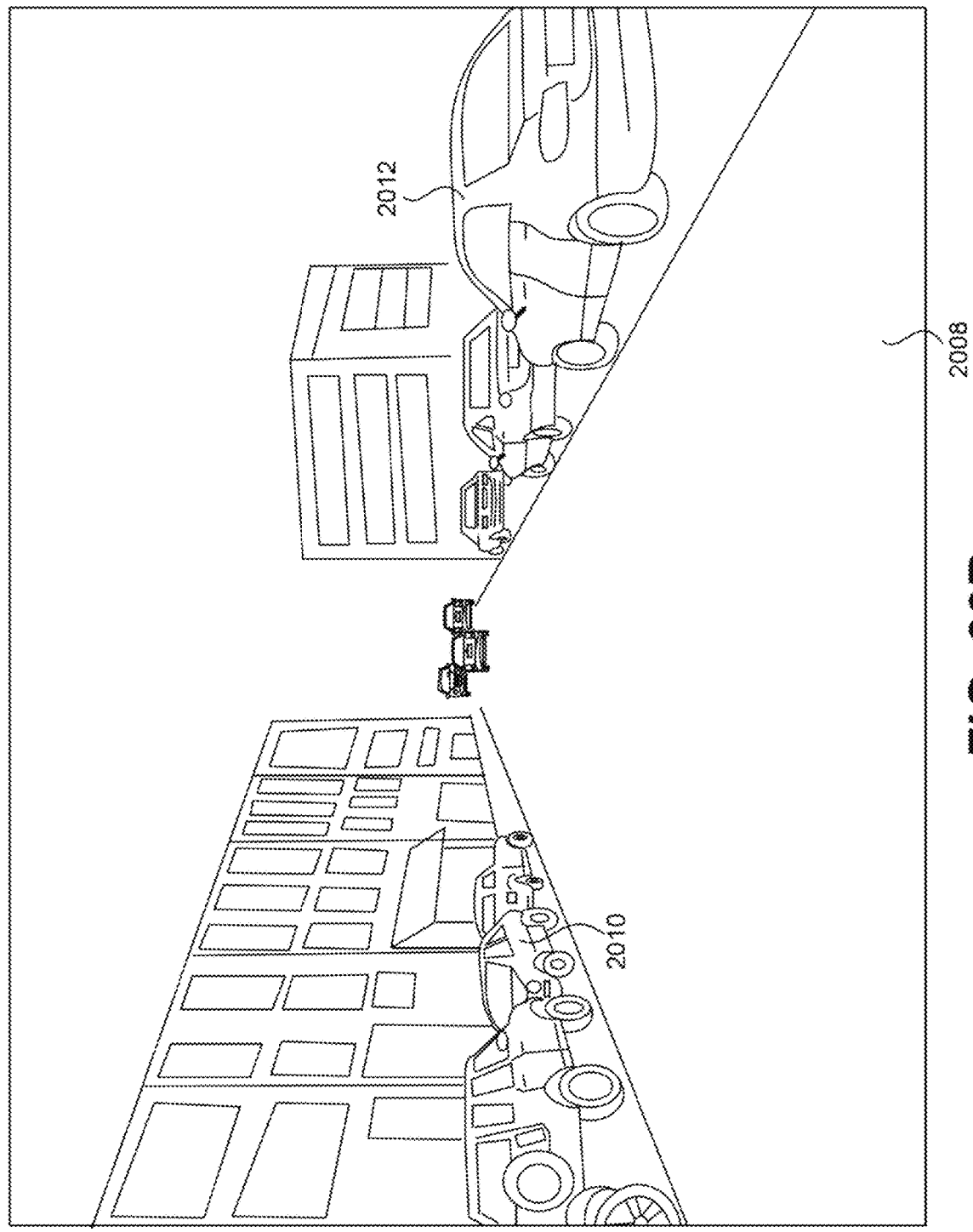
FIG. 20B is another schematic view of a one-way road from a point-of-view of a system consistent with the disclosed embodiments.

FIG. 20B also depicts a one-way road 2008 from a point-of-view of a system consistent with the disclosed embodiments. Similar to road 2002, road 2008 may include a first plurality of stationary vehicles on one side (e.g., first vehicle 2010) and may include a second plurality of stationary vehicles on another side (e.g., second vehicle 2012). As described below with respect to method 2100 of FIG. 21, the system may determine facing directions for the vehicles in the first plurality and facing directions for the vehicles in the second plurality. As depicted in FIG. 20A, the system may determine that a vehicle (e.g., vehicle 2010) is parked incorrectly if its facing direction differs from the facing directions of its associated plurality of vehicles. For example, the system may determine that a vehicle is parked incorrectly if a number of other vehicles having a different facing direction in the associated plurality is beyond a threshold. By way of further example, the system may determine that a vehicle is parked in correctly if a ratio of other vehicles having a different facing direction to vehicles having the same facing direction is beyond a threshold (e.g., fifty percent or greater, sixty percent or greater, seventy percent or greater, etc.). In some embodiments, this determination may be used to issue a traffic ticket to (or instruct the operator of the host vehicle to issue a traffic ticket to) the owner or operator of vehicle 2010.

Figure 21:
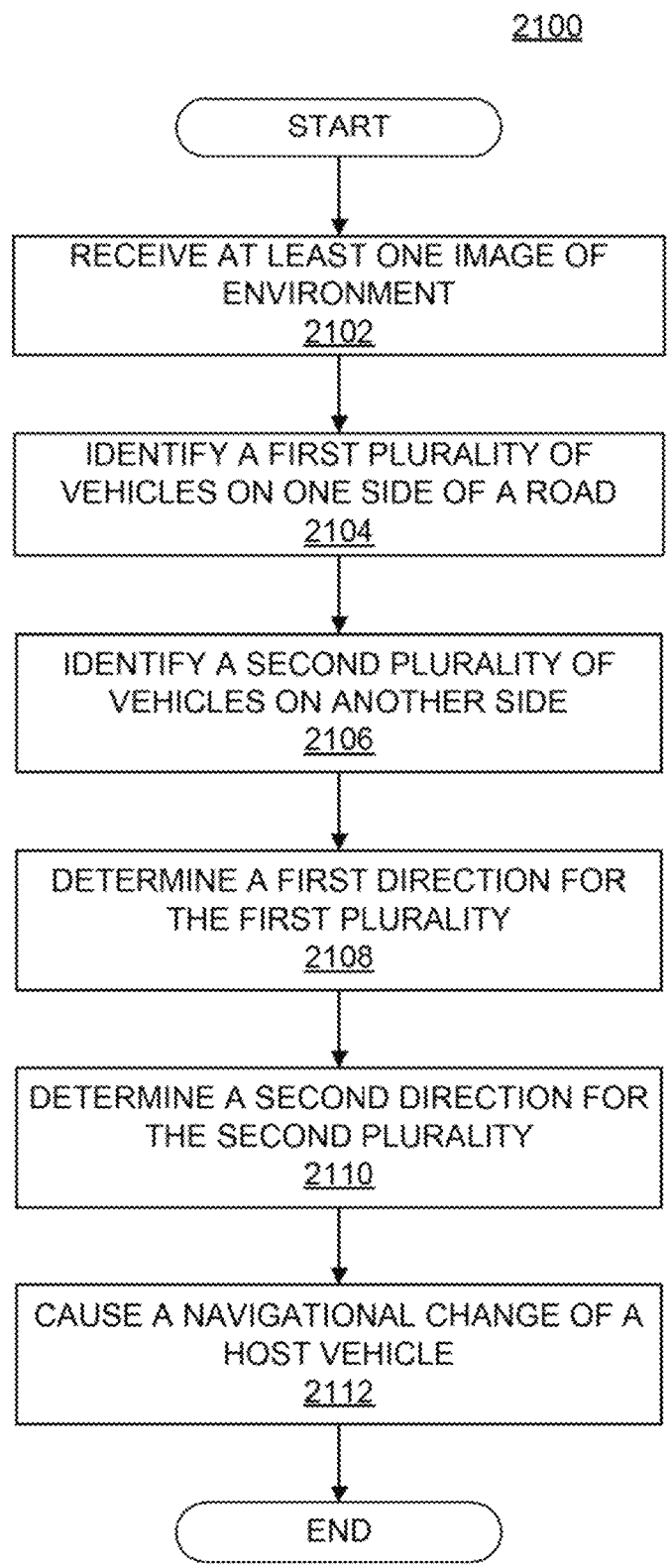
FIG. 21 is a flowchart showing an exemplary process for causing one or more navigational responses based on detection of whether a road on which the host vehicle travels is a one-way road consistent with the disclosed embodiments.

FIG. 21 is a flowchart showing an exemplary process 2100 for causing one or more navigational responses based on detection of whether a road on which the host vehicle travels is a one-way road, consistent with disclosed embodiments. At step 2102, processing unit 110 may receive at least one image of an environment of a host vehicle via data interface 128. For instance, cameras included in image acquisition unit 120 (such as image capture devices 122, 124, and 126 having fields of view 202, 204, and 206) may capture at least one image of an area forward and/or to the side of the host vehicle and transmit them over a digital connection (e.g., USB, wireless, Bluetooth, etc.) to processing unit 110.

At step 2104, processing unit 110 may analyze the at least one image to identify a first plurality of vehicles on one side of a road. For example, identifying a first plurality of vehicles may further include associating bounding boxes with shapes of the first plurality of vehicles. For example, the analysis may be performed using a learned algorithm as discussed above with reference to FIGS. 9 and 10.

Step 2104 may further include identifying, based on analysis of the at least one image, a side of at least one of the first plurality of vehicles or at least one of the second plurality of vehicles. For example, the analysis may be performed using a learned algorithm as discussed above with reference to FIGS. 9 and 10. In some embodiments, the identification of the side may be based on at least two features associated with at least one of the first plurality of vehicles or at least one of the second plurality of vehicles. For example, features associated with a vehicle may include mirrors, windows, door handles, door shapes, a number of doors, an incline of the front and/or rear windshield, or the like. In some embodiments, the identified side may be a right side. In other embodiments, the identified side may be a left side.

At step 2106, processing unit 110 may analyze the at least one image to identify a second plurality of vehicles on another side of a road. Step 2106 may be performed analogously to and/or simultaneously with step 2104.

At step 2108, processing unit 110 may determine a first facing direction for the first plurality of vehicles. In some embodiments, the first plurality of vehicles may all have the same facing direction. In other embodiments, the facing directions may differ.

At step 2110, processing unit 110 may determine a second facing direction for the second plurality of vehicles. In some embodiments, the second plurality of vehicles may all have the same facing direction. In other embodiments, the facing directions may differ.

At step 2112, processing unit 110 may cause a navigational change of the host vehicle. For example, navigational responses may include a turn (as depicted in FIG. 13 above), a lane shift, a change in acceleration (e.g., applying brakes of the host vehicle), and the like. Processing unit 110 may cause the one or more navigational responses based on the determination performed at step 2112. For example, processing unit 110 may determine that the road is a one-way road based on the first and second facing directions. Based on this determination, processing unit may slow or stop the host vehicle and/or execute a U-turn.

In some embodiments, method 2100 may include additional steps. For example, method 2100 may include receiving a navigation instruction to navigate the host vehicle from a first road on which the host vehicle is traveling to a second road. The navigation instruction may include an instruction to turn the host vehicle onto the second road, to veer onto the second road, to merge onto a ramp that proceeds onto the second road, or the like.

In such embodiments, method 2100 may further include determining that the first facing direction and the second facing direction are both opposite to a heading direction the host vehicle would travel if the host vehicle were to turn onto the second road. For example, processing unit 110 may analyze images of vehicles on the second road to determine the first and second facing directions and then determine whether they are opposite to the projected heading direction of the host vehicle. In response to the determination the first facing direction and the second facing direction are both opposite to the heading direction the host vehicle would travel if the host vehicle were to turn onto the second road, processing unit 110 may suspend the navigation instruction. For example, processing unit 110 may cancel the instruction to turn, veer, merge, or the like onto the second road because processing unit 110 has determined that the road is a one-way road in a direction opposite to the projected heading direction.

In further embodiments, method 2100 may include receiving an override instruction to reinstate the suspended navigation instruction. For example, the override instruction may be initiated based on a manual confirmation received from a person inside the host vehicle, initiated based on accessing map data, initiated based on crowdsourced data related to a travel direction of the second road, or the like.

Processing unit 110 may also use data derived from execution of velocity and acceleration module 406 to cause the one or more navigational responses. Multiple navigational responses may occur simultaneously, in sequence, or any combination thereof.

Predicting a State of a Parked Vehicle Based on a Heat Profile

Systems and methods that predict states of parked vehicles based on heat profiles may allow for prediction of a movement of the parked vehicles before the vehicles begin to move. In this way, the system may identify predicted movement and preemptively adjust thereto rather than waiting until motion is actually detected like traditional motion detection. Embodiments of the present disclosure described below relate to systems and methods for predicting a state of a parked vehicle based on a heat profile.

Figure 22:
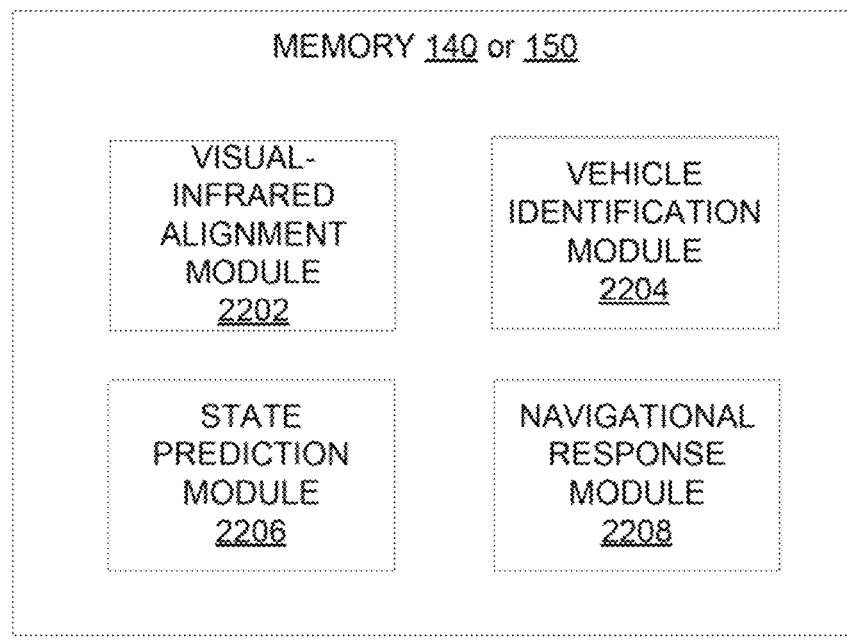
FIG. 22 is another exemplary block diagram of a memory configured to store instructions for performing one or more operations consistent with the disclosed embodiments.

FIG. 22 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 22, memory 140 may store a visual-infrared alignment module 2202, a vehicle identification module 2204, a state prediction module 2206, and a navigational response module 2208. The disclosed embodiments are not limited to any particular configuration of memory 140. Further, applications processor 180 and/or image processor 190 may execute the instructions stored in any of modules 2202-2208 included in memory 140. One of skill in the art will understand that references in the following discussions to processing unit 110 may refer to applications processor 180 and image processor 190 individually or collectively. Accordingly, steps of any of the following processes may be performed by one or more processing devices.

In one embodiment, visual-infrared alignment module 2202 may store instructions (such as computer vision software) which, when executed by processing unit 110, aligns one or more visual images acquired by one of image capture devices 122, 124, and 126 with one or more infrared images (that is, heat maps) acquired by one of image capture devices 122, 124, and 126. For example, visual-infrared module 2202 may include instructions for executing method 2500 of FIG. 25, described below.

In one embodiment, vehicle identification module 2204 may store instructions (such as computer vision software) which, when executed by processing unit 110, performs analysis of one or more images acquired by one of image capture devices 122, 124, and 126. As described in connection with FIGS. 9-14 below, vehicle identification module 2202 may include instructions for determining bounding boxes of one or more vehicles.

In one embodiment, state prediction module 2206 may store instructions (such as computer vision software) which, when executed by processing unit 110, performs analysis of one or more aligned images from visual-infrared alignment module 2202 to predict the state of one or more identified vehicles. For example, state prediction module 2206 may output a predicted states based on visual indicators and heat indicators of an identified vehicle.

In one embodiment, navigational response module 2208 may store software executable by processing unit 110 to determine a desired navigational response based on data derived from execution of visual-infrared alignment module 2202, vehicle identification module 2204, and/or state prediction module 2206. For example, navigational response module 2208 may cause a navigational change in accordance with method 2400 of FIG. 24, described below.

Furthermore, any of the modules (e.g., modules 2202, 2204, and 2206) disclosed herein may implement techniques associated with a trained system (such as a neural network or a deep neural network) or an untrained system.

Figure 23A:
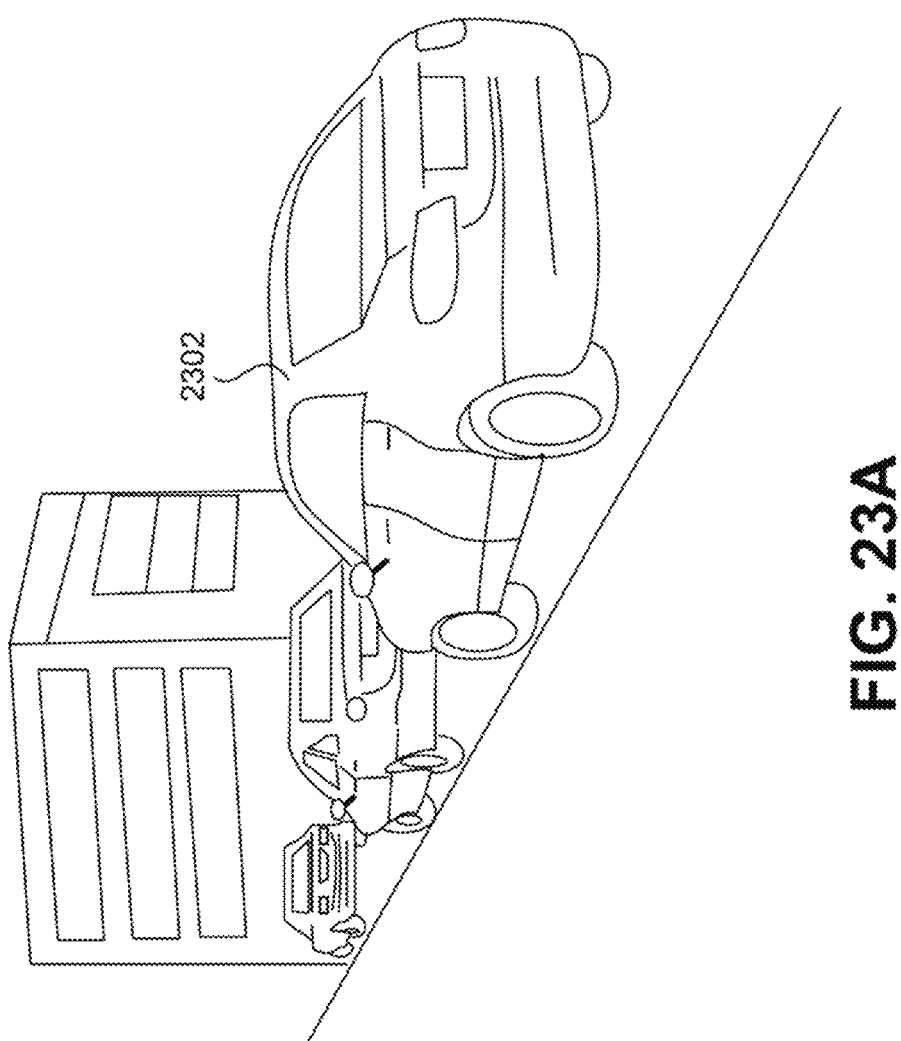
FIG. 23A is a schematic view of a parked car from a point-of-view of a system consistent with the disclosed embodiments.

FIG. 23A depicts a parked vehicle 2302 from a point-of-view of a system consistent with the disclosed embodiments. For example, vehicle 2302 may be monitored by the system for a change in illumination state and/or for temperature characteristics. The system may, for example, use method 2400 of FIG. 24 to determine a predicted state of vehicle 2302 based on a change in illumination state and/or temperature characteristics.

Figure 23B:
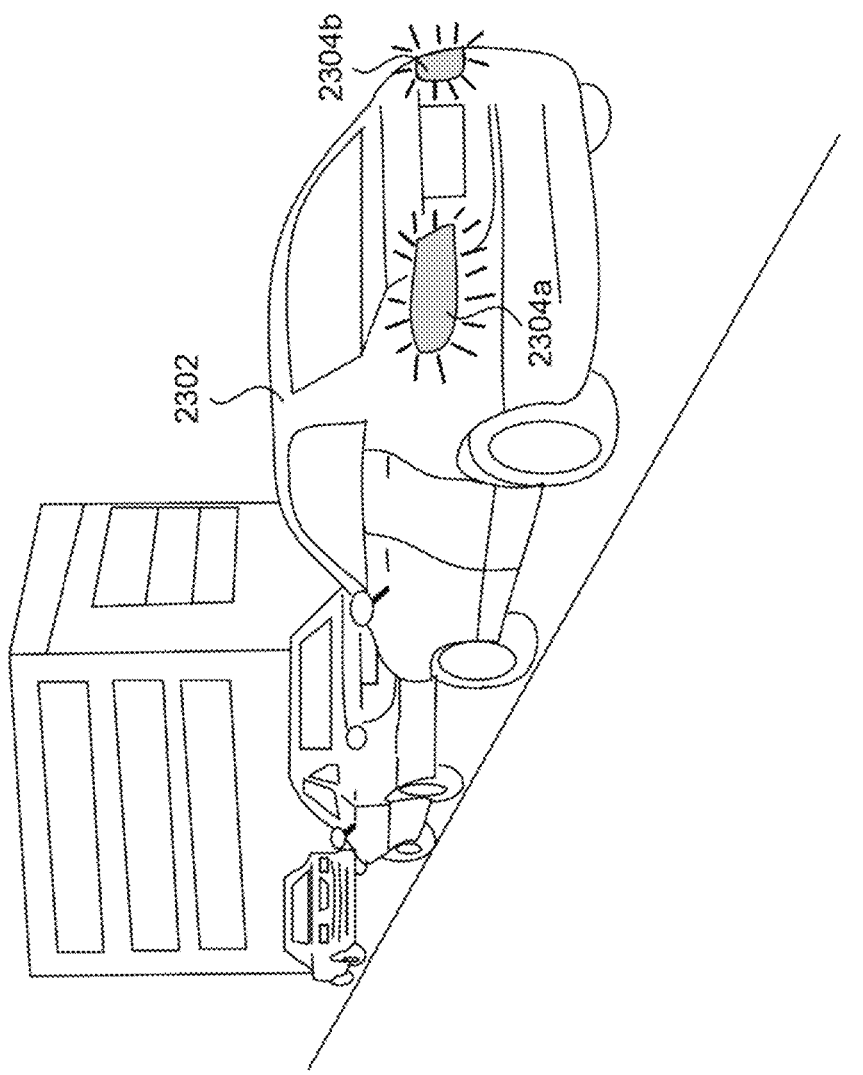
FIG. 23B is a schematic view of a parked car having a change in illumination from a point-of-view of a system consistent with the disclosed embodiments.
Figure 23C:
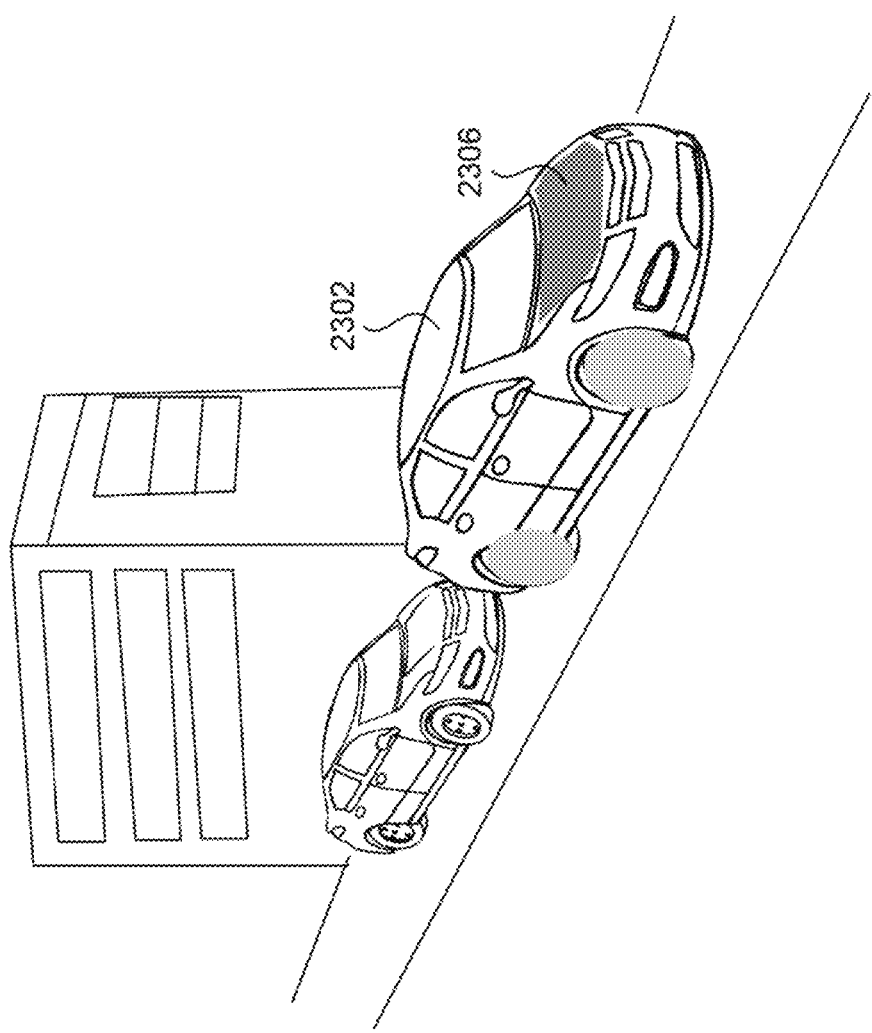
FIG. 23C is a schematic view of a heat map of a parked car from a point-of-view of a system consistent with the disclosed embodiments.

FIG. 23B depicts parked vehicle 2302 having a changed illumination state. In the example of FIG. 23C, taillights 2304a and 2304b of vehicle 2302 have change from a non-illuminated state to an illuminated state. Other embodiments in which headlights indicate a changed illumination state are possible. Moreover, other embodiments in which the headlights and/or taillights of a vehicle change from an illuminated state to a non-illuminated state are also possible.

FIG. 23C depicts parked vehicle 2302 (from a different angle) having an engine 2306 that is warm and tires 2308a and 2308b that are cool. As used herein "warm" and "cool" may refer to deviations from expected temperature values that may be predetermined and/or learned. For example, an engine may be "warm" if it is above ambient temperature and may be "cool" if it is at or below ambient temperature. In embodiments of the present disclosure, a reference to an engine, or to the temperature of the engine, may relate to a certain area of the vehicle whose temperature is typically affected by the engine's temperature, for example, the engine hood located at the front of the vehicle. The "warm" and "cold" temperature thresholds may be selected to reflect the expected temperature of the engine hood under specific conditions, possibly with some margins to reduce false positive or false negative detections, as desired. In one example, under sunny conditions, the threshold temperature may be adjusted to account for heating from the sun (e.g., after determining that the vehicle's hood is exposed to the sun). In another example, the effects of the sun may be factored in, taking into account the color of the vehicle, which may be determined by spectral analysis of the image. In another example, the threshold may be determined by averaging the temperature of, for example, a previously detected parked cars and/or a specific area of one or more parked cars, possibly within a local area of the car which is being presently monitored.

Similarly, a tire temperature may be used as an indication of the vehicle's state. For example, a tire may be "warm" if it is above road temperature and may be "cool" if it is at or below road temperature. In another example, the threshold temperature (e.g., the temperature that is used to distinguish between "warm" and "cold" tires) may relate to the expected or computed operating temperature of the tires. The working temperature computation may take into the ambient conditions, and possibly also a model of driving and its effects over the tire temperature. In yet another example, the working temperature computation can also include a tire cooling model. The tire cooling model may also take into account ambient conditions. In the example of FIG. 23C, the system may, for example, use method 2400 of FIG. 24 to determine a predicted state of vehicle 2302 based on the temperatures of engine 2306 and tires 2308*a* and 2308*b*.

Figure 24:
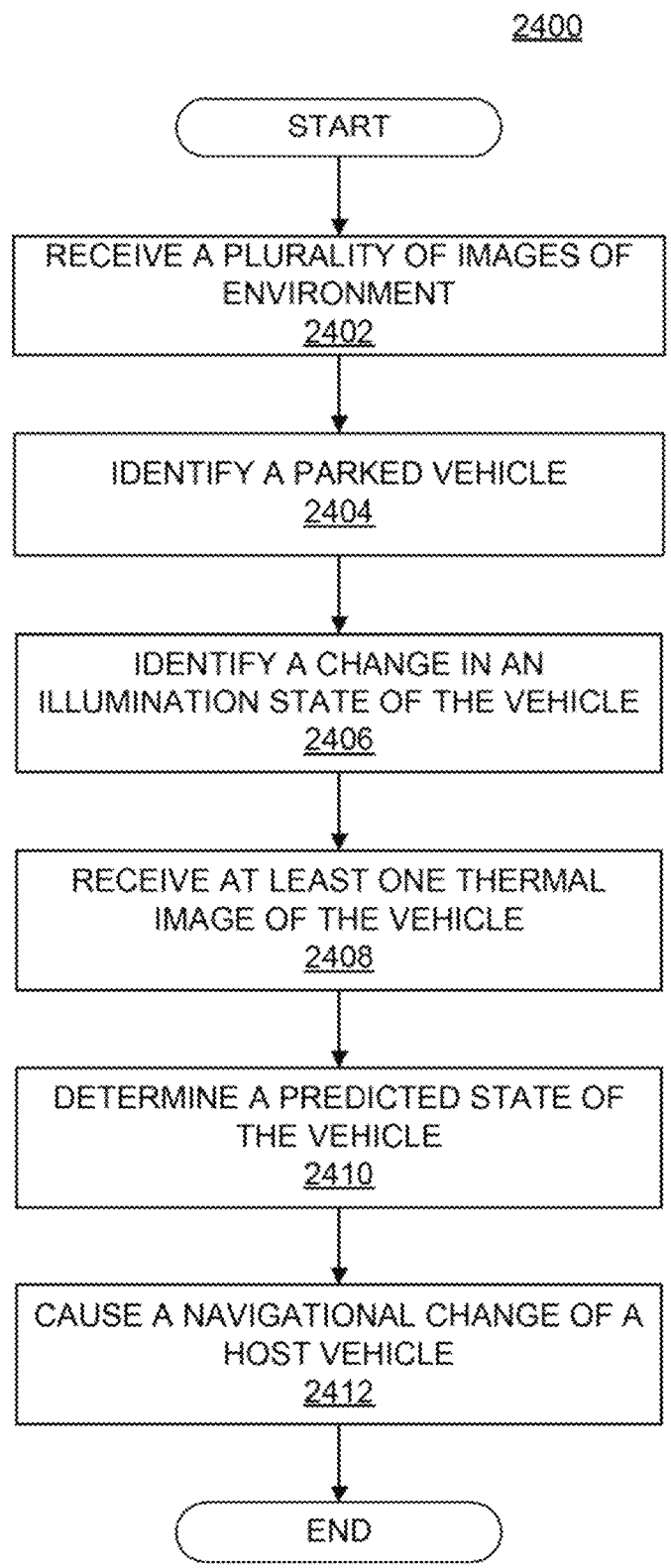
FIG. 24 is a flowchart showing an exemplary process for determining a predicted state of a parked vehicle consistent with the disclosed embodiments.

FIG. 24 is a flowchart showing an exemplary process 2400 for determining a predicted state of a parked vehicle, consistent with disclosed embodiments. At step 2402, processing unit 110 may receive a plurality of images of an environment of a host vehicle via data interface 128. For instance, cameras included in image acquisition unit 120 (such as image capture devices 122, 124, and 126 having fields of view 202, 204, and 206) may capture a plurality of images of an area forward and/or to the side of the host vehicle and transmit them over a digital connection (e.g., USB, wireless, Bluetooth, etc.) to processing unit 110.

The plurality of images may be collected over time. For example, the plurality may include a first image captured at time t=0, a second image captured at t=0.5 seconds, and a third image capture at t=1.0 seconds. The timing between the images may depend at least upon the scan rates of the one or more image capture devices.

At step 2404, processing unit 110 may analyze the plurality of images to identify a parked vehicle. For example, identifying a parked vehicle may further include associating at least one bounding box with a shape of the side of the parked vehicle. For example, the analysis may be performed using a learned algorithm as discussed above with reference to FIGS. 9 and 10. In some embodiments, step 2404 may further include identifying an engine in the front of the identified target vehicle and/or a wheel on the side of the identified target vehicle. For example, the analysis may be performed using a learned algorithm as discussed above with reference to FIG. 11.

At step 2406, processing unit 110 may analyze the plurality of images to identify a change in illumination state of the parked vehicle. For example, processing unit 110 may identify taillights and/or headlights of the parked vehicle and monitor the identified taillights and/or headlights for a change from non-illuminated to illuminated (as seen in the example of FIG. 23B) or from illuminated to non-illuminated. Other embodiments may include more detailed changes, for example, from illumination of parking lights only to illumination of brake lights or the like.

In some embodiments, method 2400 may include determining, based on the change in the illumination state, the predicted state of the parked vehicle and may proceed directly to step 2412 (that is, cause at least one navigational response by the host vehicle based on the predicted state of the parked vehicle). For example, based on a change in the illumination state of the at least one light associated with the parked vehicle from a non-illuminated state to an illuminated state, processing unit 110 may determine that the predicted state of the parked vehicle includes an indication that an engine of the parked vehicle has been started. Similarly, based on a change in the illumination state of the at least one light associated with the parked vehicle from an illuminated state to a non-illuminated state, processing unit 110 may determine that the predicted state of the parked vehicle includes an indication that an engine of the parked vehicle has been turned off. Accordingly, in such embodiments, these determinations may not involve the use of thermal images.

At step 2408, processing unit 110 may receive at least one thermal image (that is, an infrared image) of an environment of a host vehicle via data interface 128. For instance, cameras included in image acquisition unit 120 (such as image capture devices 122, 124, and 126 having fields of view 202, 204, and 206) may capture at least one thermal image of an area forward and/or to the side of the host vehicle and transmit them over a digital connection (e.g., USB, wireless, Bluetooth, etc.) to processing unit 110.

Step 2408 may be performed separately from or simultaneously with step 2402. Thus, in some embodiments, the visual and infrared images may be received simultaneously. In other embodiments, differing scan rates and/or differing speeds of transmission between one or more image capture devices and one or more infrared image captures devices may result in delay between the visual and infrared images.

In some embodiments, method 2400 may further include aligning at least one of the plurality of images with the at least one thermal image. Based on the alignment, method 2400 may further include identifying at least one of the engine area or at least one wheel component area of the parked vehicle in the aligned at least one thermal image.

At step 2410, processing unit 110 may determine a predicted state of the parked vehicle based on the analysis of step 2406 and/or analysis of the at least one thermal image. For example, a predicted state may include an indication that an engine of the parked vehicle has been started or an indication that an engine of the parked vehicle has been turned off. By way of further example, a predicated state may include an indication that the parked vehicle is not expected to move within a predetermined time period, an indication that the parked vehicle is expected to move within a predetermined time period, or an indication that a door of the parked vehicle is expected to open within a predetermined time period.

In some embodiments, analysis of the at least one thermal image may include determining a temperature value of an engine area of the parked vehicle. For example, if the temperature value is below a threshold, processing unit 110 may determine a predicted state including an indication that the parked vehicle is not expected to move within a predetermined time period. The predetermined time period may, for example, depend on known characteristics of the parked vehicle or the engine thereof.

In some embodiments, analysis of the at least one thermal image may include determining a first temperature value of an engine area of the parked vehicle and a second temperature value of at least one wheel component of the parked vehicle. In such embodiments, the predicted state of the parked vehicle may be determined based on a comparison of the first temperature value to a first threshold and a comparison of the second temperature value to a second threshold. For example, if the first temperature value exceeds the first threshold and the second temperature value is below the second threshold, processing unit 110 may determine a predicted state including an indication that the parked vehicle is expected to move within a predetermined time period. By way of further example, if the first temperature value exceeds the first threshold and the second temperature value exceeds the second threshold, processing unit 110 may determine a predicted state including an indication that a door of the parked vehicle is expected to open within a predetermined time period.

In some embodiments, processing unit 110 may perform additional monitoring of received images based, at least in part, on the predicted state, whether the predicted state is based on a change in illumination, analysis of at least one thermal image, or a combination thereof. For example, if the predicted state indicates that an engine of the parked vehicle has been turned off and/or indicates that a door of the parked vehicle is expected to open within a predetermined time period, processing unit 110 may monitor one or more portions of received images for a change in an image characteristic of a door edge of the parked vehicle. An example of this monitoring is explained above with reference to method 1400 of FIG. 14. By way of further example, if the predicated state indicates that an engine of the parked vehicle has been turned on and/or indicates that the parked vehicle is expected to move within a predetermined time period, processing unit 110 may monitor one or more wheel components of the received images for motion of the wheel components. An example of this monitoring is explained above with reference to method 1700 of FIG. 17.

At step 2412, processing unit 110 may cause a navigational change of the host vehicle. For example, navigational responses may include a change in a heading direction of the host vehicle (as depicted in FIG. 13 above), a lane shift, a change in acceleration, and the like. Processing unit 110 may cause the one or more navigational responses based on the predicted state determined performed at step 2410. For example, processing unit 110 may move the host vehicle away from the parked vehicle and/or decelerate the host vehicle in response to predicted states indicating that the parked vehicle is expected to move within a predetermined time period or indicating that a door of the parked vehicle is expected to open within a predetermined time period.

Figure 25:
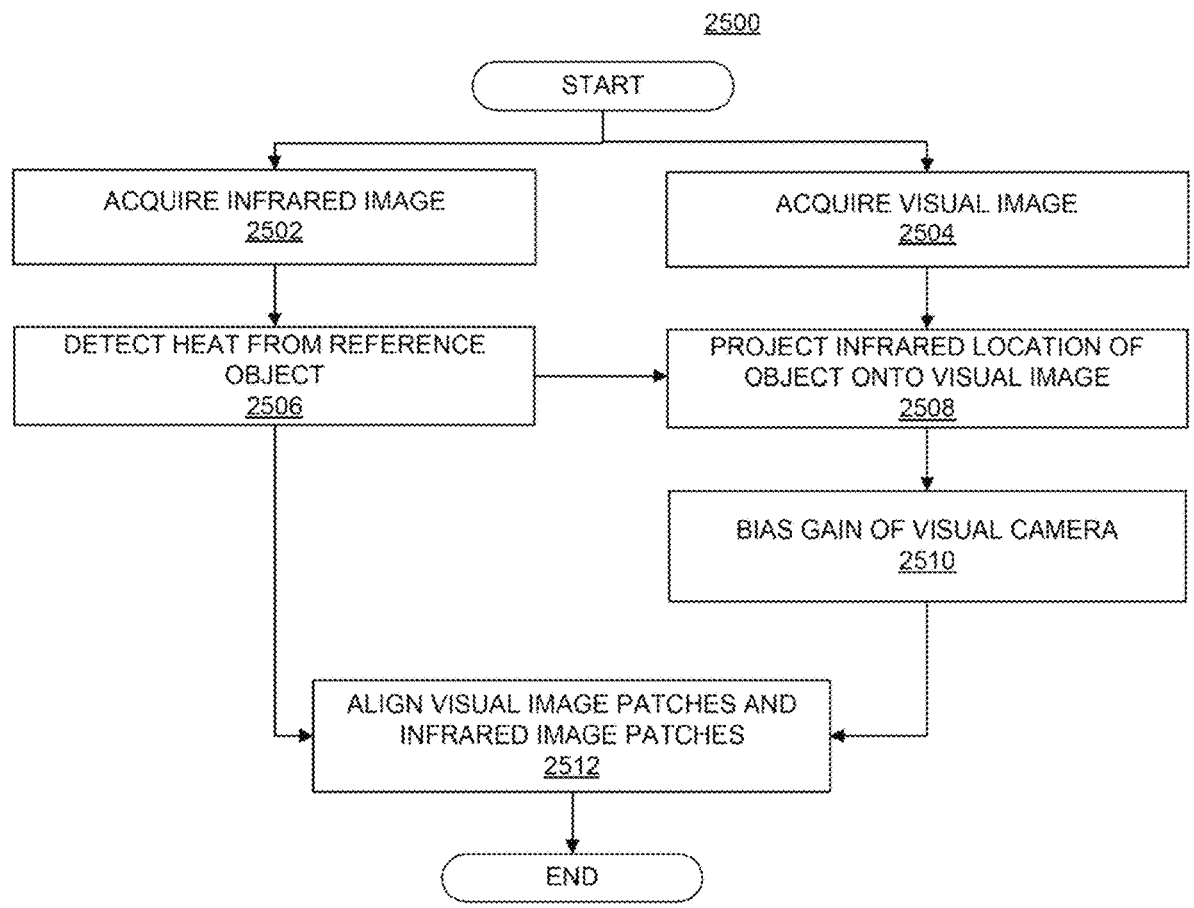
FIG. 25 is a flowchart showing an exemplary process for aligning visual and infrared images from a system consistent with the disclosed embodiments.

FIG. 25 is a flowchart showing an exemplary process 2500 for aligning visual and infrared images. At steps 2502 and 2504, processing unit 110 may receive at least one visual image of an environment of a host vehicle and at least one infrared image of the environment via data interface 128. For instance, cameras included in image acquisition unit 120 (such as image capture devices 122, 124, and 126 having fields of view 202, 204, and 206) may capture at least one visual image and the at least one infrared image of an area forward and/or to the side of the host vehicle and transmit them over a digital connection (e.g., USB, wireless, Bluetooth, etc.) to processing unit 110.

In some embodiments, the visual and infrared images may be received simultaneously. In other embodiments, differing scan rates and/or differing speeds of transmission between one or more image capture devices and one or more infrared image captures devices may result in delay between the visual and infrared images.

At step 2506, processing unit 110 may select a set of reference points in the at least one infrared image. For example, the set of reference points may be chosen randomly or may include identification of a known object (e.g., a pedestrian, a tree, a vehicle, etc.) based on known characteristics.

At step 2508, processing unit 110 may project the reference points from the at least one infrared image to the at least one visual image. For example, processing unit 110 may project a shape (e.g., an ellipse, a rectangle, a trapezoid, etc.) representing (e.g., surrounding) the reference points onto a location in the at least one visual image.

At step 2510, processing unit 110 may optimize the gain and/or exposure for the part of the visual image corresponding to the reference points. For example, the improved contrast resulting from the optimization may result in more reliable alignment. Step 2508 is optional and need not be performed in all embodiments.

At step 2512, processing unit 110 may align the at least one infrared image with the at least one visual image. For example, aligning (or matching) the images may include searching along epipolar lines for a distance that optimizes an alignment measure. In this example, optimization of alignment measures may ensure that distances between the reference points and the viewer and/or between the reference points and other objects is the same in both the visual and infrared images.

Navigating Based on Detected Spacing Between Vehicles

Systems and methods that identify vehicles and space between the vehicles may allow for navigating based on the detected space. Navigating in this way may allow for preemptive monitoring for and reaction to movement in the detected spaces with a shorter reaction time than traditional motion detection. Embodiments of the present disclosure described below relate to systems and methods for navigating based on detected spacing between vehicles.

Figure 26:
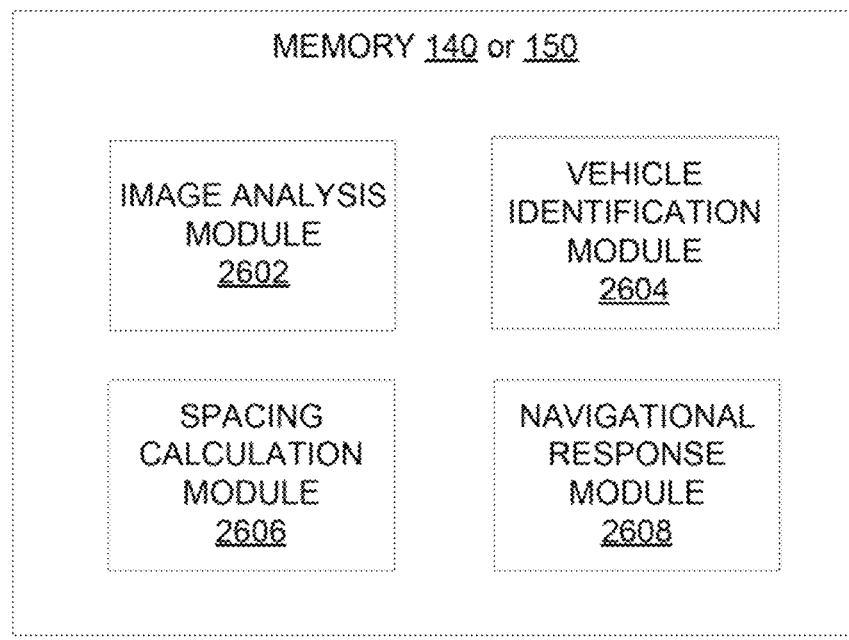
FIG. 26 is another exemplary block diagram of a memory configured to store instructions for performing one or more operations consistent with the disclosed embodiments.

FIG. 26 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 26, memory 140 may store an image analysis module 2602, a vehicle identification module 2604, a spacing calculation module 2606, and a navigational response module 2608. The disclosed embodiments are not limited to any particular configuration of memory 140. Further, applications processor 180 and/or image processor 190 may execute the instructions stored in any of modules 2602-2608 included in memory 140. One of skill in the art will understand that references in the following discussions to processing unit 110 may refer to applications processor 180 and image processor 190 individually or collectively. Accordingly, steps of any of the following processes may be performed by one or more processing devices.

In one embodiment, image analysis module 2602 may store instructions (such as computer vision software) which, when executed by processing unit 110, performs image analysis of one or more images acquired by one of image capture devices 122, 124, and 126. In some embodiments, processing unit 110 may combine information from a set of images with additional sensory information (e.g., information from radar, lidar, etc.) to perform the image analysis. As described in connection with vehicle identification module 2604 below, image analysis module 2602 may include instructions for detecting a vehicle using one or more features (e.g., a front, a rear, a side, or the like).

In one embodiment, vehicle identification module 2604 may store instructions (such as computer vision software) which, when executed by processing unit 110, performs analysis of one or more images acquired by one of image capture devices 122, 124, and 126. As described in connection with FIGS. 9-14 above, vehicle identification module 2604 may include instructions for determining bounding boxes of one or more vehicles.

In one embodiment, spacing calculation module 2606 may store instructions (such as computer vision software) which, when executed by processing unit 110, performs analysis of one or more images acquired by one of image capture devices 122, 124, and 126. As described in connection with FIGS. 27A and 27B below, and in cooperation with vehicle identification module 2604, spacing calculation module 2606 may include instructions for calculating one or more spacings between the identified vehicles.

In one embodiment, navigational response module 2608 may store software executable by processing unit 110 to determine a desired navigational response based on data derived from execution of image analysis module 2602, vehicle identification module 2604, and/or spacing calculation module 2606. For example, navigational response module 2608 may cause a navigational change in accordance with method 2800 of FIG. 28, described below.

Furthermore, any of the modules (e.g., modules 2602, 2604, and 2606) disclosed herein may implement techniques associated with a trained system (such as a neural network or a deep neural network) or an untrained system.

Figure 27A:
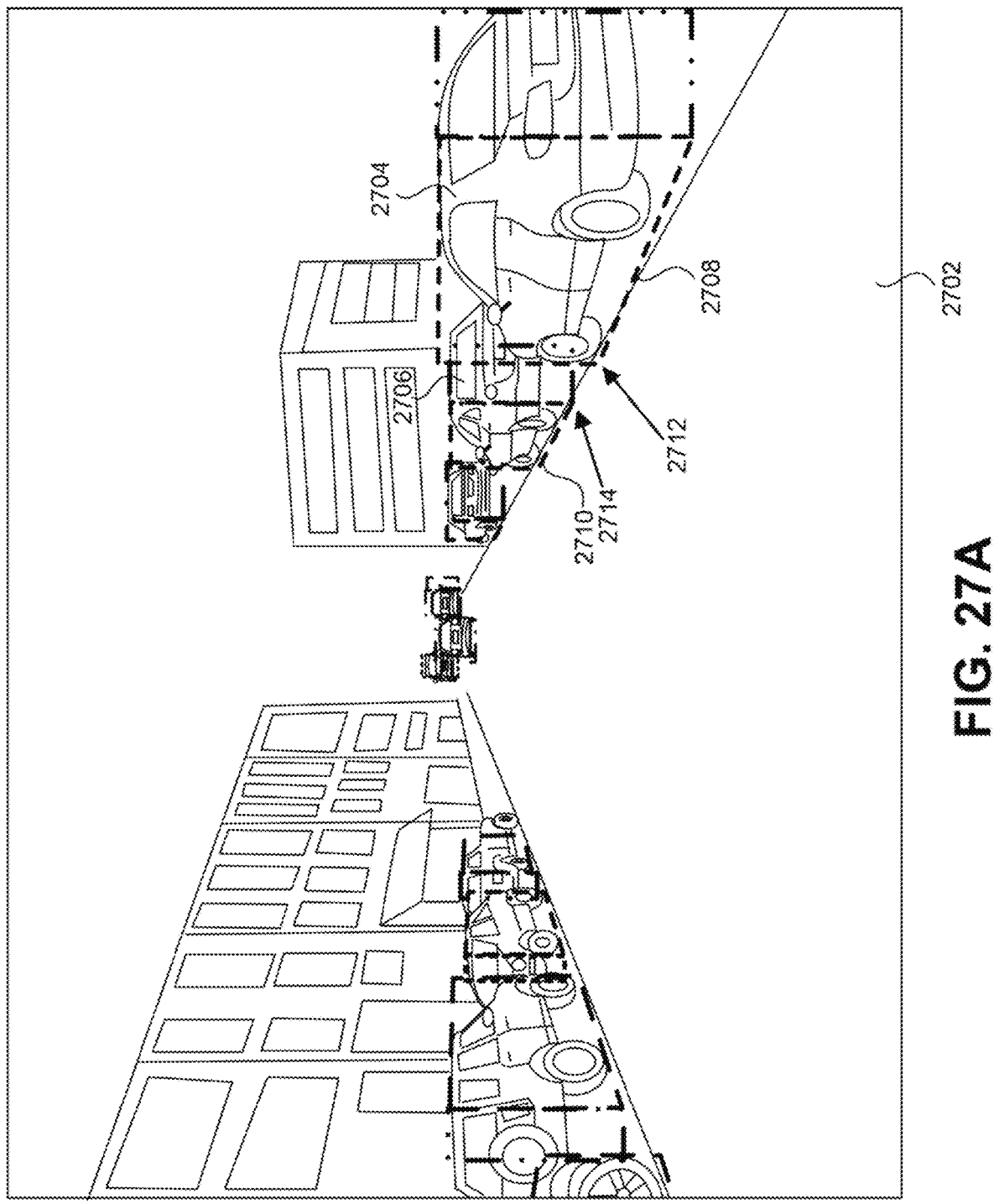
FIG. 27A is another schematic view of a road from a point-of-view of a system consistent with the disclosed embodiments.

FIG. 27A depicts a road 2702 from a point-of-view of a system consistent with the disclosed embodiments. Road 2702 may include a plurality of stationary vehicles, e.g., vehicle 2704 and vehicle 2706. As described below with respect to method 2800 of FIG. 28, the system may identify bounding boxes for the sides of the stationary vehicles, e.g., side bounding box 2708 for vehicle 2704 and side bounding box 2710 for vehicle 2706. As further described below with respect to method 2800 of FIG. 28, the system may identify a spacing between the identified bounding boxes using the front of one bounding box and the rear of an adjacent bounding box, e.g., front 2712 of bounding box 2708 and rear 2714 of bounding box 2710.

Figure 27B:
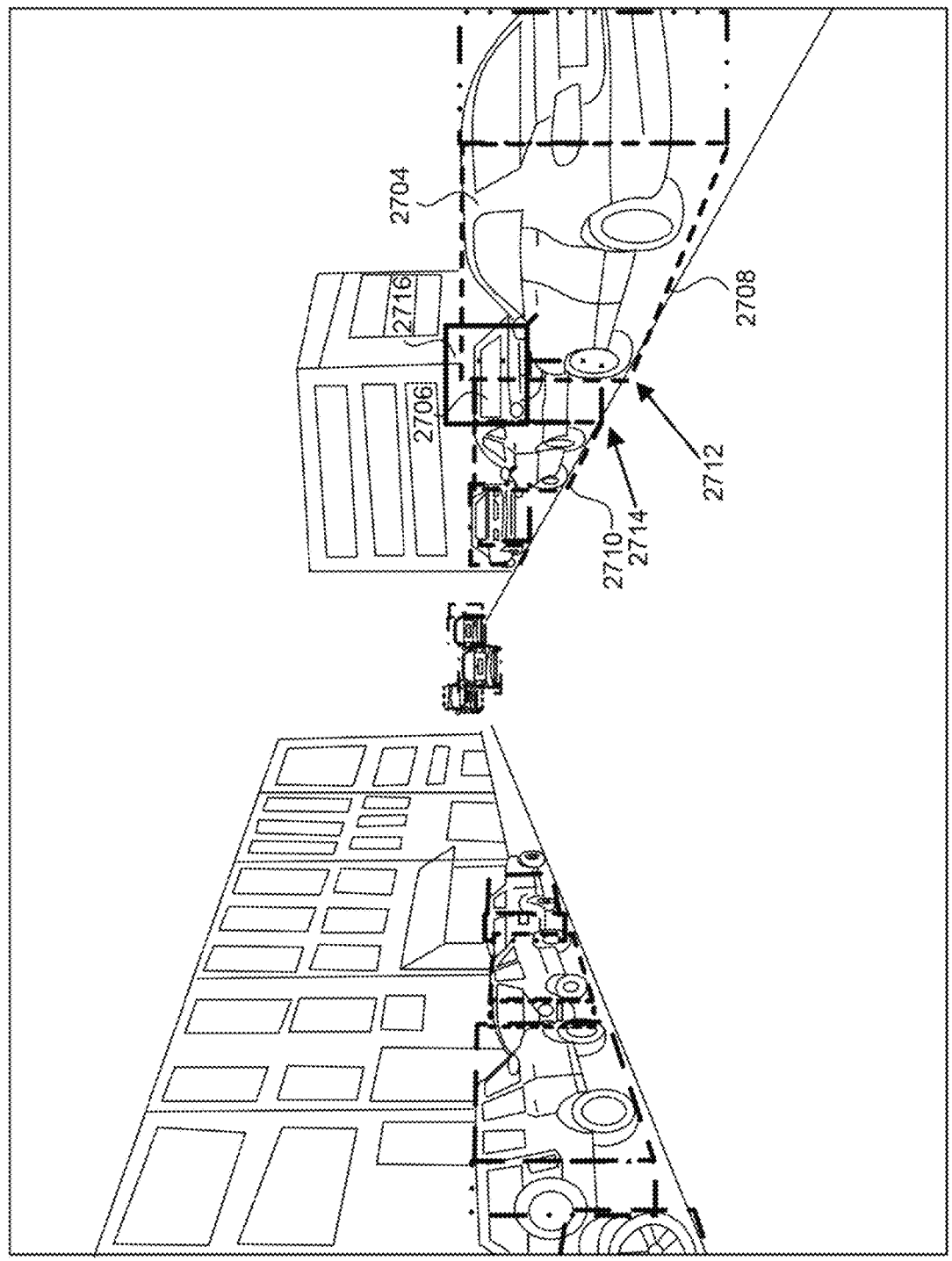
FIG. 27B is another schematic view of a road having a detection hot spot consistent with the disclosed embodiments.

FIG. 27B also depicts road 2702 with vehicle 2704 and vehicle 2706 from a point-of-view of a system consistent with the disclosed embodiments. As in FIG. 27A, the system has identified side bounding box 2708 for vehicle 2704 and side bounding box 2710 for vehicle 2706. As depicted in FIG. 278, a hot spot 2716 has been identified based on a spacing identified between the front 2712 of bounding box 2708 and the rear 2714 of bounding box 2710. As described below with respect to method 2800 of FIG. 28, the system may determine a navigational response of a host vehicle based on the identified hot spot.

Figure 28:
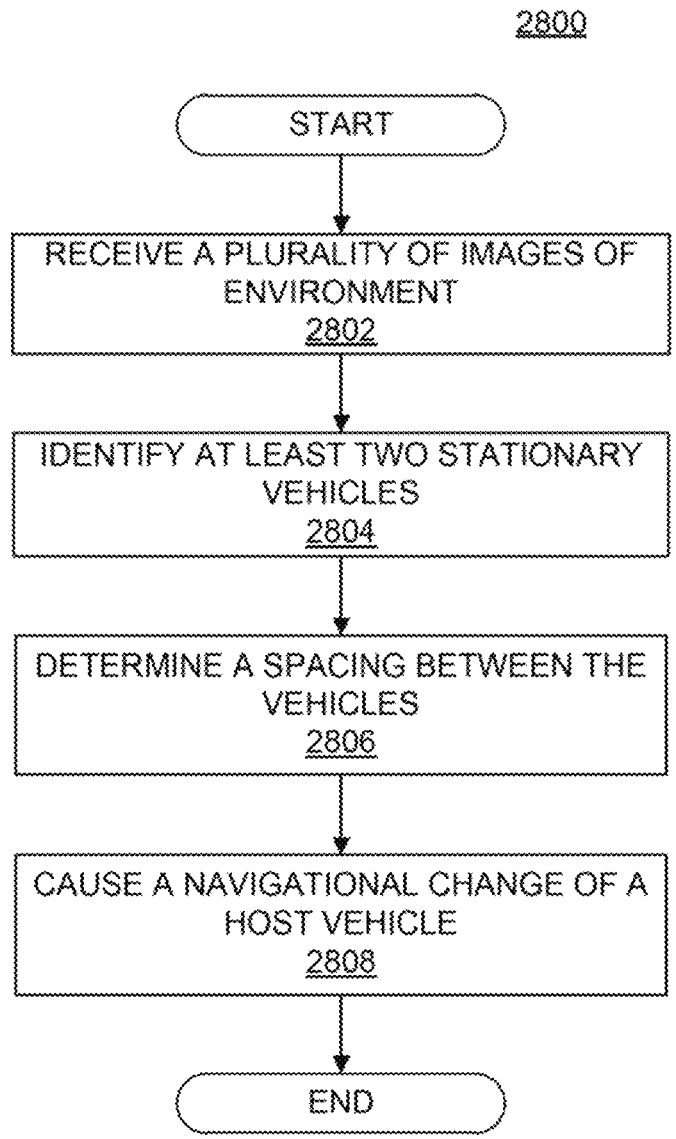
FIG. 28 is a flowchart showing an exemplary process for navigating a host vehicle consistent with the disclosed embodiments.

FIG. 28 is a flowchart showing an exemplary process 2800 for navigating based on detected spacing between vehicles, consistent with disclosed embodiments. At step 2802, processing unit 110 may receive a plurality of images of an environment of a host vehicle via data interface 128. For instance, cameras included in image acquisition unit 120 (such as image capture devices 122, 124, and 126 having fields of view 202, 204, and 206) may capture at least one image of an area forward and/or to the side of the host vehicle and transmit them over a digital connection (e.g., USB, wireless, Bluetooth, etc.) to processing unit 110. Additional information from other sensors, e.g., RADAR, LIDAR, acoustic sensors, or the like, may be used in combination with or in lieu of the plurality of images.

At step 2804, processing unit 110 may analyze at least one of the plurality of images to identify at least two stationary vehicles. For example, identifying a stationary vehicle may further include associating at least one bounding box with a shape of the side of the stationary vehicle. For example, the analysis may be performed using a learned algorithm as discussed above with reference to FIGS. 9 and 10.

At step 2806, processing unit 110 may determine a spacing between the identified vehicles. For example, processing unit 110 may scan the at least one image from left to right (or from right to left) to identify a right edge and an adjacent left edge. The identified right edge and identified left edge may comprise the front of one bounding box and the rear of another bounding box. The right edge and the left edge may form a gap pair between which the spacing may be calculated. In such embodiments, the spacing may correspond to a distance between a front of one of the stationary vehicles and a rear of the other stationary vehicle.

In other embodiments, the identified right edge and identified left edge may comprise one bounding box on one side of the road and another bounding box on the other side of the road. In such embodiments, the spacing may correspond to a distance between adjacent sides of the stationary vehicles.

In some embodiments, step 2806 may further include calculating a distance between the host vehicle and the determined spacing. For example, processing unit 110 may calculate the distance based on a height and a focal length of an image capture device (e.g., a camera) of the host vehicle. Based on known characteristics (such as height) of pedestrians or other objects, processing unit 110 may determine a shape within and/or near the calculated spacing as a "hot spot" for appearance of a pedestrian or other object. For example, the shape may be a rectangle, an ellipse, or other shape.

At step 2808, processing unit 110 may cause a navigational change of the host vehicle. For example, navigational responses may include a turn (as depicted in FIG. 13 above), a lane shift (e.g., moving the host vehicle over within a lane of travel or changing a lane of travel of the host vehicle), a change in acceleration (e.g., slowing the host vehicle), and the like. In some embodiments, the at least one navigational change may be effected by actuating at least one of a steering mechanism, a brake, or an accelerator of the host vehicle.

Processing unit 110 may cause the one or more navigational responses based on the spacing calculated at step 2806. For example, processing unit 110 may determine that the calculated spacing is sufficient to accommodate a pedestrian. Based on this determination, processing unit may slow the host vehicle and/or move the host vehicle away from the spacing. In other words, the navigational change may be caused when the spacing between the two stationary vehicles is determined to be sufficient for a pedestrian to traverse.

By way of further example, processing unit 110 may determine that the calculated spacing is sufficient to accommodate a vehicle. Based on this determination, processing unit may slow the host vehicle and/or move the host vehicle away from the spacing. In other words, the navigational change may be caused when the spacing between the two stationary vehicles is determined to be sufficient for a target vehicle to traverse.

By way of further example, based on monitoring of the hot spot, processing unit 110 may slow the host vehicle and/or move the host vehicle away from the spacing when a pedestrian or other object is identified in or near the hot spot or when motion is detected in or near the hot spot.

In some embodiments, then, processing unit 110 may detect, based on analysis of the plurality if images, a pedestrian in the spacing between the two stationary vehicles. For example, processing unit 110 may use the calculated spacing and expected heights of pedestrians to determine locations in the received images where the head of a pedestrian may be expected to appear (e.g., hot spot 2716 of FIG. 27B).

Detection of a pedestrian may be performed using a classifier trained on pedestrians, similar to the trained classifier for vehicle sides discussed above. In such an example, if a test point inside the hot spot receives a classifier score above an upper threshold, processing unit 110 may detect an approved pedestrian at that point. On the other hand, if a test point inside the hot spot receives a classifier score above a lower threshold but below the upper threshold, processing unit 110 may detect a suspect pedestrian at that point. A suspect pedestrian may be further tracked for motion towards the road, at which point processing unit re-classifies the suspect pedestrian as an approved pedestrian. Such a method of detection may improve on traditional motion detection.

In some embodiments, at least a portion of the spacing between the two stationary vehicles may be obscured from a field of view of the camera. In such embodiments, processing unit 110 may undertake additional analysis in order to compensate for the obscuration.

Processing unit 110 may also use data derived from execution of velocity and acceleration module 406 to cause the one or more navigational responses. Multiple navigational responses may occur simultaneously, in sequence, or any combination thereof.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for navigating a host vehicle based on detecting a door opening event in an environment of the vehicle, the system comprising:
at least one processing device programmed to:
receive, from an image capture device, at least one image associated with the environment of the host vehicle;
analyze the at least one image to identify a side of a parked vehicle;
identify, in the at least one image, a first structural feature of the parked vehicle in a forward region of the side of the parked vehicle or a second structural feature of the parked vehicle in a rear region of the side of the parked vehicle;
identify, in the at least one image, a door feature of the parked vehicle in a vicinity of the first or the second structural features;
determine, based on analysis of one or more subsequent images received from the image capture device, a change of an image characteristic of the door feature of the parked vehicle; and
alter a navigational path of the host vehicle based at least in part on the change of the image characteristic of the door feature of the parked vehicle.

2. The system of claim 1, wherein identifying the side of the parked vehicle includes associating at least one bounding box with a shape of the side of the parked vehicle.

3. The system of claim 1, wherein the first structural feature includes a front wheel component of the parked vehicle and the second structural feature includes a rear wheel component of the parked vehicle.

4. The system of claim 1, wherein the change of the image characteristic of the door feature includes a widening of the door feature.

5. The system of claim 1, wherein the change of the image characteristic of the door feature includes a separation of the door feature from the body of the vehicle.

6. The system of claim 1, wherein determining the change of the image characteristic of the door feature includes monitoring at least two images received from the image capture device for an appearance of a vertical stripe in the vicinity of the first or the second wheel components.

7. The system of claim 6, wherein determining the change of the image characteristic of the door feature further includes monitoring an expansion of the vertical stripe.

8. The system of claim 7, wherein a first feature of the vertical stripe is fixed along a body of the parked vehicle in the monitored images, and a second feature of the vertical stripe moves toward a front region of the parked vehicle in the monitored images.

9. The system of claim 8, wherein the at least one processing device is further configured to determine a width of the vertical stripe.

10. The system of claim 9, wherein the at least one processing device is further configured to determine a distance that the door feature extends away from the parked vehicle based on the determined width.

11. The system of claim 10, wherein the at least one processing device is further configured to determine a lateral safety distance for the host vehicle based on the determined distance that the door feature extends away from the parked vehicle.

12. The system of claim 11, wherein altering the navigational path of the host vehicle is based on the determined lateral safety distance.

13. The system of claim 1, wherein altering the navigational path of the host vehicle comprises invoking at least one navigational change of the host vehicle.

14. The system of claim 13, wherein the navigational change is determined based on at least one safety constraint.

15. The system of claim 1, wherein identifying the first structural feature or the second structural feature comprises applying a trained system.

16. The system of claim 15, herein the trained system comprises a neural network.

17. The system of claim 1, wherein determining the change of an image characteristic of the door feature comprises applying a trained system.

18. A method for navigating a host vehicle based on detecting a door opening event in an environment of the vehicle, the method comprising:
   receiving, from an image capture device, at least one image associated environment of the host vehicle;
   analyzing the at least one image to identify a side of a parked vehicle;
   identifying, in the at least one image, a first structural feature of the parked vehicle in a forward region of the side of the parked vehicle or a second structural feature of the parked vehicle in a rear region of the side of the parked vehicle;
   identifying, in the at least one image, a door feature of the parked vehicle in a vicinity of the first or the second structural features;
   determining, based on analysis of one or more subsequent images received from the image capture device, a change of an image characteristic of the door feature of the parked vehicle; and
   altering a navigational path of the host vehicle based at least in part on the change of the image characteristic of the door feature of the parked vehicle.

19. The method of claim 18, wherein identifying the side of the parked vehicle includes associating at least one bounding box with a shape of the side of the parked vehicle.

20. The method of claim 18, wherein the first structural feature includes a front wheel component of the parked vehicle and the second structural feature includes a rear wheel component of the parked vehicle.

21. The method of claim 18, wherein the change of the image characteristic of the door feature includes a separation of the door feature from the body of the vehicle.

22. The method of claim 18, wherein altering the navigational path of the host vehicle comprises invoking at least one navigational change of the host vehicle.

23. The method of claim 22, wherein the navigational change is determined based on at least one safety constraint.

24. The method of claim 18, wherein at least one of identifying the first structural feature or the second structural feature or determining a change of an image characteristic of the door feature comprises applying a trained system.

25. The method of claim 24, wherein the trained system comprises a neural network.

26. The method of claim 18, wherein determining the change of an image characteristic of the door feature comprises applying a trained system.

* * * * *